US010389635B2

(12) United States Patent
Jeganathan et al.

(10) Patent No.: US 10,389,635 B2
(45) Date of Patent: *Aug. 20, 2019

(54) ADVERTISING SELECTED FABRIC PATHS FOR SERVICE ROUTES IN VIRTUAL NODES

(71) Applicant: Juniper Networks, Inc., Sunnyvale, CA (US)

(72) Inventors: Jeyananth Minto Jeganathan, Pleasanton, CA (US); Aman Kapoor, San Jose, CA (US); Raghavendra Mallya, Cupertino, CA (US); Ashutosh K. Grewal, Sunnyvale, CA (US); Kaliraj Vairavakkalai, Fremont, CA (US); Babu Singarayan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/610,427

(22) Filed: May 31, 2017

(65) Prior Publication Data

US 2018/0351864 A1 Dec. 6, 2018

(51) Int. Cl.
*H04L 12/745* (2013.01)
*H04L 12/713* (2013.01)
(Continued)

(52) U.S. Cl.
CPC ........ *H04L 45/748* (2013.01); *H04L 12/4641* (2013.01); *H04L 45/021* (2013.01);
(Continued)

(58) Field of Classification Search
CPC .................. H04L 45/748; H04L 12/4641; H04L 45/021; H04L 45/586; H04L 47/125; H04L 45/04; H04L 45/24; H04L 45/58
See application file for complete search history.

(56) References Cited

U.S. PATENT DOCUMENTS 7,571,156 B1  8/2009 Gupta
7,751,405 B1  7/2010 Kompella
(Continued)

FOREIGN PATENT DOCUMENTS

EP  1775908 A1  4/2007
EP  3076614 A1  10/2016

OTHER PUBLICATIONS

Extended Search Report from counterpart European Application No. 18174902.9, dated Oct. 9, 2018, 9 pp.
(Continued)

*Primary Examiner* — Melvin C Marcelo
(74) *Attorney, Agent, or Firm* — Shumaker & Sieffert, P.A.

(57) ABSTRACT

In some examples, a method includes selecting, by a first virtual routing node of a single-chassis network device having a plurality of forwarding components and a plurality of fabric links coupling respective pairs of the plurality of forwarding components at respective fabric interfaces of the plurality of forwarding components, a fabric interface of a forwarding component having an egress interface toward a network destination and that is associated with the first virtual routing node; advertising, to the second virtual routing node, the fabric interface as a next hop for the network destination; storing, by the second virtual routing node to a context data structure of the second virtual node, the fabric interface as a next hop for the network destination; selecting the fabric interface from among a plurality of fabric interfaces as a next hop for the network destination; and forwarding network traffic destined for the network destination to the selected fabric interface.

18 Claims, 31 Drawing Sheets

(51) Int. Cl.
*H04L 12/755* (2013.01)
*H04L 12/46* (2006.01)
*H04L 12/803* (2013.01)
*H04L 12/775* (2013.01)
*H04L 12/715* (2013.01)
*H04L 12/707* (2013.01)

(52) U.S. Cl.
CPC .......... *H04L 45/586* (2013.01); *H04L 47/125* (2013.01); *H04L 45/04* (2013.01); *H04L 45/24* (2013.01); *H04L 45/58* (2013.01)

(56) References Cited

U.S. PATENT DOCUMENTS

| | | | |
|---|---|---|---|
| 7,826,482 | B1 | 11/2010 | Minei et al. |
| 8,194,664 | B2 | 6/2012 | Dharwadkar |
| 8,634,422 | B2 | 1/2014 | Sali et al. |
| 8,787,350 | B2 | 7/2014 | Joshi et al. |
| 8,953,439 | B1 | 2/2015 | Lin et al. |
| 8,953,599 | B1 | 2/2015 | Barth et al. |
| 9,344,359 | B1 | 5/2016 | Tiruveedhula et al. |
| 9,413,847 | B2 | 8/2016 | Medved et al. |
| 9,641,435 | B1 | 5/2017 | Sivaramakrishnan |
| 9,847,910 | B2 | 12/2017 | Chung |
| 2004/0013120 | A1 | 1/2004 | Shen |
| 2005/0163115 | A1 | 7/2005 | Dontu et al. |
| 2006/0126502 | A1 | 6/2006 | Vasseur |
| 2007/0133406 | A1 | 6/2007 | Vasseur |
| 2007/0177622 | A1 | 8/2007 | Kim |
| 2008/0084881 | A1 | 4/2008 | Dharwadkar et al. |
| 2008/0170578 | A1 | 7/2008 | Ould-Brahim |
| 2008/0291862 | A1 | 11/2008 | Lu |
| 2009/0003350 | A1 | 1/2009 | Guichard et al. |
| 2009/0175274 | A1 | 7/2009 | Aggarwal et al. |
| 2009/0296568 | A1 | 12/2009 | Kitada et al. |
| 2010/0043068 | A1 | 2/2010 | Varadhan et al. |
| 2010/0118732 | A1 | 5/2010 | Filsfils et al. |
| 2010/0246545 | A1 | 9/2010 | Berzin |
| 2012/0069847 | A1 | 3/2012 | Saad et al. |
| 2013/0259058 | A1 | 10/2013 | Vairavakkalai |
| 2014/0071830 | A1 | 3/2014 | Weill et al. |
| 2015/0109904 | A1 | 4/2015 | Filsfils et al. |
| 2015/0271102 | A1 | 9/2015 | Antich |
| 2015/0332155 | A1 | 11/2015 | Mermoud et al. |
| 2015/0334011 | A1 | 11/2015 | Zheng et al. |
| 2015/0365271 | A1 | 12/2015 | Chunduri et al. |
| 2016/0080505 | A1 | 3/2016 | Sahin et al. |
| 2016/0134591 | A1 | 5/2016 | Liao et al. |
| 2016/0226754 | A1 | 8/2016 | Zhang et al. |
| 2016/0294684 | A1 | 10/2016 | Vairavakkalai et al. |
| 2017/0237767 | A1 | 8/2017 | George et al. |
| 2017/0264552 | A1 | 9/2017 | Duda |
| 2018/0249401 | A1 | 8/2018 | Zhou et al. |
| 2018/0351862 | A1* | 12/2018 | Jeganathan ........... H04L 45/586 |

OTHER PUBLICATIONS

Notice of Allowance from U.S. Appl. No. 15/610,233, dated Oct. 30, 2018, 15 pp.
Office Action from U.S. Appl. No. 15/610,254, dated Nov. 2, 2018, 6 pp.
Manav et al., "Advertising Multiple NextHop Routes in BGP, draft-bhatia-bgp-multiple-next-hops-01.txt," Internet Draft, Network Working Group, Aug. 2006, 18 pp.
Rosen et al., "BGP/MPLS VPNs," RFC 2547, Network Working Group, Mar. 1999, 25 pp.
Rosen et al., "BGP/MPLS IP Virtual Private Networks (VPNs)," RFC 4364, Network Working Group, Feb. 2006, 47 pp.
Aggarwal et al., "MPLS Upstream Label Assignment and Context-Specific Label Space," RFC 5331, Aug. 2008, 13 pp.
Rosen et al., "Multiprotocol Label Switching Architecture," RFC 3031, Network Working Group, Jan. 2001, 61 pp.
Rosen, "Using BGP to Bind MPLS Labels to Address Prefixes draft-ietf-mpls-rfc3107bis-00," Internet Engineering Task Force, IETF, Sep. 16, 2016, 22 pp.
Rekhter et al., "Carrying Label Information in BGP-4," RFC 3107, Network Working Group, May 2001, 8 pp.
Gredler et al., "Egress Peer Engineering using BGP-LU draft-gredler-idr-bgplu-epe-08," Inter-Domain Routing, Internet Draft, Juniper Networks, Inc., Mar. 13, 2017, 14 pp.
Rekhter et al., "A Border Gateway Protocol 4 (BGP-4)," RFC 4271, Network Working Group, Jan. 2006, 104 pp.
Osborne et al., "Traffic Engineering with MPLS," Cisco Press, Jul. 27, 2002, 675 pp.
Walton et al., "Advertisement of Multiple Paths in BGP," RFC 7911, Internet Engineering Task Force, IETF, Jul. 2016, 8 pp.
"Border Gateway Protocol," Wikipedia, the free encyclopedia, accessed from http://en.wikipedia.org/wiki/border_gateway_protocol, Mar. 27, 2015, 18 pp.
U.S. Appl. No. 15/610,233, by Juniper Networks, Inc., (Inventors: Jeganathan et al.), filed May 31, 2017.
U.S. Appl. No. 15/610,254, by Juniper Networks, Inc., (Inventors: Vairavakkalai et al.), filed May 31, 2017.
U.S. Appl. No. 15/610,313, by Juniper Networks, Inc., (Inventors: Vairavakkalai et al.), filed May 31, 2017.
U.S. Appl. No. 15/610,446, by Juniper Networks, Inc., (Inventors:Jeganathan et al.) filed May 31, 2017.
Office Action from U.S. Appl. No. 15/610,313, dated Oct. 4, 2018, 15 pp.
Office Action from U.S. Appl. No. 15/610,446, dated Jul. 12, 2018, 40 pp.
Response to Office Action dated Jul. 12, 2018, from U.S. Appl. No. 15/610,446, filed Oct. 12, 2018, 15 pp.
Amendment in Response to Office Action dated Oct. 4, 2018, from U.S. Appl. No. 15/610,313, filed Jan. 4, 2019, 11 pp.
Amendment in Response to Office Action dated Nov. 2, 2018, from U.S. Appl. No. 15/610,254, filed Feb. 4, 2019, 18 pp.
Final Office Action from U.S. Appl. No. 15/610,446, dated Feb. 1, 2019, 44 pp.
Office Action from U.S. Appl. No. 15/610,313, dated Apr. 16, 2019, 28 pp.
Office Action from U.S. Appl. No. 15/610,254, dated Mar. 11, 2019, 6 pp.
Notice of Allowance from U.S. Appl. No. 15/610,233, dated Feb. 14, 2019, 8 pp.
Amendment in Response to the Office Action dated Feb. 1, 2019, from U.S. Appl. No. 15/610,446, filed May 1, 2019, 15 pp.
Response to the Office Action from U.S. Appl. No. 15/610,254, dated Mar. 11, 2019, filed Jun. 11, 2019, 22 pp.
Response filed Jun. 5, 2019 to the Extended Search Report from counterpart European Application No. 18174902.9, dated Oct. 9, 2018, 13 pp.
Notice of Allowance from U.S. Appl. No. 15/610,233 dated Jun. 13, 2019, 7pp.

* cited by examiner

FIG. 8

```
 0                   1                   2                   3
 0 1 2 3 4 5 6 7 8 9 0 1 2 3 4 5 6 7 8 9 0 1 2 3 4 5 6 7 8 9 0 1
             ATTR SUBTLV TYPE = 2            |       16 BYTES
                              IPV6-ADDRESS
```

```
 0                   1                   2                   3
 0 1 2 3 4 5 6 7 8 9 0 1 2 3 4 5 6 7 8 9 0 1 2 3 4 5 6 7 8 9 0 1
             ATTR SUBTLV TYPE = 6            |        ...3107BIS LABEL...
     LEN                      IPV4 OR IPV6 ADDRESS
```

```
                              1                   2                   3
         0 1 2 3 4 5 6 7 8 9 0 1 2 3 4 5 6 7 8 9 0 1 2 3 4 5 6 7 8 9 0 1
        | ATTR SUBTLV TYPE = 7          |                               |
        |       VALUE IN BYTES          |      4 OCTET BANDWIDTH        |
```

```
                              1                   2                   3
         0 1 2 3 4 5 6 7 8 9 0 1 2 3 4 5 6 7 8 9 0 1 2 3 4 5 6 7 8 9 0 1
        |      ATTR SUBTLV TYPE = 8                     |               |
        |                                               | BALANCE PERCENTAGE |
```

| 0 1 2 3 4 5 6 7 8 9 | 1 0 1 2 3 4 5 6 7 8 9 | 2 0 1 2 3 4 5 | 6 7 8 9 | 3 0 1 |
|---|---|---|---|---|
| ATTR SUBTLV TYPE = 5 | | TYPE | ...EXT-COMM... | |
| (..IPV4 OR IPV6 ROUTE-DISTINGUISHER) | | | | |

FIG. 16

ADVERTISING SELECTED FABRIC PATHS FOR SERVICE ROUTES IN VIRTUAL NODES

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

Routers may include one or more forwarding components, e.g., packet forwarding engines, and a switch fabric. Packet forwarding engines may receive and send data via interface cards. The switch fabric provides an interconnect mechanism for forwarding data between the packet forwarding engines for transmission over a network, e.g., the Internet. In some examples, a router or switching device may employ a distributed, multi-stage switch fabric architecture, in which network packets traverse multiple stages of the switch fabric located in distributed forwarding components of the router to travel from an ingress point of the switch fabric to an egress point of the switch fabric.

Routers use routing protocols to exchange routing information. Routers often maintain the routing information in the form of one or more routing tables or other data structures. Routers may generate and maintain forwarding information in accordance with the routing information. The forwarding information associates network routes with specific forwarding next hops and corresponding interface ports of the router. The forwarding information may, in some examples, be a subset of the information contained within routing information. The process of generating the association of the interface ports with the next hops in forwarding information is generally referred to as route resolution.

Border Gateway Protocol (BGP) is a routing protocol that routers may use to exchange information associated with routing and reachability between network devices in a network, such as between a set of edge devices. When two routers initially connect, the routers typically exchange all of their routing information. The routers then send control messages to incrementally update the routing information when the network topology changes. For example, the routers may send update messages to advertise newly available routes, and to withdraw routes that are no longer available.

In some examples, BGP can be used to advertise that a specified router has bound a specified one or more MPLS labels to a network destination represented by a specified address prefix. This can be done by sending a BGP update message having a Network Layer Reachability Information field containing the prefix and the MPLS label(s), and a Next Hop field that identifies the node at which said prefix is bound to the label(s).

SUMMARY

In general, this disclosure describes using a routing protocol attribute that allows a network device to advertise multiple next hops for reaching one or more network destinations in a single attribute of a routing protocol message. The techniques of this disclosure also allow the sender of the routing protocol attribute to specify a relationship between the multiple next hops being advertised, and forwarding semantics associated with each of the multiple next hops in the single routing protocol attribute. The routing protocol message may be a Border Gateway Protocol (BGP) update message, for example.

In some examples, the routing protocol attribute may be sent for either upstream allocation or downstream allocation, and the routing protocol attribute may include a field specifying whether the contents of the routing protocol attribute are intended for upstream allocation or for downstream allocation. A network device receiving the routing protocol message having the routing protocol attribute may determine, based on this field, how to process the routing protocol attribute. Where the routing protocol attribute is sent for downstream allocation, the next hops and forwarding semantics of the sending device are stored and used by the receiving network device for reference in determining whether to select the sending device as a next hop for forwarding network traffic to the network destination(s). Where the routing protocol attribute is sent for upstream allocation, the receiving network device installs the next hops and forwarding semantics specified by the sending device to a forwarding table and uses the next hops and forwarding semantics for forwarding network traffic received by the network device.

In one example aspect, a method includes selecting, by a first virtual routing node of a single-chassis network device having a plurality of forwarding components and a plurality of fabric links coupling respective pairs of the plurality of forwarding components at respective fabric interfaces of the plurality of forwarding components, a fabric interface of a forwarding component of the plurality of forwarding components that has an egress interface toward a network destination and that is associated with the first virtual routing node; advertising, by the first virtual routing node to the second virtual routing node, the fabric interface as a next hop for the network destination; in response to receiving the fabric interface, storing, by the second virtual routing node to a context data structure of the second virtual node, the fabric interface as a next hop for the network destination; selecting, by the second virtual routing node and based on the context data structure, the fabric interface from among a plurality of fabric interfaces as a next hop for forwarding network traffic destined for the network destination; and forwarding, by the second virtual routing node, network traffic destined for the network destination to the selected fabric interface.

In another example aspect, a single-chassis network device includes a plurality of forwarding components; a plurality of fabric links coupling respective pairs of the plurality of forwarding components at respective fabric interfaces of the plurality of forwarding components; a first virtual routing node configured to forward packets using a first subset of the plurality of forwarding components; and a second virtual routing node configured to forward packets using a second subset of the plurality of forwarding components, the second subset distinct from the first subset, wherein the first virtual routing node is configured to: select a fabric interface of a forwarding component of the plurality of forwarding components that has an egress interface toward a network destination and that is associated with the first virtual routing node; advertise to the second virtual routing node, the fabric interface as a next hop for the network destination, and wherein the second virtual routing node is configured to, in response to receiving the fabric interface, store, to a context data structure of the second virtual node, the fabric interface as a next hop for the network destination, select, based on the context data structure, the fabric interface from among a plurality of fabric interfaces as a next hop for forwarding network traffic destined for the network destination, and forward network traffic destined for the network destination to the selected fabric interface.

In a further example aspect, a computer-readable storage medium includes instructions for causing one or more programmable processors of a single-chassis network device to: select, by a first virtual routing node of the single-chassis network device having a plurality of forwarding components and a plurality of fabric links coupling respective pairs of the plurality of forwarding components at respective fabric interfaces of the plurality of forwarding components, a fabric interface of a forwarding component of the plurality of forwarding components that has an egress interface toward a network destination and that is associated with the first virtual routing node; advertise, by the first virtual routing node to the second virtual routing node, the fabric interface as a next hop for the network destination; in response to receiving the fabric interface, store, to a context data structure of the second virtual node, the fabric interface as a next hop for the network destination; select, by the second virtual routing node and based on the context data structure, the fabric interface from among a plurality of fabric interfaces as a next hop for forwarding network traffic destined for the network destination; and forward, by the second virtual routing node, network traffic destined for the network destination to the selected fabric interface.

The details of one or more examples are set forth in the accompanying drawings and the description below. Other features, objects, and advantages will be apparent from the description and drawings, and from the claims.

BRIEF DESCRIPTION OF DRAWINGS

FIG. 8 is a block diagram illustrating an example format for an IPv6 Address sub-TLV, one example of a Next hop Attributes Sub-TLV.

FIG. 9 is a block diagram illustrating an example format for a Labeled IP next hop attribute sub-TLV, one example of a Next hop Attributes Sub-TLV.

FIG. 10 is a block diagram illustrating an example format for an IPv4-Address with "Point-of-Attachment identifier" attribute sub-TLV.

FIG. 11 is a block diagram illustrating an example format for an IPv6-Address with "Point-of-Attachment identifier" attribute sub-TLV.

FIG. 12 is a block diagram illustrating an example format for Available Bandwidth sub-TLV.

FIG. 13 is a block diagram illustrating an example format for a Load balance factor attribute sub-TLV.

FIG. 16 is a block diagram illustrating an example format for Forwarding-context Route-Target attribute sub-TLV.

Like reference characters denote like elements throughout the figures and text.

DETAILED DESCRIPTION

Figure 1:
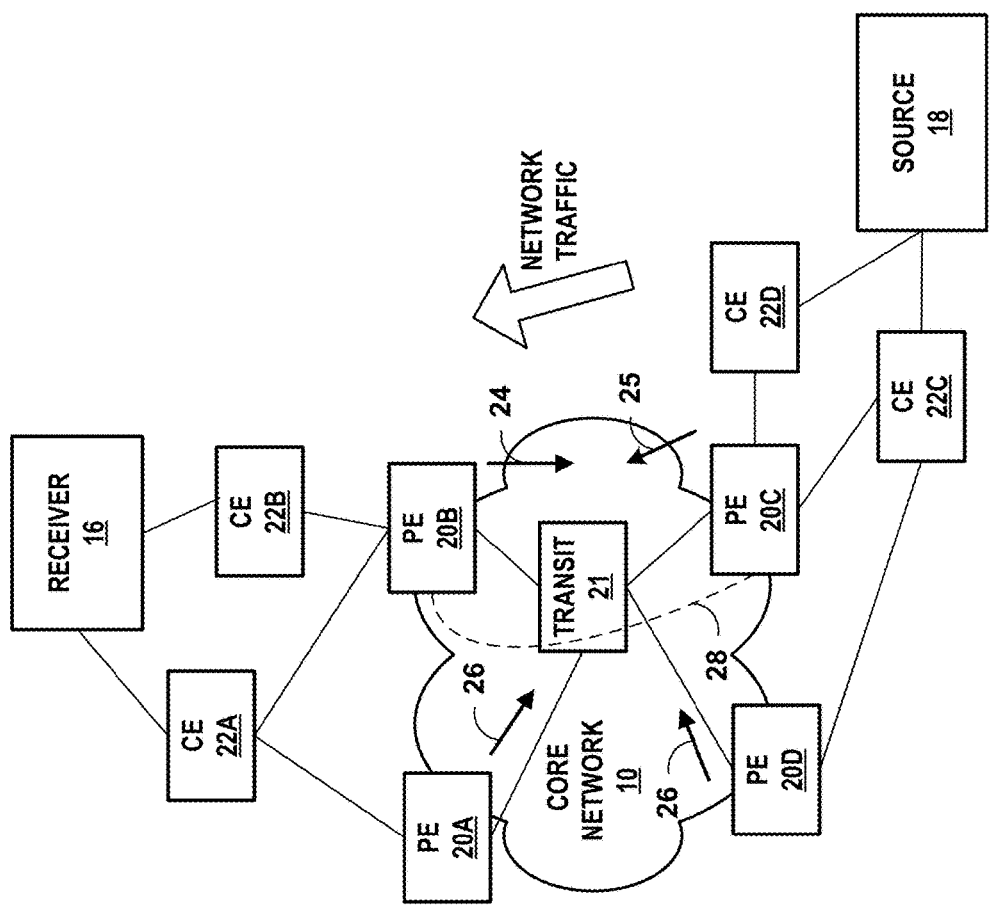
FIG. 1 is a block diagram illustrating an example network environment that includes network devices configured in accordance with techniques described in this disclosure.

FIG. 1 is a block diagram illustrating an example network environment that includes network devices configured in accordance with techniques described in this disclosure. For purposes of example, the techniques of this disclosure are described with respect to a simplified network environment 2 of FIG. 1 in which provider edge (PE) routers 20A-20C ("PE routers 20") provide customer networks (not shown) with access to core network 10. Core network 10 also includes a transit router 21 coupled to PE routers 20. PE routers 20 and transit router 21 may exchange routing information to maintain an accurate representation of the topology of network environment 2. Although described for purposes of example with respect to PE routers 20 and transit router 21, the techniques of this disclosure may be used by network devices such as gateway devices, route reflectors, peer devices, servers, or the like, and/or network devices having routing functionality in addition to other functionality.

Although not illustrated, core network 10 may be coupled to one or more networks administered by other providers, and may thus form part of a large-scale public network infrastructure, e.g., the Internet. Consequently, core network 10 may be viewed as core networks of the Internet. In some examples, core network 10 may provide computing devices such as customer edge (CE) routers 22A, 22B ("CE routers 22") with access to the Internet, and may allow computing devices within customer networks to communicate with each other. In another example, core network 10 may provide network services within the core of the Internet. Core network 10 may include a variety of network devices (not shown) other than PE routers 20 and transit router 21, such as additional routers, switches, servers, or other devices.

In the illustrated example, CE router 22A is coupled to core network 10 via an access link, CE router 22C is coupled to core network 10 via an access link, and CE router 22A is coupled to core network 10 via multiple access links. In some examples, receiver 16 receives traffic and/or network services from source 18. PE routers exchange route advertisement messages (e.g., BGP update messages) 24, 26. Customer networks may include one or more computing devices (not shown), such as personal computers, laptop computers, handheld computers, workstations, servers, switches, printers, customer data centers or other devices. The configuration of network environment 2 illustrated in FIG. 1 is merely an example.

Assume that the PE routers 20 and transit router 21 are configured to route traffic from a source network device 18 to a receiver network device 16. PE routers 20A and 20B may advertise their reachability to receiver 16 by outputting one or more routing protocol messages, such as BGP messages in accordance with a border gateway protocol. PE routers 20 may each be BGP speakers, i.e., routers that implement BGP. BGP speakers that exchange BGP messages as endpoints of a BGP session are called BGP peers. Routers 20 may be BGP peers with one another. Transit router 21 may not be a BGP speaker, but can forward BGP messages. BGP update messages are used to transfer routing information between BGP peers. BGP peers can use information received in the update messages to construct a graph that describes the relationships of the various Autonomous Systems of which the BGP peers are members.

Reachability (e.g., network layer reachability information (NLRI)) may refer to information associated with indicating that network traffic may be routed to a destination network device (e.g., receiver network device 16) or a set of destinations (e.g., including receiver network device 16) via a particular network device advertising the reachability information. A BGP update message has an NLRI field that carries an IP address prefix representing the set of systems having IP addresses contained in the IP address prefix. A BGP update message may also include one or more path attributes. A BGP update message can advertise one set of path attributes, but multiple destinations, provided that the destinations share these attributes. All path attributes contained in a given BGP update message apply to all destinations carried in the NLRI field of the BGP update message.

For example, PE routers 20A and 20B may send route advertisement messages 24, 26, respectively, advertising a next hop that PE routers 20A, 20B are aware of to which traffic destined for receiver 16 can be forwarded. PE router 20A sends a route advertisement message 26 (e.g., a BGP update message) that specifies CE router 22A as a next hop for reaching receiver 16. PE router 20B sends a route advertisement message 24 (e.g., a BGP update message) that specifies both CE router 22A and CE router 22B as next hops for reaching receiver 16. The reachability for receiver 16 may be expressed in terms of network layer reachability information, such as a network address prefix that includes an IP address of receiver 16. In accordance with the techniques of this disclosure, route advertisement message 24 includes a new attribute specifying multiple next hops, i.e., CE router 22A and CE router 22B, and that further specifies forwarding semantics for the multiple next hops, such as information about a relationship between the multiple next hops. Although the example of FIG. 1 illustrates route advertisement message 24 specifying two next hops for reaching receiver 16, in other examples, network devices may send routing protocol messages specifying more than two next hops for reaching a receiver, in accordance with the techniques of this disclosure.

In some examples, route advertisement message 24 is a labeled-unicast BGP message that advertises an MPLS label for use in sending network traffic along an LSP 28 between PE router 20C and PE router 20B. In this case, PE routers 20 may also be referred to as Label Switching Routers (LSRs).

When two MPLS LSRs are adjacent in an MPLS Label Switched Path (LSP), one of them can be termed an "upstream LSR" and the other a "downstream LSR". The terms "downstream" and "upstream" refer to the direction of the ultimate flow of network traffic along the LSP, flowing from upstream network devices to downstream network devices along the LSP. In the MPLS architecture, the decision to bind a particular label L to a particular Forwarding Equivalence Class (FEC) F is made by the Label Switching Router (LSR) that is downstream with respect to that binding. The downstream LSR then informs the upstream LSR of the binding. Thus labels are "downstream-assigned," and label bindings are distributed in the "downstream to upstream" direction. E. Rosen, Multiprotocol Label Switching Architecture, Network Working Group RFC 3031, January 2001 (hereinafter, "RFC 3031"), only discusses downstream-assigned label bindings. Upstream label allocation is described in R. Aggarwal, MPLS Upstream Label Assignment and Context-Specific Label Space, Network Working Group RFC 5331, August 2008, the entire contents of which are incorporated by reference herein (hereinafter, "RFC 5331"). RFC 5331 describes upstream-assigned MPLS labels in the MPLS architecture.

Consider two LSRs, PE 20C and PE 20B, that have agreed to bind Label L to a FEC F for packets sent from PE 20C to PE 20B. Then, with respect to this FEC-label binding, PE 20C is the "upstream LSR," and PE 20B is the "downstream LSR." If the binding between L and F was made by PE 20B and advertised to PE 20C (e.g., via route advertisement message 24), then the label binding is known as "downstream-assigned".

If the binding between L and F was made by PE 20C and advertised to PE 20B (e.g., via route advertisement 25), then the label binding is known as "upstream-assigned." Upstream-assigned labels are looked up in a context-specific label space. In some examples, an upstream-assigned label may be sent by PE 20D via a route advertisement 27.

When MPLS labels are upstream-assigned, the context of an MPLS label L is provided by the LSR that assigns the label and binds the label to a FEC F for a Label Switched Path (LSP) 28. The LSR that assigns the label distributes the binding and context to an LSR PE 20B that then receives MPLS packets on LSP 28 with label L. When PE 20B receives an MPLS packet on LSP 28, PE 20B needs to be able to determine the context of this packet. As described in RFC 5331, one example of such a context is a tunnel over which MPLS packets on LSP1 may be received. Another example of such a context is the neighbor from which MPLS packets on LSP1 may be received. In some examples, an MPLS label may be used to establish a context, i.e., identify a label space. A "context label" is one that identifies a label table in which the label immediately below the context label should be looked up. A context label carried as an outermost label over a particular multi-access subnet/tunnel should be unique within the scope of that subnet/tunnel.

The techniques of this disclosure describe a new BGP attribute that allows a BGP speaker such as PE routers 20 to advertise multiple next hops for a set of NLRIs in a single BGP attribute of a BGP message. This is in contrast to a BGP speaker being limited to advertising one next hop for a set of NLRIs in an Update message, such as encoded in either the top-level BGP Next hop attribute (code 3), or inside the MP_REACH attribute (code 14). Moreover, in contrast to mechanisms such as BGP-Addpath, which allows only a basic ability to advertise multiple next hops, the techniques of this disclosure also allow the sender of the BGP attribute to specify a desired relationship between the multiple next hops being advertised, and forwarding semantics associated with each of the multiple next hops in a single BGP attribute. For example, the relationship between the advertised multiple next hops may include relative-ordering, type of load-balancing, or fast-reroute, for example. These are local decisions at the upstream node based on path-selection between the various additional-paths, which may tie-break based on some arbitrary aspect (e.g., based on Router-Identifier).

In some examples, core network 10 may have a "BGP-free core" in the sense that transit router 21 and other transit routers (not shown) within core network 10 are not BGP speakers that understand the contents of BGP messages (although they may forward them). Some scenarios with a BGP-free core may benefit from having a mechanism where egress-node can signal multiple next hops along with their relationship to ingress nodes. This document defines a new BGP attribute, referred to herein as a MultiNexthop BGP attribute, that can be used for this purpose. The MultiNexthop BGP attribute is a new BGP optional-transitive attribute that can be used to convey multiple next hops to a BGP-speaker. The MultiNexthop BGP attribute describes forwarding semantics for the multiple next hops using one or more Next hop-Forwarding-Semantics TLV. The MultiNexthop BGP attribute can be used for both labeled and unlabeled BGP families. For labeled-families, the MultiNexthop BGP attribute is used for a different purpose in "downstream allocation" cases than in "upstream allocation" cases, as described herein.

For example, f labeled-families, the MultiNexthop BGP attribute can be used to both describe the forwarding semantics at egress-node in "downstream label allocation" mode, and to describe the desired forwarding-semantics at the egress/transit node in "upstream label allocation" scenarios. Typically, semantics of a downstream-allocated label are known to the egress-node only. The speaker receiving the label-binding does not have access to information of the label's forwarding-semantic at the advertiser. In some environments, it may be useful for the originating speaker to convey this information to the receiving speaker. For example, this may help in better debugging and manageability, or enable the label-receiving-speaker (which in some examples could be a centralized controller), to make better decisions about which label to use, based on the label's forwarding-semantic. While doing upstream-label allocation, the new attribute described herein allows a PE router to signal to the receiving-speaker what the forwarding-semantic for the label should be. This attribute can be used to convey the forwarding-semantics at the egress-node.

In some examples, the techniques of this disclosure may be used by route reflectors. A RR advertising ADD_PATHs should use the MultiNexthop attribute when comparing with next-hop of other contributing paths and arriving on set of paths to advertise to Addpath receivers.

Figure 2:
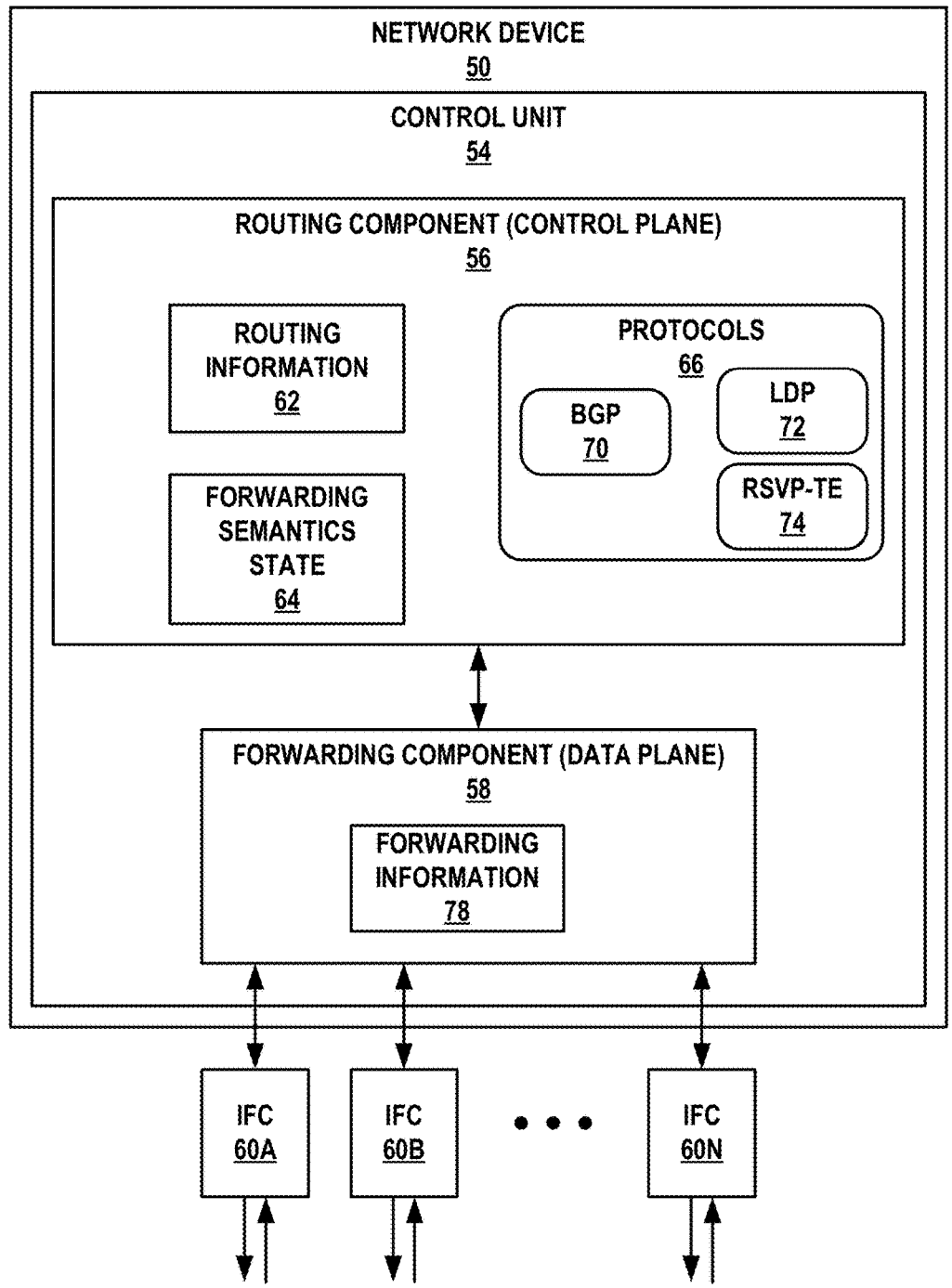
FIG. 2 is a block diagram illustrating an example network device configured to operate in accordance with techniques of this disclosure.

FIG. 2 is a block diagram illustrating an example network device 50 configured to operate in accordance with techniques of this disclosure. In one example, network device 50 may operate as a BGP speaker sending a BGP update message that includes a MultiNexthop BGP attribute, as described herein. In another example, network device 50 may operate as a BGP speaker receiving a BGP update message that includes a MultiNexthop BGP attribute, as described herein. For example, network device 50 may operate substantially similar to any of PE routers 20 from FIG. 1.

In the illustrated example of FIG. 2, network device 50 includes interface cards 60A-60N ("IFCs 60") that receive control and data packets via incoming links and send control and data packets via outbound links. IFCs 60 are typically coupled to the incoming links and the outbound links via a number of interface ports. Network device 50 also includes a control unit 54 that determines routes of received packets and forwards the packets accordingly via IFCs 60.

Control unit 54 includes a routing component 56 and a forwarding component 58. Routing component 56 operates as the control plane for router 50 and includes an operating system (not shown) that may provide a multi-tasking operating environment for execution of multiple concurrent processes. For example, routing component 56 provides an operating environment for various protocols 66 that perform routing functions for network device 50. In the illustrated example of FIG. 2, routing component 56 includes a border gateway protocol (BGP) process 70 as a unicast routing protocol used to exchange routing information with other network devices in a network to discover the network topology and update routing information 62.

Routing information 62 may describe the topology of the network in which network device 50 resides, and may also describe various routes within the network and the appropriate next hops for each route, i.e., the neighboring network devices along each of the routes. Routing information 62 may include a list of incoming interfaces (IIFs) and a list of outgoing interfaces (OIFs) that indicate which of IFCs 60 are connected to the neighboring network devices in each route.

In some examples, BGP process 70 is configured to generate and output a route advertisement such as a BGP update message having a MultiNexthop attribute in accordance with the techniques of this disclosure. Alternatively or additionally, BGP process 70 is configured to receive and process a BGP update message having a MultiNexthop attribute in accordance with the techniques of this disclosure, and store next hop information from the MultiNexthop attribute, such as based on other information specified by the MultiNexthop attribute. In some examples, such as in response to BGP process 70 determining that the received MultiNexthop attribute indicates the MultiNexthop attribute is for downstream allocation (e.g., based on a U-bit having a value of 0 as described herein), BGP process 70 may store forwarding semantics information specified by a received MultiNexthop attribute to forwarding semantics state 64. BGP process 70 may subsequently reference forwarding semantics state 64 when installing routes to routing information 62, and/or for route resolution in generating forwarding information 78. In some examples, such as in response to BGP process 70 determining that the received MultiNexthop attribute indicates the MultiNexthop attribute is for upstream allocation (e.g., based on the U-bit having a value of 1), BGP process 70 is configured to store information specified by a received MultiNexthop attribute to routing information 62.

Routing protocols may also include one or more of LDP process 72 and RSVP-TE process 74, which may be used for label allocation and resource reservation for LDP and/or RSVP-TE LSPs. In some cases, LDP process 72 and RSVP-TE process 74 may use labels obtained via the MultiNexthop attribute in accordance with the techniques of this disclosure.

In some examples, BGP process 70 may send or receive a context-nexthop discovery route message having a MultiNexthop attribute that specifies a route-table to be created. For example, BGP process 70 may receive a context-nexthop discovery route message having a MultiNexthop attribute containing a Table name attribute sub-TLV that specifies a name of a forwarding table to be created. In response to receiving a context-nexthop discovery route message, BGP process 70 creates the specified forwarding table (sometimes referred to as route-table) in routing information 62. BGP process 70 may subsequently receive BGP update messages having MultiNexthop attributes that specify next hops to be installed in the forwarding table. In some examples, BGP process may receive private label route messages that specify labels and associated next hops to be installed in the forwarding table.

Routing component 56 analyzes routing information 62 to generate forwarding information 78 installed in forwarding component 58. Forwarding component 58 provides data plane functionality for network device 50. Although not shown in FIG. 2, forwarding component 58 may comprise a central processing unit (CPU), memory and one or more programmable packet-forwarding application-specific integrated circuits (ASICs). Forwarding information 78 associates network destinations with specific next hops and corresponding ports of IFCs 60. In some examples, forwarding information 78 may store forwarding semantics associated with the next hops, such as forwarding actions for use with the next hops, labels, next hop attributes, or the like. In some examples, forwarding information 78 may include a forwarding table (e.g., a context-FIB) created based on receiving a context nexthop discovery route message.

When network device 50 receives network traffic destined for a network destination that, applying, by the network device and based on the forwarding information, the forwarding actions to network traffic received by the network device and destined for the network destination when forwarding the network traffic to one or more of the plurality of next hops. In some examples, the network traffic may be received via an LSP, such as an RSVP-TE LSP, and a packet of the network traffic may have an outer RSVP-TE label that forwarding component 58 may pop in accordance with forwarding information 78. Forwarding information 78 may include a forwarding action that instructs forwarding component 58 to look up an inner label of the packet in the context-FIB to determine the next hop for the packet and any associated forwarding actions.

According to one example aspect of the techniques of this disclosure, network device 50 may receive a route advertisement message that includes an attribute for upstream allocation, the attribute specifying information including a plurality of next hops of a second network device for reaching a network destination in the route advertisement message, a plurality of forwarding semantics describing forwarding actions associated with respective ones of each of the plurality of next hops and respective next hop attributes of the plurality of next hops, and a field indicating whether the attribute is provided for downstream allocation or upstream allocation. In response to BGP process 70 determining that the field indicates the attribute is provided for upstream allocation, BGP process 70 installs, based on the plurality of forwarding semantics, the plurality of next hops, the forwarding actions, and the next hop attributes to routing information 62 and forwarding information 78 stored by network device; and 50. Forwarding component 78 applies, based on the forwarding information, the forwarding actions to network traffic received by network device 50 and destined for the network destination when forwarding the network traffic to one or more of the plurality of next hops. In response to BGP process 70 determining that the field indicates the attribute is provided for downstream allocation, BGP process 70 select the second network device to which to forward traffic based on one or more of the plurality of next hops of the second network device and the associated forwarding semantics.

The architecture of network device 50 illustrated in FIG. 2 is shown for example purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

Figure 3:
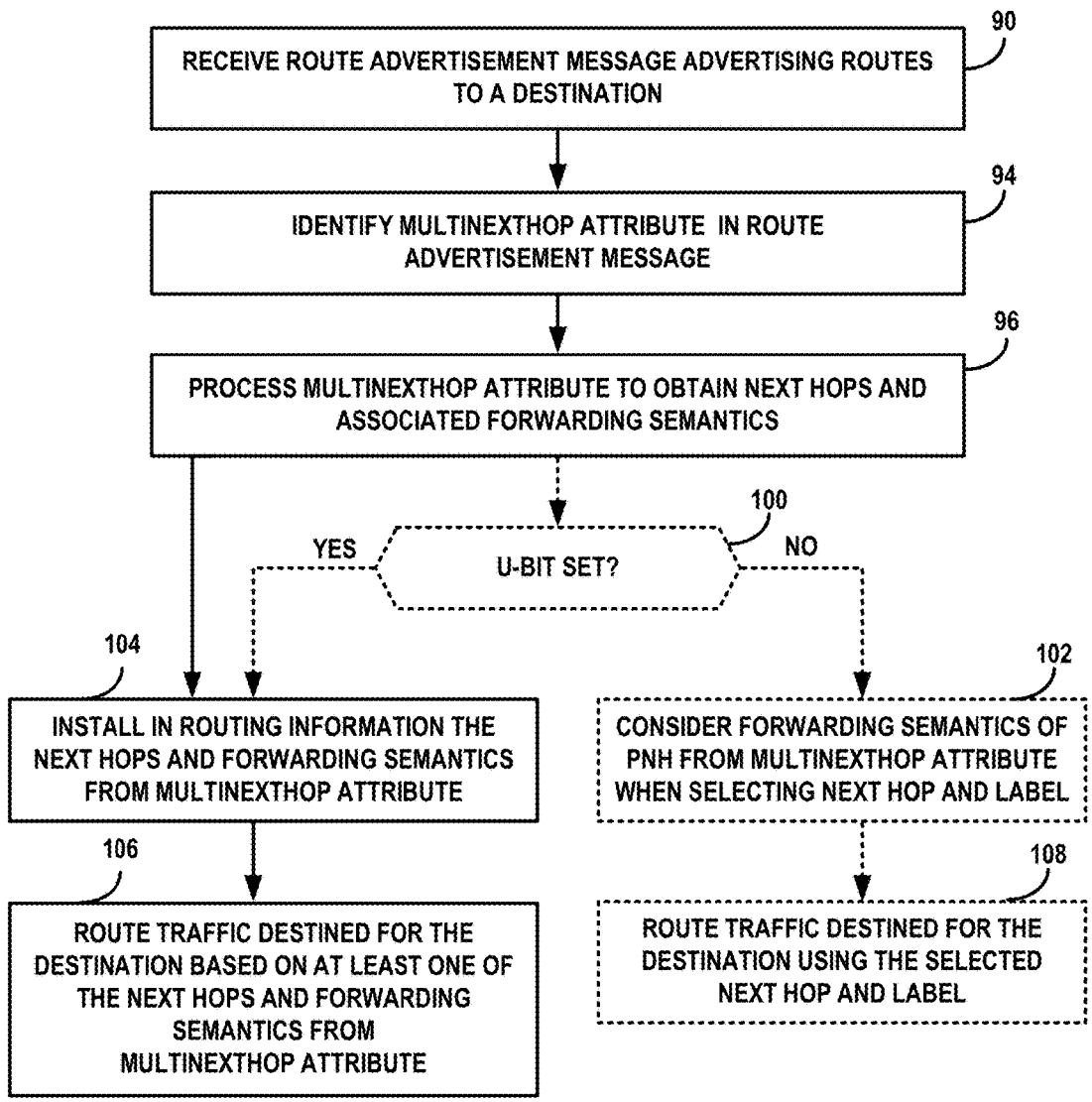
FIG. 3 is a flowchart illustrating example operation of a network device in processing a route advertisement message having a MultiNexthop attribute in accordance with one or more aspects of this disclosure.

FIG. 3 is a flowchart illustrating example operation of a network device in processing a route advertisement message having a MultiNexthop attribute in accordance with one or more aspects of this disclosure. FIG. 3 is described for purposes of example with respect to devices of FIGS. 1-2. In the example of FIG. 3, a network device (e.g., PE routers 20B, 20C, of FIG. 1 or network device 50 of FIG. 2) receives a route advertisement message advertising routes to a network destination (90), where the route advertisement message includes a MultiNexthop attribute. The MultiNexthop attribute may have a format as described in FIG. 4, for example. The route advertisement message may be a BGP update message, for example, or may be a route advertisement message associated with a protocol other than BGP, such as Routing Information Protocol (RIP), for example.

The network device identifies the MultiNexthop attribute contained in the route advertisement message (94). For example, a control plane of the network device may be configured with extensions to the protocol that allow the network device to recognize and process the MultiNexthop attribute. In the example of FIG. 2, BGP process 70 may be configured with BGP extensions for the MultiNexthop attribute that allow BGP process to identify the MultiNexthop attribute. For example, the network device may use stored information associated with identifying the MultiNexthop attribute to determine that the MultiNexthop attribute is included in the route advertisement message. Additionally, or alternatively, the network device may include information indicating that route advertisement messages received from a particular network device (e.g., from a route reflector, controller, or BGP peer) include respective MultiNexthop attributes. In some implementations, the network device may identify information in the route advertisement message indicating that the route advertisement message includes one or more MultiNexthop attribute. For example, the sender of the route advertisement message may include information (e.g., a set of bits such as an attribute type code) in the route advertisement message indicating that the route advertisement message includes a MultiNexthop attribute and/or that indicates a set of bits, of the route advertisement message, that are associated with the MultiNexthop attribute.

The network device also processes one or more next hop forwarding semantics information that associates respective forwarding actions with respective next hops and describes attributes of the next hops (96), e.g., in TLVs and sub-TLVs contained in the MultiNexthop attribute as described in FIGS. 5-16. For example, BGP process 70 of the network device may parse the TLVs and sub-TLVs of the MultiNexthop attribute to extract the next hop forwarding semantics information.

In some examples, a sending network device may be configured to use the MultiNexthop attribute for both of downstream allocation situations and upstream allocation situations, as needed. In these examples the MultiNexthop attribute may include a flag (e.g., one or more bits) that indicates whether the MultiNexthop attribute is being sent for downstream allocation or upstream allocation. In this case, the receiving network device, when processing the MultiNexthop attribute, determines whether the bit (referred to as a U-bit in this example) is set (100).

If the U-bit is set (YES branch of 100), in some implementations this indicates that the MultiNexthop attribute is for upstream allocation and the receiving network device should install in routing information the next hops and forwarding semantics from the MultiNexthop attribute, along with any next hop attributes contained in sub-TLVs. That is, the originating network device can use the upstream allocation function of the MultiNexthop attribute to control installation of forwarding information, including multiple next hops and associated forwarding semantics, at the receiving network device. When the network device determines the MultiNexthop attribute is for upstream allocation (e.g., via the U-Bit), the network device installs the specified next hops and forwarding semantics, and any next hop attributes, into its stored forwarding information (104). For example, a BGP process 70 of the network device may identify a numerical value of in a forwarding action field of a next hop forwarding semantics TLV of the MultiNexthop attribute, and may determine based on stored information that the numerical value corresponds to a particular forwarding action.

The BGP process 70 may store an indication of the forwarding action as being associated with the next hop in forwarding information. In some examples, BGP process 70 may identify a label specified by the MultiNexthop attribute and a forwarding action such as instructions to PUSH or SWAP the label when forwarding a packet towards the associated next hop. Additionally, or alternatively, BGP process 70 may identify one or more other values of fields of the MultiNexthop attribute, such as one or more of numerical values, character values, or the like, and may determine that the one or more other values correspond to next hop attributes, such as a next hop load balancing percentage, a next hop bandwidth, a name of a routing table to which to install the next hop, or the like.

If the U-bit is not set (NO branch of 100), this indicates to the receiving network device the MultiNexthop attribute is for downstream allocation and informs the receiving network device what the forwarding semantics are for the next hops at the protocol next hop (PNH) specified in the MultiNexthop attribute. By the downstream allocation function, the receiving network device may thus be enabled to take into consideration the forwarding semantics of the protocol next hop and any next hop attributes when determining which of a plurality of routes, labels, or next hops to install. For example, the network device (e.g., PE router 20C) may receive multiple route advertisements 24, 26 advertising reachability to a network destination (e.g., receiver 16) from multiple routing peers (e.g., PE router 20A and PE router 20B), and the network device (e.g., a BGP process 70 of the network device) may consider the information contained in the MultiNexthop attribute when determining which route and label (if the MultiNexthop attribute includes a label) to install in forwarding information and use for forwarding traffic destined for the network destination (102).

The network device subsequently routes traffic received at the network device and destined for the destination using the selected next hop and label based on the forwarding information (108).

For example, the network device may determine that routing traffic using a particular next hop (e.g., according to a forwarding semantic of the PNH associated with the particular next hop) is associated with causing traffic to be routed faster, with less packet loss, or the like as compared with routing traffic to another next hop (e.g., based on a prioritization of forwarding semantics). Additionally, or alternatively, when selecting a next hops the network device may assign scores to multiple next hops based on a set of selection criteria, such as a set of network performance criteria, or the like, and may select the next hop based on a score associated with the next hop.

In some implementations, the network device may select a next hop from those advertised in the MultiNexthop attribute for routing a portion of network traffic (e.g., a flow of network packets, a set of network packets, etc.). For example, the network device may utilize a next hop for routing a first portion of network traffic and may utilize another next hop for routing a second portion of network traffic. In some implementations, the network device may select the portion of network traffic based on determining to provide preferential treatment for the portion of network traffic. For example, the network device may determine that the portion of network traffic is to receive preferential treatment, based on a type of network traffic associated with the portion of network traffic, a source of the portion of network traffic, a quality of service parameter associated with the portion of network traffic, or the like. In this case, the network device may utilize the next hop based on the next hop being associated with a forwarding semantic providing preferential treatment compared with other forwarding semantics associated with other next hops.

Steps 100 and 102 of FIG. 3 have dashed lines to indicate that these steps are optionally performed by the network device. In some examples, the network device may be configured to use separate BGP attributes for signaling the downstream and the upstream allocation information. For example, the network device may use the MultiNexthop attribute only for upstream allocation, and may use a different BGP attribute for downstream label allocation, such as a label descriptor attribute as described in U.S. patent application Ser. No. 14/675,318, filed Mar. 31, 2015, entitled "SEMANTIC INFORMATION FOR LABELS IN BORDER GATEWAY PROTOCOL, for example. In this case, the MultiNexthop attribute may therefore not include a U-bit to differentiate between the downstream and upstream cases. In this example, the BGP process may proceed directly from step 96 to step 104 and omit steps 100 and 102.

FIGS. 4-16 are provided as examples of message formats for a MultiNexthop attribute as a BGP attribute. Other example message formats are possible, including for BGP or routing protocols other than BGP, and may differ from the formats described with regard to FIGS. 4-16.

Figure 4:
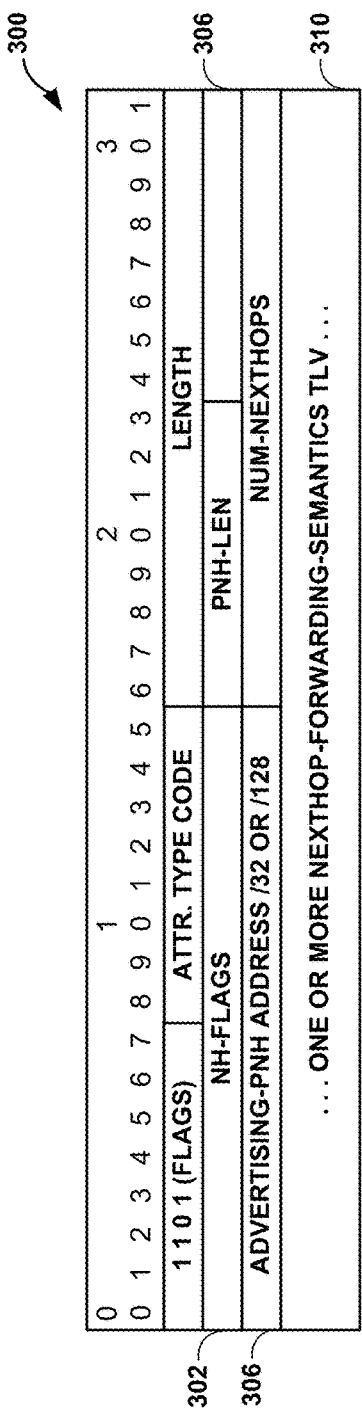
FIG. 4 is a block diagram illustrating an example format for a MultiNexthop BGP attribute 300 in accordance with the techniques of this disclosure.

FIG. 4 is a block diagram illustrating an example format for a MultiNexthop BGP attribute 300 in accordance with the techniques of this disclosure. MultiNexthop BGP attribute 300 includes a set of bits that provide information regarding reachability of a destination network device, which may be identified by a BGP prefix. MultiNexthop BGP attribute 300 can be included in a routing protocol communication such as a BGP update message. The MultiNexthop BGP attribute is used to signal multiple next hops and relationships between the multiple next hops, all in a single message. In the example of FIG. 1, MultiNexthop BGP attribute 300 includes a Flags field, an attribute type code field, a length field, a next hop flags field ("NH-Flags") 300, a protocol next hop (PNH) length field, an advertising-PNH address field 306, a number of next hops field ("num-nexthops"), and a field containing one or more nexthop-forwarding-semantics Type-length-value (TLVs).

A protocol next hop (PNH) generally refers to the next hop along a route as disseminated in accordance with a routing protocol, such as BGP. For example, a BGP-enabled router may be considered the PNH for another BGP-enabled router, even though the BGP-enabled routers may be connected by one or more non-BGP enabled routers. The PNH typically specifies an Internet Protocol (IP) address of the router. Accordingly, the receiving router may associate the router specified as the PNH for routes originating from the specified router. Conversely, an FNH from the source router along a given route typically refers to a neighboring router physically coupled to the source router along that route. For example, the FNH for a route may specify a physical interface and media access control (MAC) address for the interface associated with the router. In some cases the PNH may be the same device as originated the MultiNexthop attribute, whereas in other cases the PNH may be a device on whose behalf the originating device is sending the MultiNexthop attribute (e.g., a route reflector or controller as the originating network device, with a PNH being a PE router).

The Flags field includes BGP Path-attribute flags. Flags may be set to 1101 to indicate Optional Transitive, Extended-length field. The attribute type code field contains an attribute type that identifies the BGP attribute as a MultiNexthop BGP attribute. The attribute type code for the MultiNexthop BGP attribute is yet to be assigned by IANA. Length field is a Two bytes field stating a length of the attribute value, in bytes.

NH-Flags field 302 contains a flag, e.g., a 16-bit flag. In some examples, only one bit is defined, all others are reserved.

R: Reserved

U: 1 means the MultiNexthop BGP attribute is being sent for Upstream-allocation, and the attribute describes desired forwarding state at the receiving BGP speaker.

U: 0 means the MultiNexthop BGP attribute is being sent for Downstream-allocation, attribute describes forwarding state at the advertising BGP speaker.

The U-bit being set in the NH-Flags field 302 indicates that this MultiNexthop BGP attribute describes what the forwarding semantics of an Upstream-allocated label at the receiving speaker should be. All other bits in NH-Flags are currently reserved, should be set to 0 by sender and be ignored by receiver. A MultiNexthop attribute with U=0 is called "Label-Next hop-Descriptor" role. A BGP speaker advertising a downstream-allocated label-route may add this attribute to the BGP route Update, to "describe" to the receiving speaker what the label's forwarding semantics at the sending speaker is.

The PNH length field advertises a PNH-address length in bits that is advertised in a NEXT_HOP or MP_REACH_NLRI attribute of the same BGP message. The PNH length field may be used to sanity-check the MultiNexthop BGP attribute. The PNH length field may advertise/32 or/128 as the address length, for example. The Advertising PNH address field identifies a device that added the MultiNexthop attribute to the BGP update route advertisement. When adding a MultiNexthop attribute to an advertised BGP route, the BGP speaker must put the same next-hop address in the Advertising PNH address field as the BGP speaker put in the Next hop field inside a NEXT_HOP attribute or MP_REACH_NLRI attribute of the same BGP message. Any speaker that changes the PNH while re-advertising this route should remove the MultiNexthop-Attribute in the re-advertisement. The speaker may, however, add a new MultiNexthop-Attribute to the re-advertisement; while doing so the speaker must record in the "Advertising-PNH address" field the same next-hop address as used in NEXT_HOP field or MP_REACH_NLRI attribute. A speaker receiving a MultiNexthop-attribute should ignore the attribute if the next-hop address contained in Advertising-PNH field is not the same as the next-hop address contained in NEXT_HOP field or MP_REACH_NLRI field of the BGP message. If the Advertising PNH is not the same as the PNH specified by the BGP update route advertisement in which the MultiNexthop attribute is carried, then the receiving network device is notified that the BGP update route advertisement has traversed nodes that do not support the MultiNexthop-Attribute mechanisms described herein. A receiving router that does not support the MultiNexthop Attribute may list a next hop of "Self" during the BGP route re-advertisement.

A value of the number of next hops indicated in Num-Next hops field will be greater than one if the next hops are to be used for equal cost multipath (ECMP) or fast reroute (FRR).

The MultiNexthop BGP attribute 300 also includes information specifying multiple next hops and information expressing respective forwarding semantics for the multiple next hops. For example, MultiNexthop BGP attribute 300 includes a Next hop Forwarding Semantics TLV field containing one or more Next hop Forwarding-Semantics TLVs 310. A type field may be a set of octets of bits associated with identifying a type, a length field may be a set of octets of bits associated with identifying a length of a value field, and the value field may be a set of sub-TLVs providing information. For example, each Next hop Forwarding-Semantics TLV 310 includes a set of bits that specifies a next hop leg's forwarding action, e.g., a "FwdAction" with an associated Next hop. Example types of actions defined by Next hop Forwarding-Semantics TLVs are given below.

Figure 5:
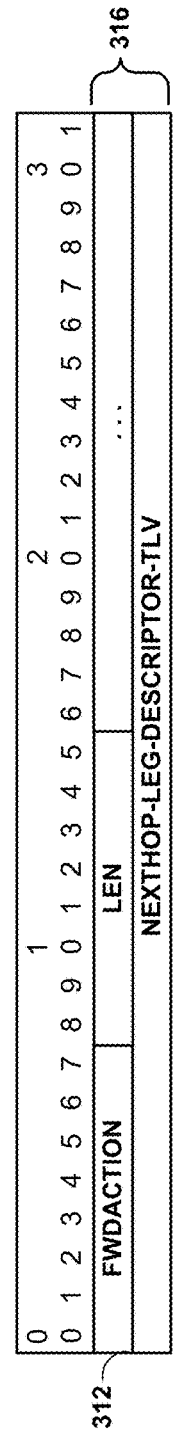
FIG. 5 is a block diagram illustrating an example format for Next hop Forwarding Semantics type-length-value (TLV) of FIG. 4 in further detail.

FIG. 5 is a block diagram illustrating an example format for Next hop Forwarding Semantics TLV 310 of FIG. 4 in further detail. The "Next hop-Leg" field of Next hop Forwarding Semantics TLV 310 takes appropriate values based on the FwdAction field 312. The FwdAction field 312 expresses a forwarding semantic for the next hops expressed in the NHopAttributes Sub-TLVs (not shown in FIG. 5) of the Next hop-Leg Descriptor TLV 316. Example FwdAction field values and Meanings:

1 Forward
2 Pop-And-Forward
3 Swap
4 Push
5 Pop-And-Lookup

In some examples, FwdAction 1 is applicable for both IP and MPLS routes, while FwdActions 2-5 are applicable for MPLS routes only. The "Forward" action means forward the IP/MPLS packet with the destination FEC (IP-dest-addr/MPLS-label) value unchanged. For IP routes, this is the forwarding-action given for next-hop addresses contained in BGP path-attributes: Next hop (code 3) or MP_REACH_NLRI (code 14). For MPLS routes, usage of this action is explained in further detail below when Upstream-label-allocation is in use. Pop-and-Forward action means to pop (remove) a label from a packet and forward the packet. Swap action means to swap a first label for a second label from the packet. Push means to push a label onto the packet. The "Pop-And-Lookup" action may result in popping a label from a received packet and performing an MPLS-lookup or an upper layer (e.g., IP layer) lookup, depending on whether the label that was popped was the bottom of stack label. Next hop Forwarding Semantics TLV 310 also includes a Next hop-Leg Descriptor TLV 316 that includes information describing various attributes of the Next hop-legs that the FwdAction is associated with.

Figure 6:
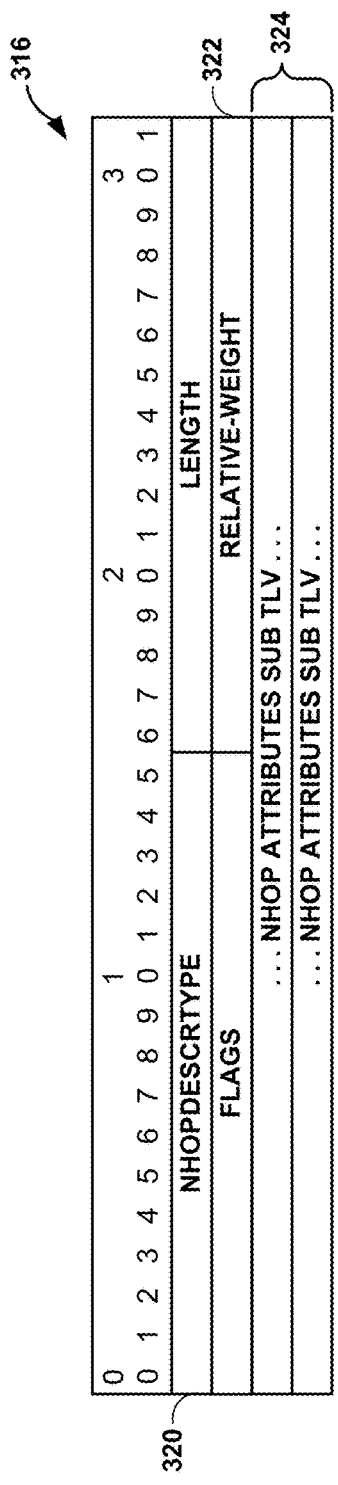
FIG. 6 is a block diagram illustrating an example format for a Next hop-Leg Descriptor TLV of FIG. 5 in further detail.

FIG. 6 is a block diagram illustrating an example format for a Next hop-Leg Descriptor TLV 316 of FIG. 5 in further detail. Next hop-Leg Descriptor TLV 316 includes a Nhop-DescrType field 320 that describes forwarding semantics shared by all the next hops advertised in the same BGP Update. Example NhopDescrType field values that may be included in NhopDescrType field 320 of a Next hop-Leg Descriptor TLV 316 and corresponding forwarding semantic meanings:

1 IPv4-next hop
2 IPv6-next hop
3 Labeled-IP-Next hop
4 IPv4-next hop with POA Identifier
5 IPv6-next hop with POA Identifier
6 Table-Next hop A length field indicates a Length of Next hop-Descriptor-TLV including Flags, Relative-Weight and all Sub-TLVs. A relative-weight field 322 specifies a relative order or preference associated with the next hop, which the receiver of the message uses to learn the relationship between the multiple next hops included in the MultiNexthop BGP attribute 300. For example, the Relative-Weight field 322 indicates an integer specifying relative order or preference, to use in the forwarding information base (FIB). A network device, such as network device 50, receiving the BGP update message having the MultiNexthop Attribute stores to its forwarding information 78 all of the next hop legs specified by the MultiNexthop Attribute. Network device 50 should set as "Active" in the forwarding information 78 all usable legs having the lowest relative-weight, based on the integer specified in the Relative-Weight field 322. All other next hop legs having higher relative-weights may be set as non-active alternate next hops. If multiple next hop legs exist with that weight, network device 50 may form an ECMP set of all the next hops having the lowest weight. If all of the Active next hops go down, then the forwarding component 58 uses one of the alternates, such as by selecting the next hop(s) having the next lowest relative-weight and setting the selected next hop(s) as Active.

Figure 7:
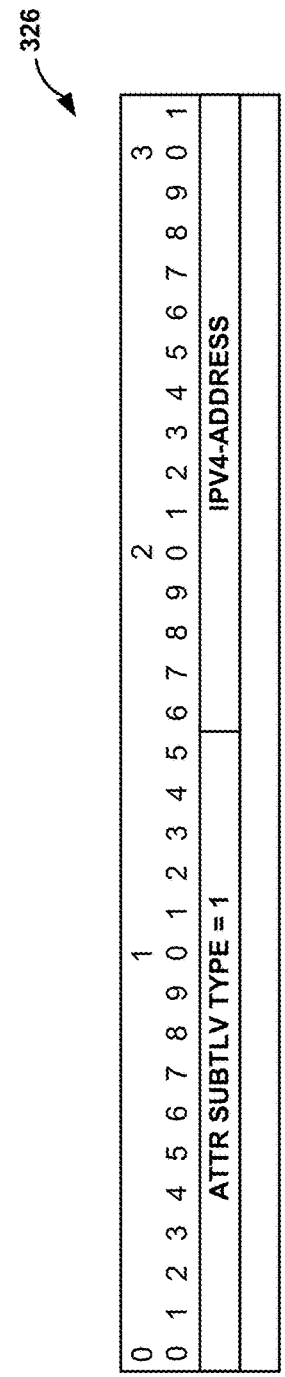
FIG. 7 is a block diagram illustrating an example format for an IPv4 Address sub-TLV 326, one example of a Next hop Attributes Sub-TLV.

Various example Next hop Attributes Sub-TLVs 324 may be included in Next hop-Leg Descriptor TLV 316. Next hop Attributes Sub-TLVs 324 describe forwarding semantics shared by all the next hops advertised in the same BGP Update. Some examples of Next hop Attributes Sub-TLVs 324 are described below in more detail in FIGS. 7-16. Example Sub-TLV types and corresponding Meaning:

1 IPv4-Address
2 IPv6-Address
3 Labeled-Next hop
4 IPv4-next hop with POA Identifier
5 IPv6-next hop with POA Identifier
6 Bandwidth
7 Load-Balance-Factor
8 Table-name
9 Forwarding-Context-name
10 Forwarding-Context-Route-Target FIG. 7 is a block diagram illustrating an example format for an IPv4 Address sub-TLV 326, one example of a Next hop Attributes Sub-TLV 324. IPv4 Address sub-TLV 326 specifies an IPV4 address of a next hop network device. This sub-TLV would be valid with Next hop-Forwarding-Semantics TLV with FwdAction of Pop-And-Forward or Forward. A network device 50 receiving a BGP update message containing a MultiNexthop attribute having an IPv4 Address sub-TLV 326 will store the IPv4 address of the next hop and the associated forwarding action to its stored routing information 62 and forwarding information 78 for the NLRI received in the BGP update message. The combination of <IPv4Addr, FwdAction> is thus used as Nexthop for the NLRI received in the Update. In the In the data plane, forwarding component 58 will use either a direct-interface or a tunnel to the specified IPv4 Address for forwarding packets to this IPv4 Address as the next hop.

FIG. 8 is a block diagram illustrating an example format for an IPv6 Address sub-TLV 330, one example of a Next hop Attributes Sub-TLV 324. IPv6 Address sub-TLV 330 specifies an IPV6 address. The IPv6-Address attribute sub-TLV would be valid with Next hop-Forwarding-Semantics TLV with FwdAction of Pop-And-Forward or Forward. A network device 50 receiving a MultiNexthop attribute having an IPv6 Address sub-TLV 330 will store the IPv6 address of the next hop and the associated forwarding action to its stored routing information 62 and forwarding information 78 for the NLRI received in the BGP update message. The combination of <IPv6Addr, FwdAction> is thus used as Nexthop for the NLRI received in the Update. In the data plane, forwarding component 58 will use either a direct-interface of network device 50 or a tunnel to the specified IPv6 Address for forwarding packets to this IPv6 Address as the next hop.

FIG. 9 is a block diagram illustrating an example format for a Labeled IP next hop attribute sub-TLV 334, one example of a Next hop Attributes Sub-TLV 324. "Labeled next hop" attribute sub-TLV would be valid with Next hop-Forwarding-Semantics TLV with FwdAction of Swap or Push. Labeled IP next hop attribute sub-TLV 334 specifies an IP address of a next hop to which to forward a packet, and the labeled IP next hop attribute sub-TLV 334 also specifies a label in label field 336 to swap or push in accordance with the associated forwarding action. For example, the label may be an MPLS label, e.g., in accordance with E. Rosen, "Using BGP to Bind MPLS Labels to Address Prefixes, Internet Engineering Task Force Internet-Draft, Sep. 16, 2016, draft-ietf-mpls-rfc3107bis-00 ("RFC 3107bis"). A network device 50 receiving a MultiNexthop attribute having the Labeled IP next hop attribute sub-TLV 334 stores in its routing and forwarding information 62, 78 the next hop's IP address, the associated MPLS label, and the associated forwarding action (swap or push). The network device would subsequently perform the specified forwarding action using the MPLS label upon received packets destined for the destination specified by the MultiNexthop attribute, and forward the packets having the MPLS label out an interface of network device 50 towards the next hop's IP address.

Figures 10, 11:
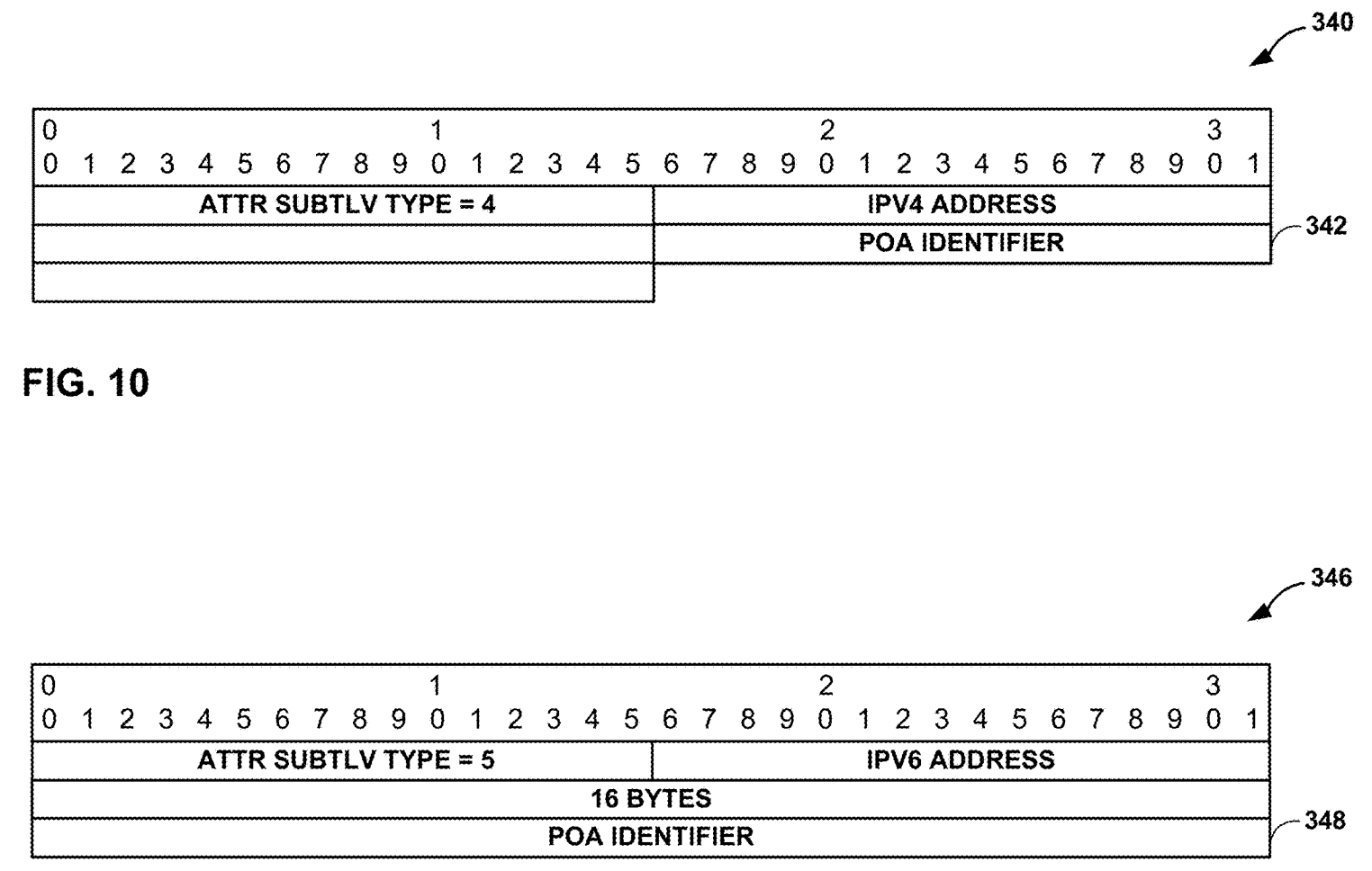

FIG. 10 is a block diagram illustrating an example format for an IPv4-Address with "Point-of-Attachment identifier" attribute sub-TLV 340. Sub-TLV 340 has an IPv4 Address field specifying an IPv4 address, and a Point-of-Attachment (POA) Identifier field 342 specifying a POA identifier. IPv4-Address with "Point-of-Attachment identifier" attribute sub-TLV 340 would be valid with Next hop-Forwarding-Semantics TLV 310 with FwdAction of Forward. The POA identifier identifies a point of attachment of the next hop at the node identified by the IPv4-Address. The value of the POA identifier is locally significant to the advertising node. For example, a POA identifier could identify a link-id of an un-numbered interface on the node for the link between the node and the next hop. A network device receiving a MultiNexthop attribute having the IPv4-Address with "Point-of-Attachment identifier" attribute sub-TLV 340 will use the POA identifier obtained from the "Point-of-Attachment identifier" attribute sub-TLV 340 in the forwarding plane to select the right interface/tunnel that connects the point of attachment to the sending node, and forward packets to toward the IPv4 address and the point of attachment identifier using the selected interface. This may be thought of as putting the packet on a tunnel that terminates on the specified POA at the remote node. In the example of multiple virtual nodes in a single chassis, the point of attachment may be a FPC identifier ("FPC-id"), and the sending and receiving nodes are virtual nodes in the single chassis.

FIG. 11 is a block diagram illustrating an example format for an IPv6-Address with "Point-of-Attachment identifier" attribute sub-TLV 346. Sub-TLV 346 includes an IPv6 Address field specifying an IPv6 address and a Point-of-Attachment (POA) Identifier field 348 specifying a POA identifier. IPv6-Address with "Point of Attachment identifier" attribute sub-TLV 346 would be valid with Next hop-Forwarding-Semantics TLV with FwdAction of Forward. The POA identifier identifies a point of attachment of the next hop at the node identified by the IPv6-Address. The value of the POA identifier is locally significant to the advertising node. For example, a POA identifier could identify a link-id of an un-numbered interface on the node. A network device receiving a MultiNexthop attribute having the IPv6-Address with "Point-of-Attachment identifier" attribute sub-TLV 346 will use the POA identifier obtained from the "Point-of-Attachment identifier" attribute sub-TLV 346 in the forwarding plane to select the right interface/tunnel that connects the point of attachment to the sending node, and forward packets to toward the IPv6 address and the point of attachment identifier using the selected interface. This may be thought of as putting the packet on a tunnel that terminates on the specified POA at the remote node. In the example of multiple virtual nodes in a single chassis, the point of attachment may be a FPC-id, and the sending and receiving nodes are virtual nodes in the single chassis.

FIG. 12 is a block diagram illustrating an example format for Available Bandwidth sub-TLV 350, one example of a Next hop Attributes Sub-TLV 324. The available bandwidth sub-TLV 350 specifies an amount of available bandwidth associated with the next hop indicated by the TLV. The "Bandwidth" attribute sub-TLV would be valid with Next hop-Forwarding-Semantics TLV with FwdAction of Forward, Swap or Push. In some examples, the available bandwidth of the link may be expressed as 4 octets in IEEE floating point format, units being bytes per second. In some examples, this sub-TLV would be valid in a MultiNexthop attribute having a U-bit that is reset (0), i.e., for downstream allocation. In these examples, a network device 50 receiving a MultiNexthop attribute having the Available Bandwidth sub-TLV 350 will store the specified amount of available bandwidth associated with the specified next hop to forwarding semantics state 64. In some examples, such as for upstream allocation, the Available Bandwidth sub-TLV 350 may be used by the receiver to compute the implicit balance percentage to use when load-balancing traffic across multiple different Next hop-Descriptor-TLVs. In these examples, a network device 50 receiving a MultiNexthop attribute having the Available Bandwidth sub-TLV 350 may install the specified amount of available bandwidth associated with the specified next hop to routing information 62, and routing component 56 may in turn program forwarding information 78 of forwarding component 58 to include this information.

FIG. 13 is a block diagram illustrating an example format for a Load balance factor attribute sub-TLV 354, one example of a Next hop Attributes Sub-TLV 324. The Load balance factor attribute sub-TLV 354 specifies a load balance weighting (e.g., percentage) associated with the next hop indicated by the TLV. The "Load-Balance-Factor" attribute sub-TLV would be valid with Next hop-Forwarding-Semantics TLV with FwdAction of Forward, Swap or Push. This is the explicit "balance percentage" requested by the sender, for unequal load-balancing over these Next hop-Descriptor-TLV legs. This balance percentage would override the implicit balance percentage calculated using "Bandwidth" attribute sub-TLV. That is, if both the "Available-bandwidth" attribute sub-TLV and the "Load-Balance-factor" attribute sub-TLVs are specified, the load-balance-factor takes precedence. In the downstream allocation case, a network device 50 receiving a MultiNexthop attribute having the Load balance factor attribute sub-TLV 354 will store the information specified by the Load balance factor attribute sub-TLV 354 to forwarding semantics state 64 and will use the information specified by the Load balance factor attribute sub-TLV 354 as informational for selecting a next hop from among a plurality of next hops to a destination.

In the upstream allocation case, a network device 50 receiving a MultiNexthop attribute having the Load balance factor attribute sub-TLV 354 will do unequal cost multipath (UCMP) load balancing across the next hops having load balance factor attributes defined. For example, the network device 50 will install in routing information 62 and forwarding information 78 an entry having an IP address for the next hop, the load balance factor weighting, and the forwarding action for the next hop. Upon receiving network traffic destined for the destination, the network device 50 will forward packets toward the IP address for the next hop in accordance with the load balance factor weighting and the forwarding action.

Figure 14:
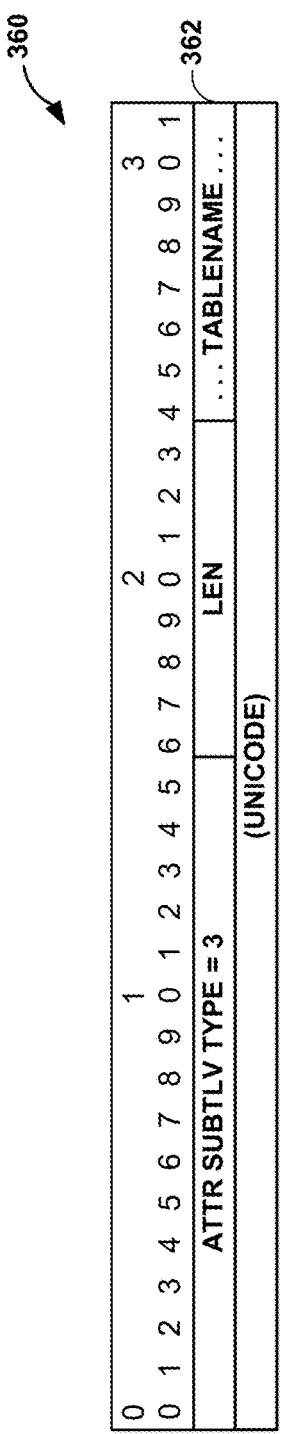
FIG. 14 is a block diagram illustrating an example format for a Table name attribute sub-TLV.

FIG. 14 is a block diagram illustrating an example format for a Table name attribute sub-TLV 360, one example of a Next hop Attributes Sub-TLV 324. The Table name attribute sub-TLV would be valid with a Next hop descriptor type 6 "Table-Nexthop" and Next hop-Forwarding-Semantics TLV with FwdAction of Pop-And-Lookup. In the upstream allocation case, a network device 50 receiving a MultiNexthop attribute having the Table name attribute sub-TLV 360 will create a forwarding-table (e.g., in routing information 62 and/or forwarding information 78) having the table name specified in the "tablename" field 326. The Table name attribute sub-TLV 360 is applicable when the MPLS VPN-UNI address family is used as an API to access and program the MPLS FIB on a network device. In one example, an application (which may be, for example, a network controller) can instruct the network device to create a forwarding-table by name "foo.inet.0", and then send a route for label "L1" with next hop pointing to name "foo.inet.0". This would mean that L1 is an outer label of a label-stack and traffic arriving inside the label is IPv4 traffic. The application can install a different label L2, that points to foo.inet6.0. In these examples, the labels L1 and L2 may be considered context labels, and the receiving network device will pop the outer context label and look up the next label of the label stack in the forwarding table to which the context label points as the next hop. In some cases, not all network device platforms may have the capability to do such forwarding. Network devices that are unable to install the associated forwarding state can just keep the route in an "Unusable state", implying they do not support the requested API. As one example, Table name attribute sub-TLV 360 may be used by virtual nodes within a single-chassis router for upstream allocation.

In the downstream allocation case, a network device 50 receiving a MultiNexthop attribute having the Table name attribute sub-TLV 360 may store the information from the sub-TLV 360 to forwarding semantics state 64. This information will tell the receiving network device 50 what forwarding-table the label is pointing to, which may be useful for visualizing the network, for example.

Figure 15:
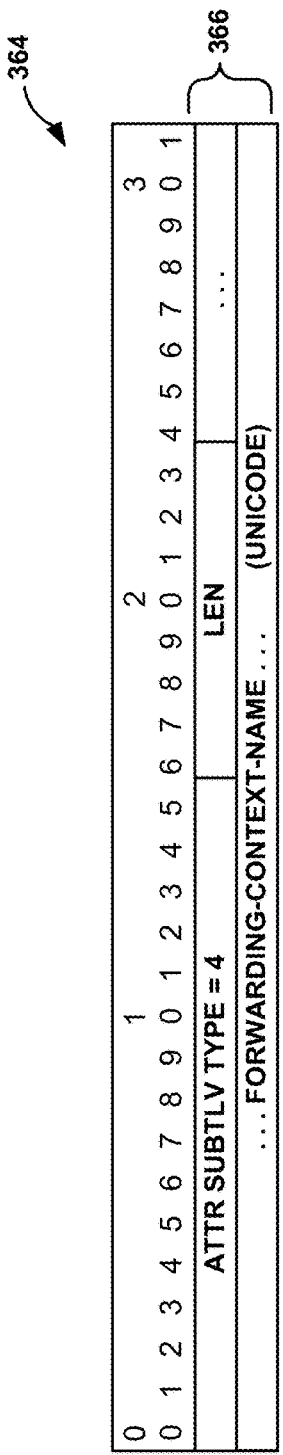
FIG. 15 is a block diagram illustrating an example format for a Forwarding-context name attribute sub-TLV.

FIG. 15 is a block diagram illustrating an example format for a Forwarding-context name attribute sub-TLV 364, one example of a Next hop Attributes Sub-TLV 324. The Forwarding-Context name attribute sub-TLV 364 would be valid with a Next hop descriptor type 6 "Table-Nexthop" and Next hop-Forwarding-Semantics TLV with FwdAction of Pop-And-Lookup. In the upstream allocation case, a network device 50 receiving a MultiNexthop attribute having the Forwarding-context name attribute sub-TLV 364 will store the next hop and the forwarding semantics specified by the MultiNexthop attribute to a forwarding information base of network device 50 specified by the forwarding-context name. As in the example described with respect to FIG. 14, if the application will use the same label L1 to point to the routing-instance "foo", and caters to both IPv4, IPv6 types of traffic, the application can send a route to the network device with "fwd-context-name" instead of specific "route-table-name". In this manner, the same Label L1 can be used to forwarding IPv4, IPv6, or International Organization for Standardization (ISO) traffic arriving underneath the label L1, in the context of foo.inet.0, foo.inet6.0 or foo.iso.0 according to the traffic-type.

In the downstream allocation case, a network device 50 receiving a MultiNexthop attribute having the Forwarding-context name attribute sub-TLV 364 may store the information from the sub-TLV 364 to forwarding semantics state 64. This information will tell the receiving network device 50 what forwarding-context name the label is pointing to, which may be useful for visualizing the network, for example.

FIG. 16 is a block diagram illustrating an example format for Forwarding-context Route-Distinguisher attribute sub-TLV 368, one example of a Next hop Attributes Sub-TLV 324. The "Route-Distinguisher identifying the Forwarding-Context" attribute sub-TLV 324 would be valid with a Next hop descriptor type 6 "Table-Nexthop" and Next hop-Forwarding-Semantics TLV with FwdAction of Pop-And-Lookup. The "Route-Distinguisher identifying the Forwarding-Context" attribute sub-TLV 324 identifies the routing instance for the receiving network device to use for the forwarding context. For example, the network device 50 receiving a MultiNexthop attribute having the Forwarding-context Route-Distinguisher attribute sub-TLV 368 will pop the outer label and look up an inner label in a private forwarding information base of the network device 50 that is associated with the route-distinguisher.

In the downstream allocation case, a network device 50 receiving a MultiNexthop attribute having the forwarding-context name attribute sub-TLV 368 may store the information from the sub-TLV 368 to forwarding semantics state 64. This information will tell the receiving network device 50 what forwarding-context name the label is pointing to, which may be useful for visualizing the network, for example.

The techniques of this disclosure may be used in one or more use cases. The following describes several examples of use cases for these techniques. As one example, in general, for unlabeled or labeled service-routes, an egress node can use this attribute to advertise multiple "forwarding exit end-points" with desired ECMP/UCMP load-balancing or order-of-preference-in-FIB behavior. As another example, in the downstream label allocation case, the receiving speaker can benefit from the downstream-allocated information in one or more of the following ways, for example:

1. For a Prefix, a label with FRR-enabled next hop-set can be preferred to another label with a next hop-set that does not provide FRR.

2. For a Prefix, a label pointing to 10 G next hop can be preferred to another label pointing to a 1 G next hop.

3. Set of labels advertised can be aggregated, if they have same forwarding semantics (e.g. VPN per-prefix-label case).

As a further example, in the Upstream label allocation case, the receiving speaker's forwarding-state can be controlled by the advertising speaker, thus enabling a standardized application programming interface (API) to program desired MPLS forwarding-state at the receiving node. Further details of the BGP protocol extensions required for signaling upstream-label allocation are described below.

The following describes example error handling procedures. When the U-bit is Reset (set to value 0), this attribute is used to qualify the label advertised by the BGP-peer, i.e., provide contextual information that pertains to the label. If the value in the attribute is syntactically parse-able, but not semantically valid, the receiving speaker should deal with the error gracefully and without tearing down the BGP session. When the U-bit is Set (set to value 1), this attribute is used to specify the forwarding action at the receiving BGP-peer. If the value in the attribute is syntactically parse-able, but not semantically valid, the receiving speaker should deal with the error gracefully by keeping the route hidden and not act on it, and should not tear down the BGP session.

This disclosure also describes techniques for creating virtual private MPLS-forwarding layers using a new BGP family, and gives example use-cases on how these private forwarding-layers can be used. The new BGP family can be used for signaling upstream allocation as described above, including for upstream label allocation.

The MPLS-forwarding-layer in a core network (e.g., core network 10) is a shared resource. The MPLS FIB stored at nodes in this MPLS-forwarding-layer contains labels that are dynamically allocated and locally significant at that node. For some use cases like upstream-label-allocation, in accordance with the techniques of this disclosure, network devices such as PE router 20 are configured to create virtual private MPLS-forwarding-layers over this shared MPLS-forwarding-layer. This allows network devices such as PE routers 20 to install deterministic private label-values in the private-FIBs at nodes participating in this private forwarding-layer, while preserving the "locally significant" nature of the underlying shared "public" MPLS-forwarding-layer.

This disclosure describes a mechanism similar to a BGP VPN where the FEC is MPLS-Label, instead of an IP-prefix. This disclosure defines a two new address-families: (AFI: MPLS, SAFI: VPN-Unicast), (AFI: MPLS, SAFI: Unicast) and associated signaling mechanisms.

BGP speakers participating in the private MPLS FIB layer can create instances of "MPLS forwarding-context" FIBs, which are identified using a "Context-protocol-nexthop". The BGP speakers may advertise a Context-label in conjunction with the Context Protocol Nexthop (CPNH) using a new BGP address-family to other BGP speakers.

A provider's core network, such as core network 10 of FIG. 1, consists of a global-domain (default forwarding-tables in P and PE nodes) that is shared by all tenants in the network and may also contain multiple private user-domains (e.g., VRF route tables). The global MPLS forwarding-layer ("FIB layer") can be viewed as the collection of all default MPLS forwarding-tables. This global MPLS FIB layer contains labels locally significant to each node. The "local-significance of labels" gives the nodes freedom to participate in MPLS-forwarding with whatever label-ranges the nodes can support in forwarding hardware.

In some use cases, some applications using the MPLS-network may benefit from a "static labels" view of the MPLS-network. In other use cases, a standard mechanism to do upstream label-allocation provided by the techniques of this disclosure may be beneficial. The techniques of this disclosure allow the global MPLS FIB layer to remain intact, and builds private MPLS FIB-layers on top of the global MPLS FIB layer to achieve these requirements. The private-MPLS-FIBs can then be used by the applications as may be useful to that particular application. The private MPLS-FIBs need to be created only at those nodes in the network where predictable label-values (external label allocation) is desired. In some examples, this may be, e.g., P-routers that need to act as a "Detour-nodes" or "Service-Forwarding-Helpers" (SFH) that need to mirror service-labels.

In some examples, provisioning of these private MPLS-FIBs on nodes in a network can be a gradual process that can co-exist with nodes not supporting the feature described in this disclosure. These private-MPLS-FIBs can be stitched together using one or more of Context-labels over the existing shared MPLS-network tunnels, or 'private' context-interfaces to form the "private MPLS-FIB layer", for example, as described in further detail below.

An application can then install routes with desired label-values in the forwarding-contexts of this private MPLS FIB layer with desired forwarding-semantics.

The following describes example architecture for private MPLS forwarding layers. When MPLS-traffic arriving with private-labels is received by a network node having a private MPLS forwarding layer configured, the node does a lookup of the MPLS traffic in the correct private MPLS-FIB by virtue of either the MPLS traffic arriving on a "private-interface" attached to the FIB, or the MPLS traffic arriving on a shared-interface with a "context-label." The context-label is a locally-significant non-reserved MPLS-label installed in the global MPLS-FIB with forwarding semantic of "Pop and Lookup in private MPLS-FIB".

To send data traffic into this private MPLS FIB-layer, a sending node having an application making use of the private MPLS FIB-layer should use as a handle either a "context-label" advertised by a node or a "private-interface"

owned by the application to connect into the private MPLS FIB-layer/MPLS plane. The Context-Label is the only label-value the sending node's application needs to learn from the network, to use the private FIB-layer. The application can determine the value of the labels to be programmed in the private MPLS-FIBs.

In some examples, nodes in the network can be grouped into desired roles (e.g. Service-edge nodes or Top of Rack (TOR)-edge nodes) and an external allocator can direct route installations to these specific nodes by attaching the appropriate Route-Targets. For example, a PE router and service forwarding helper (SFH) mirroring its own labels to the PE router can be in a separate VPN, and a Route-Target-Constraint can be used to prohibit the mirrored service-labels from propagating to other nodes where mirroring is not required. In some examples, the external allocator may be a central controller, such as a software-defined networking controller.

In some examples, the private MPLS-FIBs can contain labels that act as transport-layer identifiers, that correspond to loopback interfaces, or peer-interfaces of P nodes in the network, for example. The scale (amount) of these labels may be proportional to a number of Service-Endpoints and Transport-Detour-points that participate in the private FIB-layer.

In some examples, the private MPLS-FIB of Service-Forwarding-Helper nodes contains labels that act as service-layer routes, that redirect service-layer labeled-traffic to Service-edge PE router. Load-balancing and Fast-reroute can be performed at these private-MPLS-FIBs. Even for traffic injected using a multiple label-stack, fast-reroute can be performed to protect against link or node failure.

The following defines certain terminology used in this disclosure. LSR: Label Switch Router. P-router: A Provider core router, also called a LSR. Detour-router: A P-router that is used as a loose-hop in a traffic-engineered path. PE-router: Provider Edge router, which may host a service (e.g., Internet service, L3VPN service, etc.). SE-router: Service Edge router. Same as PE. SFH-router: Service Forwarding Helper. A node helping an SE-router with service-traffic forwarding, using Service-routes mirrored by the SE. MPLS FIB: MPLS Forwarding table. Global MPLS FIB: Global MPLS Forwarding table, to which shared-interfaces are connected. Private MPLS FIB: Private MPLS Forwarding table, to which private-interfaces are connected. Private MPLS FIB Layer: The group of Private MPLS FIBs in the network, connected together via Context Labels. Context Label: Locally-significant non-reserved label pointing to a private MPLS FIB. Context next hop IP-address (CPNH): An IP-address that identifies the "Private MPLS FIB Layer". The combination of route distinguisher and CPNH (RD: CPNH) identifies a Private MPLS FIB at a node. Global nexthop IP-address (GPNH): Global Protocol Nexthop address, e.g., a loopback address of the network device used as transport tunnel end-point.

This disclosure sets forth new BGP families, routes and encoding as example mechanisms to enable the private forwarding layer functionality described herein. Although described for purposes of example in terms of BGP, in other examples, other protocols may be used for signaling the private forwarding layer.

This section describes example BGP routing constructs defined by this disclosure. This disclosure defines a new AFI: "MPLS", and two new BGP address-families. A first example address family is referred to herein as: "AFI: MPLS, SAFI: VPN-Unicast."

This address-family is used to advertise labels in private MPLS FIBs to routers that are connected using a common network-interface. In addition to a Route-distinguisher identifying the private-FIB-Layer (VPN) the private MPLS-FIB belongs to, this address-family will also be used to advertise the Context-Label that the receiving router can use to access the private MPLS-FIB. The Context-Label is required when the interface that network traffic bearing this address-family arrives on is a shared common interface that terminates into the global MPLS FIB. The Context-Label installed in the global MPLS-FIB points to the private MPLS-FIB. A second example address family is referred to herein as: "AFI: MPLS, SAFI: Unicast." This address-family is used to advertise labels in private-MPLS-FIBs to routers that are connected using a private network-interface. Because the interface is private, and terminates directly into the private-MPLS-FIB, a Context Label is not required to access the private MPLS-FIB. According to an example, the following types of routes are defined, for use by network nodes configured to use a private forwarding layer as described herein.

In some examples, a context next hop discovery route is originated by each speaker who has forwarding-context for the private MPLS-FIB layer. NLRI: Type1: RD: Context nexthop IP-address. The context next hop discovery route includes the following route attributes:
 a. The Multi-nexthop-attribute described herein containing forwarding semantic instructions to: Push Context Label towards Global protocol nexthop address; and
 b. A Route-distinguisher extended community, identifying the private FIB-layer.

The context next hop discovery route is originated by each speaker (network device) that has forwarding-context for the private MPLS-FIB layer. The combination of route distinguisher and context next hop (RD: context next hop) uniquely identifies the originating speaker. The context next hop address identifies the private-FIB-layer.

A speaker (re)advertising this route over a shared-interface should allocate a non-reserved label called the Context Label with a forwarding semantic of "Pop and Lookup in private MPLS FIB." In some examples, this label is advertised in the Multinexthop-attribute attached to the context next hop discovery route.

In some examples, network devices are configured to send and receive "Private Label" routes. The private label routes are used by a sending network device to install private MPLS labels to a private FIB of a receiving network device, for use in forwarding traffic using the private FIB layer.

Private label routes have NLRI: Type2: RD: Private-Label-Value: TunnelEndpointIPAddress. Private-Label-Value: The (upstream assigned) label value. TunnelEndpointIPAddress: Optional IP-address of tunnel-endpoint (loopback address) that this private-label leads to.

Attributes on this route may include:
 a. The Multi-nexthop attribute containing: "Forward to Context nexthop IP-address" and
 b. Route-Target extended-community, identifying the private FIB-layer.

The private label route installed in the private MPLS FIB can have any forwarding semantic needed by the application using this FIB layer (VPN). The label is advertised to other speakers in a "Private label route advertisement," which contains a Multi-nexthop attribute as described herein that contains instructions to perform the operation: Forward to context next hop address. The network device receiving this route will recursively resolve over the context next hop discovery route to determine the label stack to push when forwarding traffic, so that the MPLS packet reaches this private MPLS FIB.

The Route-distinguisher attached to the route is the route-distinguisher identifying the private MPLS FIB layer (VPN). The Private-label routes resolve over the context next hop route that belong to the same VPN.

Figure 17:
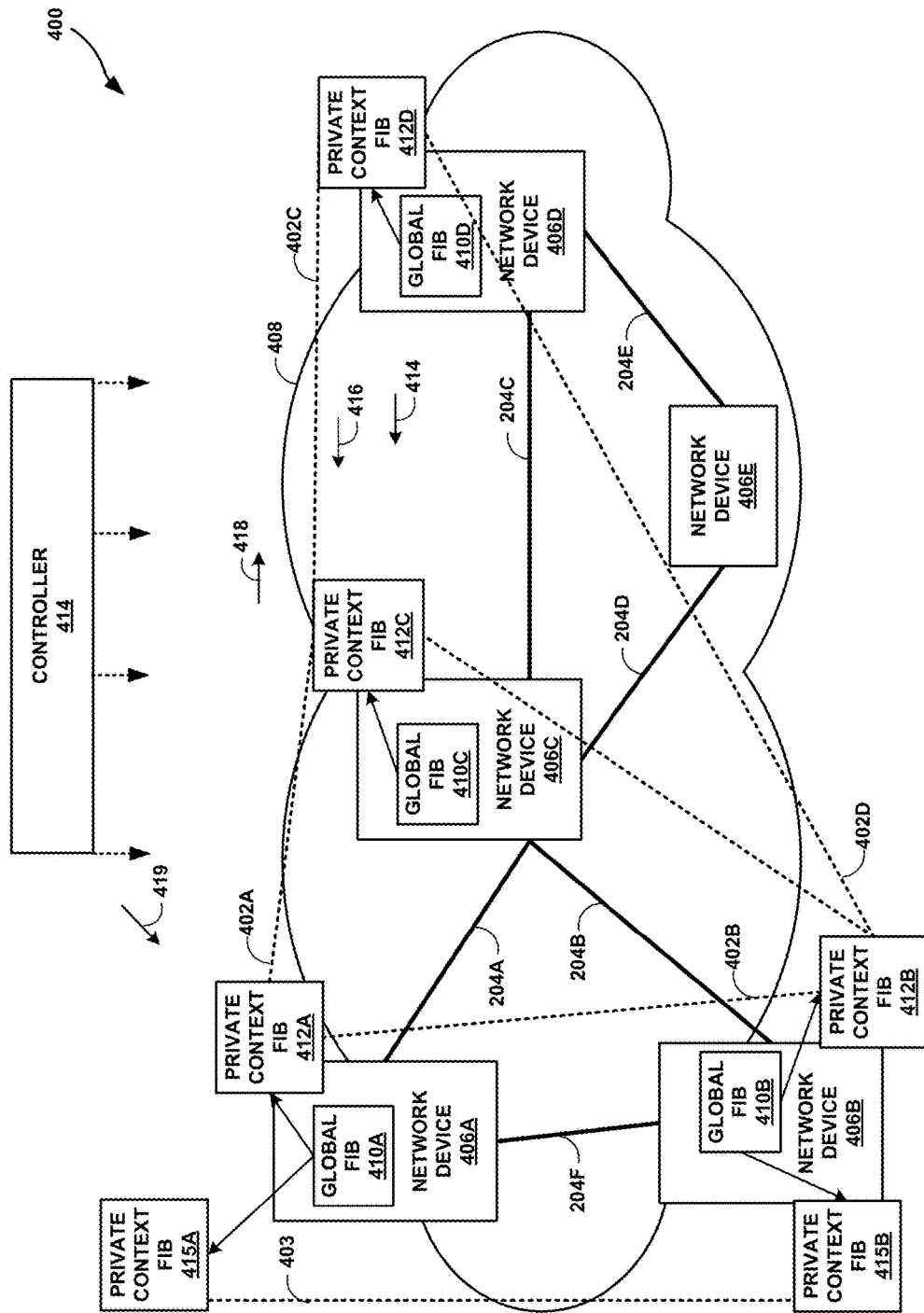
FIG. 17 is a block diagram illustrating an example system that includes network devices having global FIBs that form a global forwarding layer, and private context FIBs that form a private forwarding layer.

FIG. 17 is a block diagram illustrating an example system 400 that includes network devices 406A-406E ("network devices 406") having respective global FIBs 410A-410D ("global FIBs 410") that form a global forwarding layer, and respective private context FIBs 412A-412D (private context FIBs 412") that form a private forwarding layer. Each of network devices 406 that is configured for a particular private forwarding layer establishes a private context FIB 412 and advertises a context next hop discovery route message that specifies the private forwarding layer (identified by a CPNH), and a route distinguisher unique to the particular network device 406. The network devices receive the CPNH and the route distinguishers by configuration (e.g., from a network administrator or a controller 414 via configuration message 419). For example, network device 406D sends a context next hop discovery route message 414 to network device 406C, to indicate that network device 406D is participating in the private FIB layer.

The context next hop discovery route message 414 contains a multinexthop attribute with a forwarding semantic of push a label towards the global protocol next hop address (loopback address of tunnel endpoint), where the label is a context label (e.g., CL1), a locally-significant label allocated by network device 406D. So network device 406D advertises a (RD:CPNH) with a protocol next hop of GPNH. Network devices 406 exchange private label routes to program the private context FIBs, such as to program an application label AL1 and associated next hop (e.g., a service endpoint) into a private context FIB.

When the receiving node network device 406C wants to send a packet into this forwarding context, network device 406C has the identifier of CPNH and is aware it can reach the CPNH with a context label CL1 and PNH of GPNH. Network device 406C pushes the label stack L1, CL1, AL1 onto packet 418, where label AL1 is an application label, and outputs the packet bearing the label stack to tunnel 402C. The label L1 makes the packet reach network device 406D, and network device 406D looks up L1 in the global FIB 410D. Global FIB 410 has a forwarding entry with forwarding semantics to pop L1, and look up CL1, and CL1 is a table next hop to private context FIB 412D. Network device 406D pops label CL1 and looks up the inner application label AL1 in private context FIB 412D. AL1 may have any forwarding semantics that the application needs. For example, AL1 may point to any node in the network, such as a service endpoint (not shown in FIG. 17), or a VRF, for example.

In this manner, an application can install a route in private context FIB 412D, and a label AL1 points to the same resource in the network at each node in the network. The private forwarding layer is thus decoupled from the global forwarding layer, and provides increased scalability. If any of the network devices 406 advertises a service route, the network device 406 can bind the service route to the CPNH instead of the GPNH, and any network device 406 just needs to know its closest approach point for entering the private forwarding layer by using the CPNH. That is, the service route lists the CPNH as the protocol next hop, and can be used to reach a service endpoint via the private forwarding layer.

In some examples, network devices 406 may have multiple different private forwarding layers. For example, network devices 406A includes private context FIB 412A associated with a first private forwarding layer, and private context FIB 415A associated with a second private forwarding layer. In the example of FIG. 17, only network devices 406A and 406B participate in the second private forwarding layer, and the first private forwarding layer is connected by tunnel 402B, while the second private forwarding layer is connected by tunnel 403. Network device 406E does not participate in either private forwarding layer, and therefore network device 406E does not send any context next hop discovery route message or private route message.

Figure 18:
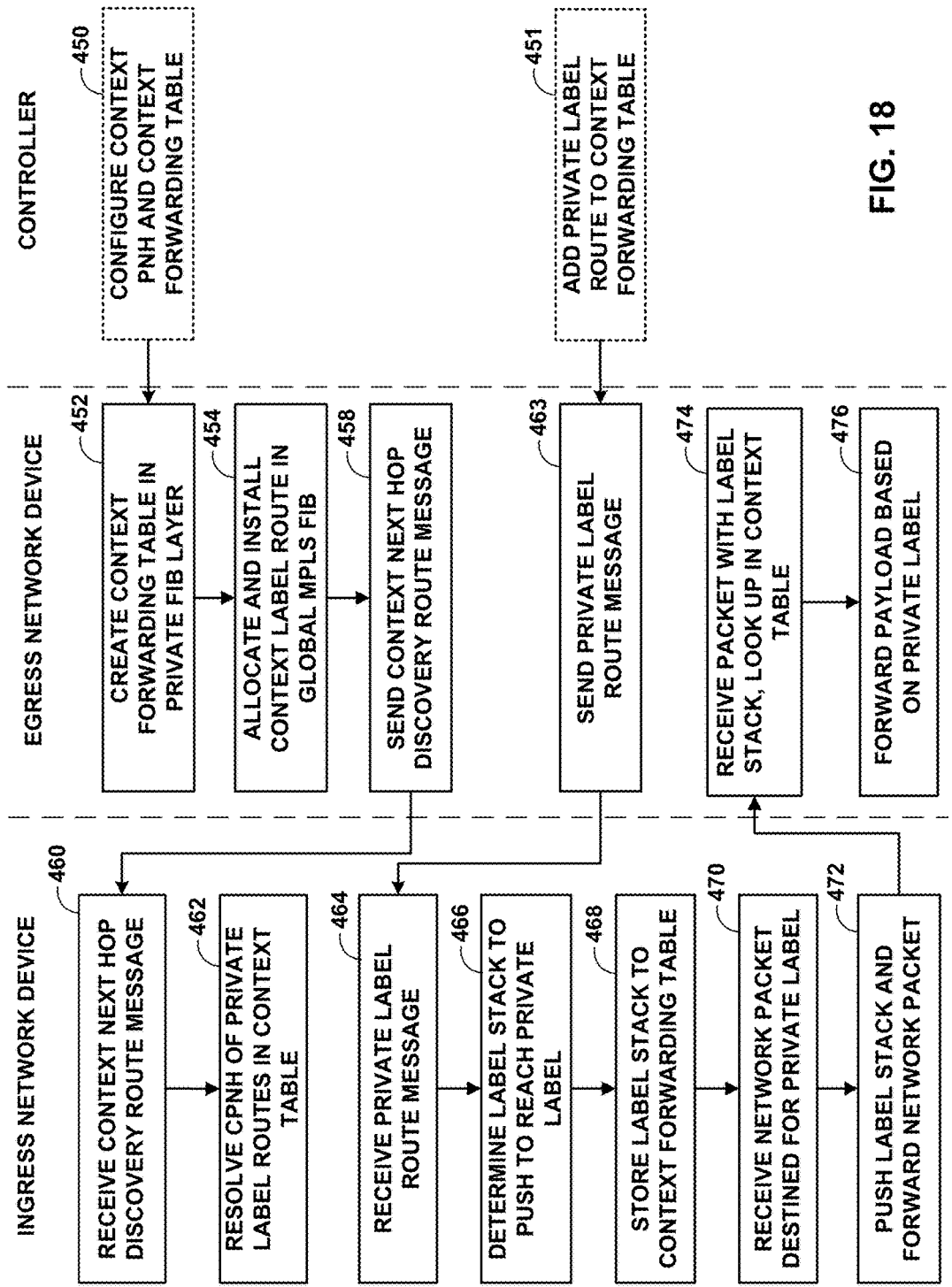
FIG. 18 is a flowchart illustrating example operation of network devices in using a private context forwarding layer, in accordance with one or more aspects of this disclosure.

FIG. 18 is a flowchart illustrating example operation of network devices in using a private context forwarding layer, in accordance with one or more aspects of this disclosure. FIG. 18 explains how each network device uses certain forwarding constructs and route formats defined in the previous sections. The ingress network device and egress network device of FIG. 18 may be network devices such as network device 50 of FIG. 2, network devices 406 of FIG. 17, or single-chassis router 1012 of FIG. 21-22, for example. In some examples, a controller, such as controller 414 of FIG. 17, sends a message to the egress network device of a network tunnel 402 configuring the context PNH and associated context forwarding table (450), such as by sending message 419. The context next hop address CPNH is an IP address that identifies the private FIB layer. The egress network device creates a context forwarding table (e.g., private context FIBs 412 of FIG. 17) in the private FIB layer associated with the CPNH received from the controller (452), and allocates and installs a context label route in its global MPLS FIB that points to the context forwarding table (454). For example, a BGP process 70 may create the context forwarding table. In some examples, this triggers the BGP process 70 of the egress node to advertise a context next hop discovery route to its BGP peers (458) (e.g., message 414). For example, the context next hop discovery route may specify the route distinguisher and context next hop address CPNH (RD:CPNH), where the context next hop address CPNH is the IP address that identifies the private FIB layer. Each of the network devices that are configured to participate in the private MPLS FIB layer advertise the same context-nexthop-address, but with a unique RD. The context next hop discovery route message has a Multi-nexthop-attribute with a "Push <Context-Label> towards GPNH" semantic, where GPNH is a loopback address at the Egress node to which the network has a transport-tunnel (e.g. LDP, RSVP).

In response to receiving the context next hop discovery route message (460), BGP process 70 of the ingress network device of the tunnel 402 uses the "CPNH->GPNH, context-label" information received on this route message to resolve a private label's CPNH, and updates its forwarding state (e.g., forwarding information 78, private context FIB 412) to reflect the private label's CPNH (462). That is, the arrival/change of a context next hop discovery route message may result in BGP process 70 performing (re)resolution of the private label routes of the context table.

The BGP process 70 of the egress network device also originates a private label route message 416 specifying a private label as a destination, a route distinguisher of an egress for the private label, a context protocol next hop associated with a private MPLS forwarding layer (i.e., private FIB layer), and a next hop for the private label (463). In some examples, the BGP process 70 of the egress network device may send the private label route in response to the controller adding the private label route to the context forwarding table of the egress network device (451). For example, the private label route may be for RD:L1:SEP1 where SEP1 is a service-endpoint IP-address at the node, L1 is the private label value identifying the service-endpoint. This private label route has a Protocol nexthop of CPNH. The private label routes are used by a sending network device to install private MPLS labels to a private FIB of a receiving network device, for use in forwarding traffic using the private FIB layer. The RD:L1:SEP values in prefix can be varied to denote different Egress network device, or different tunnels to same SEP, or different SEPs at the same Egress network device. The steps 450 and 451 performed by the controller are indicated as optional. In some examples, the context PNH, context forwarding table, and private label routes may be added by configuration, e.g., by an agent or administrator.

At the ingress network device of a tunnel 402, the ingress network device receives the private label route message (464). The Service routes specified by the private label route message bind to these tunnels signaled by the egress network device by virtue of having a Multi-nexthop attribute that has RD:SEP1 as the Protocol Nexthop. Using recursive resolution (RD:SEP1 over CPNH over GPNH), BGP process 70 of the ingress network device determines the label stack to push to reach RD:SEP1 (466), and stores the label stack to the context forwarding table (468). The context forwarding table may already exist, e.g., by configuration. The ingress network device subsequently receives a network packet having a private label, or originates a network packet having the private label (e.g., SEP) (470), and pushes the context label stack onto the packet (encapsulates the packet with an MPLS header having the label stack) and forwards the network packet bearing the context label stack and the inner private label (472). Receiving the network packet is not the result of storing the label stack to the context forwarding table, but FIG. 18 describes how the operation occurs when receiving the network packet follows storing the label stack to the context forwarding table.

The egress node receives the network packet having the context label stack and inner private label, and, assuming the transport label is already penultimate hop-popped, the egress pops the context label, looks up the private label in the context forwarding table (474). Based on the lookup, the context forwarding table instructs the egress network device to pop the private label and forward the payload to a resource identified by the private label. The egress network device pops the private label and forwards the payload (476).

For a LSR in the private FIB layer re-advertising with nexthop-self a received private-label route RD:L1:SEP1, no new labels are allocated in the private FIB. The same Label L1 is installed in the private-MPLS-FIB with a "Forward to CPNH" operation, such that value of L1 does not change while the packet traverses multiple nodes in the private-MPLS-layer.

Various example use cases are described below. One example is a Service Forwarding Helper (SFH) use case. In this example, a service node can mirror MPLS labels contained in its FIB to a private context forwarding table at a SFH node. To do this, the service node advertises a private label route with RD:L1 to the SFH node. The private label route is advertised with a Multi-nexthop attribute with one or more legs that have a "Forward to SEPx" semantics, where SEPx is one of many service end-point at the Service-node.

In some examples, this can enable a service edge virtual node to mirror local MPLS-forwarding state to a remote service-forwarding helper virtual node for optimal-forwarding in virtualized environments, as described in further detail below, such as for signaling an optimal fabric interface.

In some examples, the techniques of this disclosure may provide an ability of ingress to steer MPLS traffic through specific detour loose-hop nodes using a static, predictable label stack. The only thing a network device needs to know is what is the nearest entry point into the private forwarding layer and what is the CPNH to use for the private forwarding layer. The network devices only have to allocate one label from the global label space and can then access the whole label space of the private forwarding layer. The private forwarding layer provides a predicable label stack, because they are not locally significant and dynamically labeled as in the global forwarding layer of global FIBs 410. The predictable, static label stack is not taken from the global forwarding layer, but rather from the private forwarding layer.

In some examples, the techniques of this disclosure may be used to provide predictable (external-allocator determined) label-values, using a standard BGP-family as the application programming interface (API). This would avoid device-specific-API dependencies for external-allocators (controller software), and vice-versa. That is, as an API based on this technique is device-independent, and is not limited by the particular label address space available on network devices made by different device manufacturers. For example, the external allocator may be controller 414. Controller 414 can use the BGP address family defined herein as the API. In some examples, controller 414 may send private label routes to the network devices 406 to program routes to private context FIBS 412, 415 for one or more private forwarding layers.

As another example, the techniques may provide label-spoofing protection at edge-nodes, by virtue of using separate MPLS-forwarding-contexts. The only common resource used are the transport tunnels from one network device to another. Within the private FIB are the labels that are installed by a given application, and the network devices 406 cannot inject labels or routes between private FIBs. The techniques of this disclosure may provide added security between different applications, and may avoid label-spoofing security risks.

As another example, the techniques of this disclosure may allow private-MPLS label usage to spread across multiple-domains/Autonomous Systems (ASes) and may work seamlessly with existing technologies like Inter-AS VPN option C, for example. The techniques of this disclosure do not require the new BGP address family to be deployed on all network devices in the network; rather, in some cases only certain network devices may be configured to use a private forwarding layer as described herein, whereas other network devices (e.g., network device 406E) may not use the private forwarding layer, but can forward traffic to network devices that do use the private forwarding layer at which point those configured network devices can inject traffic into the private forwarding layer.

Figure 19:
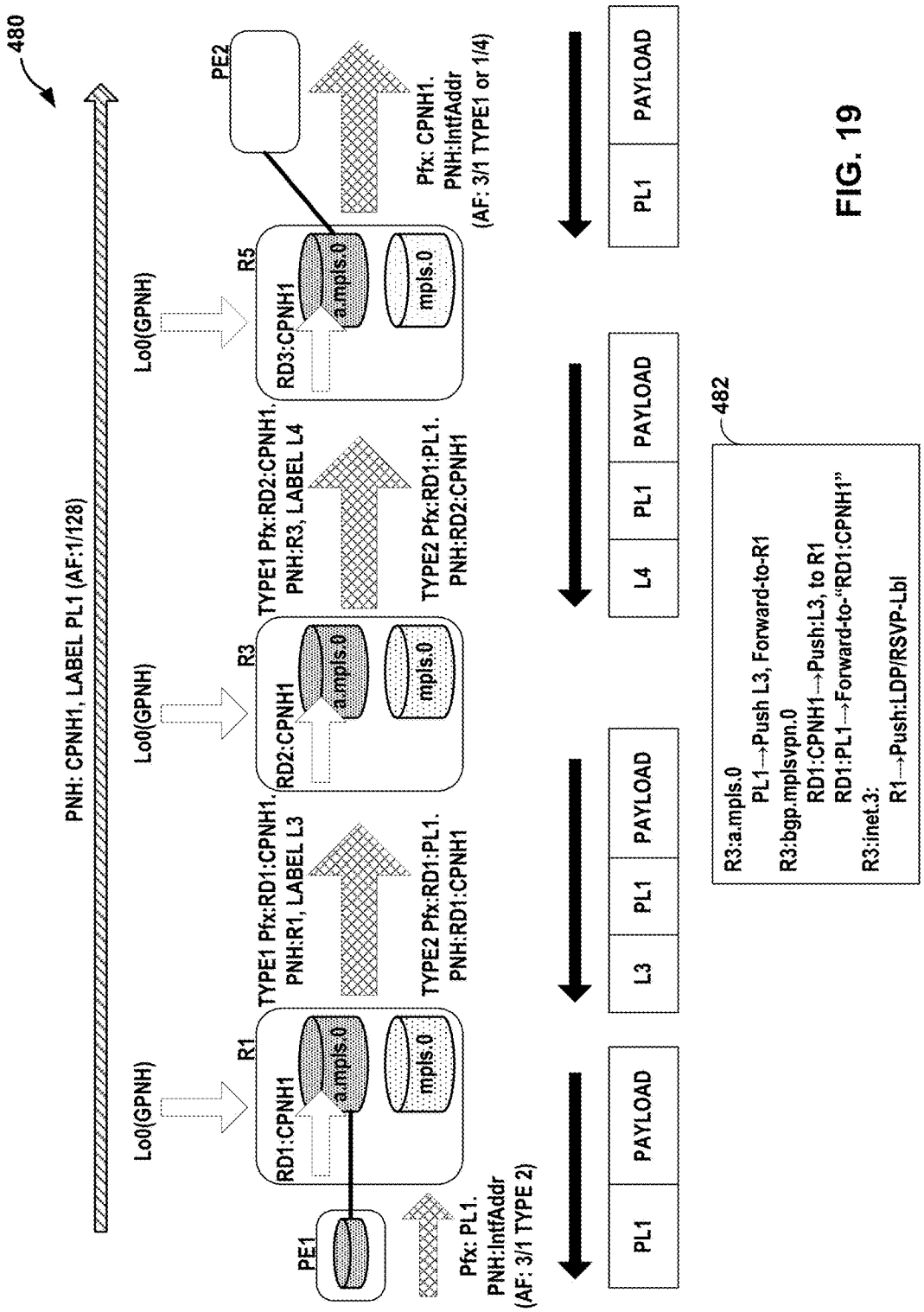
FIG. 19 is a block diagram illustrating a system depicting network devices that use service routes scaling by binding service routes to a private MIMS plane.

FIG. 19 is a block diagram illustrating a system 480 depicting network devices that use service routes scaling by binding service routes to a private MPLS plane. System 480 includes transit routers R5, R3, R1, an egress PE router PE1 and an ingress PE router PE2, where network traffic flows from PE2 to PE1 as shown by the arrows in the lower portion. A packet of the network traffic having a payload is forwarded using private labels, which allows the packet to enter the context FIB label space and use context labels L4 and L3 by transit routers R5, R3, R1.

Routers R1, R3, and R5 advertise context next hop discovery routes (referred to as "type 1" routes in FIG. 19), and private label routes (referred to as "type 2" routes in FIG. 19). Routing table 482 illustrates forwarding state stored in various routing and forwarding tables of router R3. Routers store global MPLS FIBS mpls.0 that stores locally allocated labels, and MPLS context FIBs a.mpls.0 that stores context labels. The global MPLS FIBs contain routes that point to the MPLS context FIB. The routers use context PNH "CPNH1" to identify the private FIB layer associated with a.mpls.0.

This can allow for service-routes scaling by binding the service routes to the private MPLS-plane. Routers use "Context-PNH, private-label" to identify a (unicast/anycast) POP of a service, instead of "PE-Lo0, PE-local-label", as depicted by the long arrow at the top of FIG. 19. Routers can create private MPLS forwarding-context per 'application'. The routers use the BGP procedures described herein to "stitch" these MPLS forwarding contexts to create a Private FIB layer (per application mpls-plane). The Private FIB layer is identified by "CPNH". An application's label-allocator (e.g., controller) can interact with the network only at the edge of mpls-plane, to install its private-Label entries. The network propagates application private labels throughout the private-mpls-plane. This may allow for taking a PE router out of service and putting a new PE router into service, and only the private label route needs to be updated, which the nodes in the MPLS layer (R1, R3, R5) can receive and resolve the CPNH.

Figure 20:
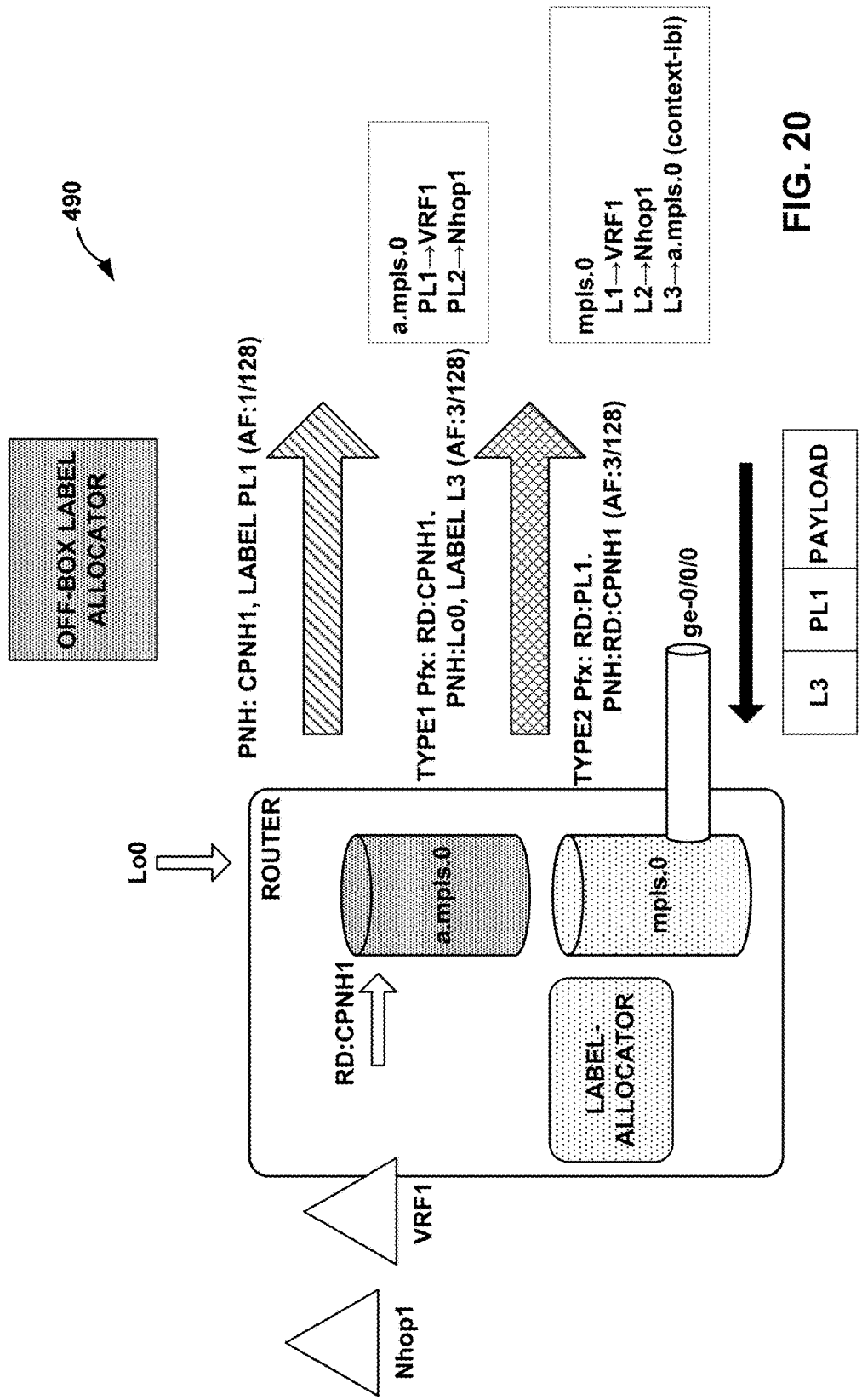
FIG. 20 is a block diagram illustrating a system in which a router has a global MIMS FIB and an MPLS context FIB.

FIG. 20 is a block diagram illustrating a system 490 in which a router having loopback address Lo0 has a global MPLS FIB mpls.0 that stores locally allocated labels, and an MPLS context FIB a.mpls.0 that stores context labels received from an off-box label allocator (e.g., a controller). FIG. 20 illustrates forward state stored in each of mpls.0 and a.mpls.0. Label L3 is a context label that points to a.mpls.0. a.mpls.0 contains private labels having next hops of VRF1 or Nhop 1. The router advertises a context next hop discovery route (referred to as a "type 1" route in FIG. 20), and a private label route (referred to as a "type 2" route in FIG. 20).

Some example aspects of this disclosure relate to packet forwarding in a single-chassis router having multiple cooperative virtual routing components operating as multiple distinct nodes from the perspective of network devices external to the single-chassis router. The virtual routing components, referred to herein as virtual nodes ("vNodes") each have an associated set of forwarding components, e.g., packet forwarding engines, of the single-chassis router. The forwarding components are coupled to one another by fabric links at fabric interfaces of the forwarding components, where the fabric links comprise a switch fabric for switching network packets between the forwarding components to enable the single-chassis router to forward externally-received network traffic to other external network devices.

The ingress vNode is the vNode by which data traffic ingresses (enters) a single-chassis router, and the egress vNode is the vNode by which data traffic egresses (exits) a single-chassis router. The techniques of this disclosure enable vNodes to avoid making additional fabric hops within a vNode when forwarding data traffic. To avoid making unnecessary fabric hops, the ingress vNode should send traffic to the egress vNode's forwarding component having the outgoing interface for that traffic toward its destination. The function of ensuring data traffic avoids additional fabric hops within a vNode is referred to herein as optimal fabric routing, and involves the vNodes sharing information with each other about optimal fabric paths (OFPs) that the vNodes have determined.

In general, the ability for vNodes to select an optimal fabric path to enable optimal fabric routing relies on the downstream vNode to signal optimal fabric path information, and the upstream node to use the optimal fabric path information for data forwarding. The manner in which the upstream node uses the optimal fabric path information may vary depending on where the network traffic is flowing to and from in the upstream-to-downstream direction (e.g., core-to-edge or edge-to-core). In some examples, the virtual nodes may use a private multi-protocol border gateway protocol (MP-BGP), single-hop interior BGP session for signaling the optimal fabric path information. The downstream vNode computes the optimal fabric path and incoming fabric interfaces (OFP Next hops) based on egress interfaces, and sends, via the BGP session, the OFP Next hops for any prefixes that are configured as requiring OFP. For example, a user may configure all routes or selectively choose route prefixes as requiring OFP. In some examples, prefixes such as MPLS labels and/or IP prefixes are supported by the vNode OFP functionality. MPLS labels are used for MPLS services, and IP prefixes are used for Internet and transport LSP path selection.

Figure 21A:
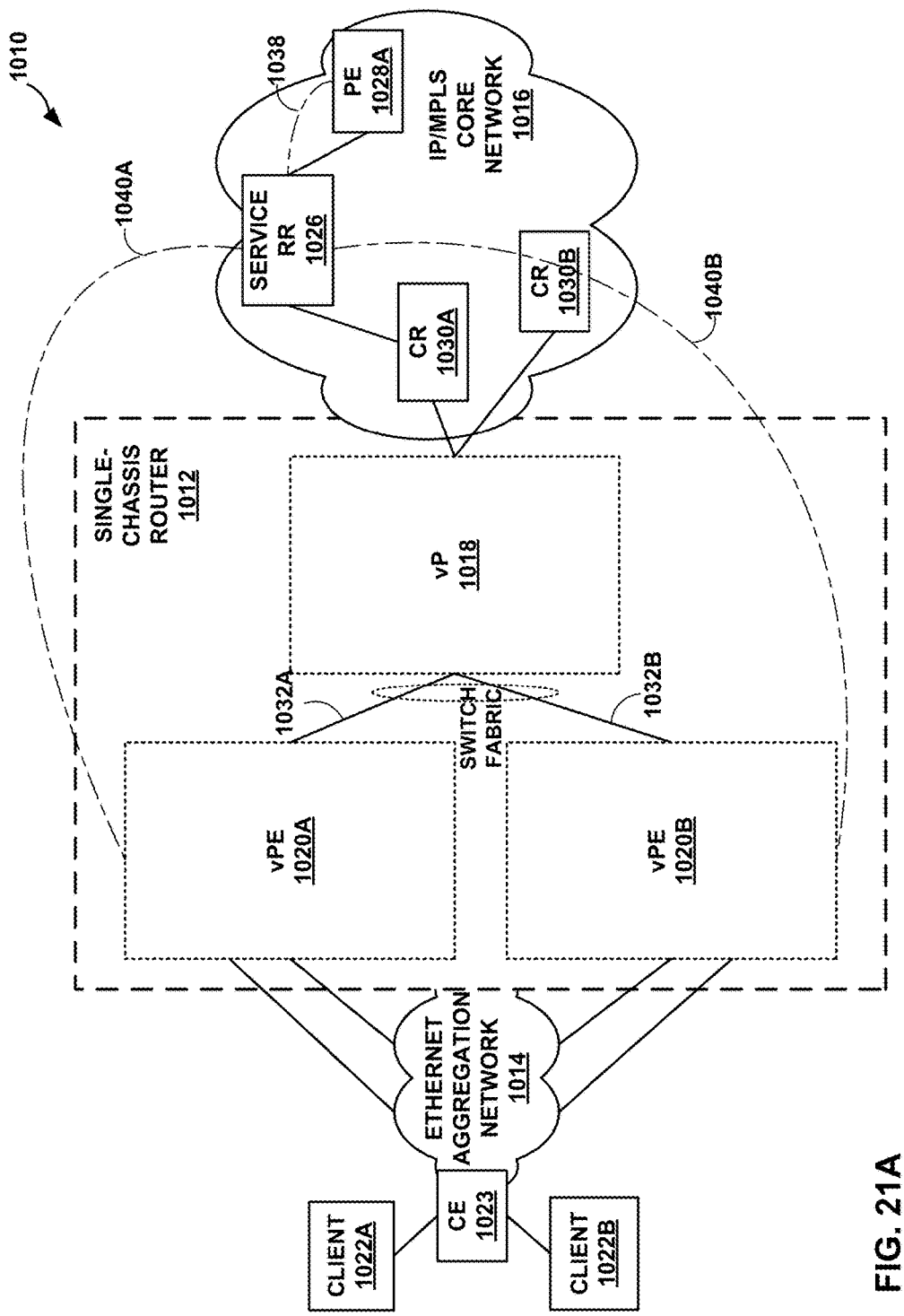
FIG. 21A is a block diagram illustrating an example network environment that includes a logical view of a single-chassis router configured in accordance with techniques described in this disclosure.

FIG. 21A is a block diagram illustrating an example network environment 1010 that includes a logical view of a single-chassis router configured in accordance with techniques described in this disclosure. For purposes of example, the techniques of this disclosure are described with respect to a simplified network environment 1010 of FIG. 21 in which single-chassis router 1012 communicates with core routers 1030A-1030B ("core routers 1030") to provide client devices 1022A-1022B ("client devices 1022") with access to services provided by devices in Internet Protocol (IP)/Multi-Protocol Label Switching (MPLS) core network 1016. Single-chassis router 1012 may exchange routing information with core routers 1030A-1030B to maintain an accurate representation of the topology of network environment 1010. Single-chassis router 1012 includes virtual provider edge (vPE) nodes 1020A-1020B ("vPEs 1020") and virtual core router (vP) node 1018, which are cooperative virtual routing components operating as multiple distinct nodes from the perspective of network devices external to single-chassis router 1012.

In accordance with the techniques of this disclosure, single-chassis router 1012 is a router having a single physical chassis, which is virtualized into multiple virtual network nodes (referred to as "vNodes") by portioning hardware resources of the router, such as PFEs. Single-chassis router 1012 includes multiple routing components (e.g., routing processes) and forwarding components (e.g., PFEs) that are physically coupled and configured to operate as separate logical routers. To core routers 1030 and CE router 1023 of network environment 1010, single-chassis router 1012 appears as multiple routing devices, specifically, virtual PE (vPE) router 1020A, vPE router 1020B, and virtual provider (vP) router 1018. For example, although single-chassis router 1012 includes a single chassis, from the perspective of core routers 1030, single-chassis router 1012 has multiple externally-advertised network addresses and maintains multiple peer routing sessions for each routing protocol maintaining peer routing sessions with each of the core routers 1030.

Figure 21B:
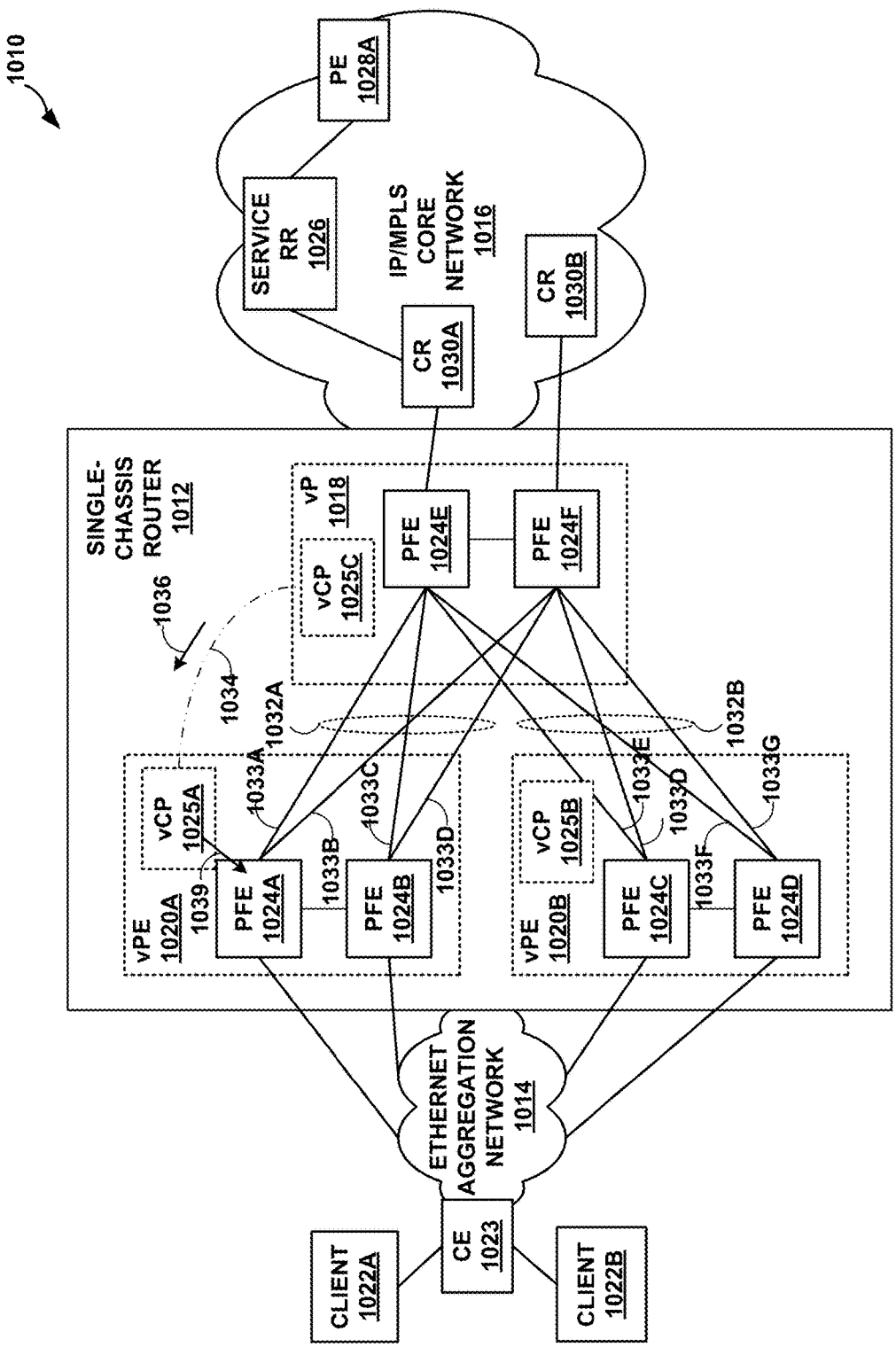
FIG. 21B is a block diagram illustrating the example network environment of FIG. 21A in further detail, in accordance with techniques described in this disclosure.

In the example of FIGS. 21A-21B, vP 1018 is a shared uplink that connects vPEs 1020A-1020B to IP/MPLS core network 1016. Shared uplink may be implemented using an MPLS LSR vNode instance for vP 1018. vPEs 1020 share uplink bandwidth.

The configuration of network environment 1010 illustrated in FIG. 21A is merely an example. Although not illustrated as such, IP/MPLS core network 1016 may be coupled to one or more networks administered by other providers, and may thus form part of a large-scale public network infrastructure, e.g., the Internet. Ethernet aggregation network 1014 may be viewed as an access network to the Internet. Service provider network 6 may provide computing devices coupled to client devices 1022A-1022B ("client devices 1022") with access to the Internet, and may allow the computing devices within customer networks (not shown) to communicate with each other. In another example, IP/MPLS core network 1016 may provide network services within the core of the Internet. In either case, IP/MPLS core network 1016 may include a variety of network devices (not shown) other than single-chassis router 1012, service route reflector (RR) 1026, provider edge (PE) router 1028A, and core routers 1030, such as additional routers, switches, servers, or other devices.

Client devices 1022 may be access nodes coupled to customer networks and subscriber devices. Client devices 1022 are clients of services provided by PE router 1028A via service RR 1026. In this example, service provider network includes client devices 1022 and customer edge (CE) router 1023 that provide subscriber devices with access to aggregation network 1014. In some examples, CE router 1023 may comprise a router that maintains routing information between subscriber devices and aggregation network 1014. CE router 1023, for example, may include Broadband Remote Access Server (BRAS) functionality to aggregate output from one or more client devices 1022 into a higher-speed uplink to aggregation network 1014.

Client devices 1022 may be devices associated with one or more customer networks (not shown) coupled to customer edge (CE) router 1023. In some examples, client devices 1022 may include computing devices, such as personal computers, laptop computers, handheld computers, workstations, servers, switches, printers, customer data centers or other devices, for example. In other examples, client devices 1022 may be endpoint devices such as a switch, a router, a gateway, or another terminal that operates as a demarcation point between customer equipment, such as subscriber devices, and service provider equipment. In one example, client devices 1022 may comprise a digital subscriber line access multiplexer (DSLAM) or other switching device. For example, client devices 1022 may be connected to one or more wireless radios or base stations (not shown) to wirelessly exchange packetized data with subscriber devices. client devices 1022 may comprise a switch, a router, a gateway, or another terminal that aggregates the packetized data received from the wireless radios to CE router 1023. In some examples, aggregation network 1014 may include an optical access network. For example, CE router 1023 may comprise an optical line terminal (OLT) connected to one or more client devices 1022 or optical network units (ONUS) via optical fiber cables.

A protocol next hop (PNH) generally refers to the next hop along a route as disseminated in accordance with a routing protocol, such as BGP. For example, a BGP-enabled router may be considered the PNH for another BGP-enabled router, even though the BGP-enabled routers may be connected by one or more non-BGP enabled routers. The PNH typically specifies an Internet Protocol (IP) address of the router. Accordingly, the receiving router may associate the router specified as the PNH for routes originating from the specified router. Conversely, an FNH from the source router along a given route typically refers to a neighboring router physically coupled to the source router along that route. For example, the FNH for a route may specify a physical interface and media access control (MAC) address for the interface associated with the router. In some cases, the PNH may be the device that originated the route advertisement, whereas in other cases the PNH may be a device on whose behalf the originating device is sending the route advertisement (e.g., a route reflector or controller as the originating network device, with a PNH being a PE router). Service route reflector (RR) 1026 reflects routes from core router 1030A to PE router 1028A, and from PE 1028A to core router 1030A. Transport LSP 1038 may be established between PE 1028A and service RR 1026, and in turn transport LSPs 1040A and 1040B ("transport LSPs 1040") are established between service RR 1026 and vPEs 1020A, 1020B, respectively. The transport LSPs 1040, 1038 provide transport for PE 1028A to provide services to clients 1022 of CE router 1023 via vPEs 1020. PE router 1028A is considered a multi-hop protocol next hop of vP 1018 of single-chassis router 1012.

Between two vNodes in single-chassis router 1012, one logical layer-3 link is provisioned that is visible to devices external to single-chassis router 1012. For example, in FIGS. 21A and 21B, these are aggregated fabric interface (AFI) links 1032A-1032B ("AFI links 1032"). Each of AFI links 1032 are layer-3 logical link constructs. AFI provides vNode to vNode connectivity. AFI links 1032 bundle those fabric interconnects that connect the same vNodes. AFI provide a single logical link connectivity between the vNodes, and could have many layer-1, layer-2, or layer-3 fabric bundling within, depending on implementation.

In the example of FIG. 21B, AFI links includes fabric interconnects 1033A-1033D, and AFI 1032B includes fabric interconnects 1033E-1033G (collectively, "fabric interconnects 1033"). Fabric interconnects terminate at fabric interfaces of one of PFEs 1024. The fabric interfaces have identifiers that are not generally advertised to devices external to single-chassis router 1012. The fabric interconnects 1033 are modelled as point-to-point Ethernet links between a pair of PFEs 1024. AFI and fabric interfaces (FIs) emulate point-to-point interfaces. AFI link 1032 end-points have user-configured IP-addresses. From a protocols perspective, AFI link 1032 end-points are used for control-session termination, and fabric interfaces are used as next hops that are exchanged in a control-session (e.g., OFP session 1034) for advertising optimal fabric paths within single-chassis router 1012, as described in further detail below. In some example implementations, fabric interconnect end-points (i.e., fabric interfaces) have auto-configured IP addresses. In other example implementations, IP addressing is not needed for fabric interfaces; rather, the fabric interfaces are unnumbered interfaces, and may be identified by a PFE identifier ("PFE-id") modeled as sub-network point of attachment (SNPA) or an MPLS label, for example. Fabric interface may be replaced with either "AFIx-node-ip-address, SNPA-id-for-pfe," or "AFIx-node-ip-address, MPLSlabel-for-pfe," where SNPA-id or MPLSlabel are unique, locally-significant identifiers in the scope of the AFI. In some examples, the PFE-id may be used as the SNPA/label and is unique across all AFIs in the single chassis router. The Multi-Nexthop attribute described herein supports signaling the fabric interface identifier as IP address, SNPA, or label, as a way to signal a "numbered-interface as next hop" or "unnumbered-interface as next hop" in BGP. Various examples are described herein with respect to fabric interface identifiers as IP addresses, but unnumbered interface identifiers may likewise be used in such examples.

In some examples, each of the bundled links and the member links may natively support IPv4, IPv6 and MPLS; that is, IP routing protocols and MPLS signaling protocols run natively on the member links 1033 and bundled AFI links 1032. The data traffic may be unicast and/or multicast. The AFI links 1032 may provide similar functionalities as provided by Ethernet interfaces, such as statistics and administrative control, for example. The AFI links emulated over the fabric interconnects may support Ethernet encapsulation, for example. The AFI connectivity (peers) and IP addresses of the AFIs may be user provisioned. The local and remote IP address of an AFI should be in the same subnet and should be unique across the network. In some examples, identifiers for the member-FI interfaces may be derived from AFI-connectivity and assigned to AFI. This membership association would be done by an administrative virtual machine of single-chassis router 1012 (not shown). The AFI links 1032 may also have cumulative bandwidth (link-speed) based on the bandwidth of the member fabric interconnects 1033, and may user configurable.

As described herein, the virtual nodes of single-chassis router 1012 share information with each other to enable the others to select fabric paths through the switch fabric of single-chassis router 1012 that avoid unnecessary fabric hops. The fabric paths that avoid unnecessary fabric hops may be referred to herein as "optimal fabric paths," although the fabric paths may not necessarily be considered "optimal" in other ways.

This document addresses optimal fabric path (OFP) sharing for inter-virtual node links, shared uplink (SU), and for certain services. As described herein, a plurality of virtual nodes in a single-chassis router may send optimal fabric hop information to each other for use in route resolution, allowing the receiving virtual node to select a fabric interface, based on the optimal fabric hop information, on which to output network traffic toward another virtual node on the other side of switch fabric internal to the single-chassis router, such that the packets will avoid traversing extra PFE hops at the receiving virtual node before being forwarded by the receiving virtual node to their destination external to the single-chassis router. The virtual nodes of the single-chassis router may exchange the optimal fabric hop information via routing protocol messages, e.g., BGP messages.

As described herein, optimal fabric routing functionality a service-aware functionality. That is, the vNodes are configured to perform optimal fabric routing differently depending on a type of service the data traffic is associated with. In some examples, the service-aware optimal fabric routing may support the following services with these associated transport protocols: 1. Internet with Resource Reservation Protocol (RSVP) and Label Distribution Protocol (LDP); 2. Inter-vPE Internet data traffic; 3. IP Virtual Private Network (IP-VPN) with LDP and RSVP.

FIG. 21B is a block diagram illustrating the example network environment of FIG. 21A in further detail, in accordance with techniques described in this disclosure. In the example of FIG. 21B, each of vNodes 1018, 1020 includes one or more PFEs 1024A-1024F ("PFEs 1024"). Individual PFEs 1024 are associated with a particular vNode and are not shared among multiple vNodes. vNodes share forwarding resources at flexible programmable integrated circuit (PIC) concentrator (FPC) granularity. Each vNode's control plane (vCP) 1025A-1025C ("vCPs 1025") instantiates with virtual machine (VM) technology. The vCP 1025 either could be within the routing engine (RE) of single-chassis router 1014 or outside the RE. Each vNode could serve the role of different network functions, such as Internet service provider edge (PE), Virtual Private Network (VPN) service PE (vPE) and Multiprotocol Label Switching (MPLS) Label Switching Router (LSR) (vP). Apart from these vNodes, in some examples single-chassis router 1014 may also include an administrative VM instantiated for shared resources management (e.g., a management plane, not shown in FIGS. 1021A-1021B).

For example, OFP session 34 may be a single hop IBGP session established between control planes of two vNodes over AFI interface to exchange optimal fabric path information. OFP session 1034 is a private BGP session for downstream signaling. In the example of FIG. 21B, an OFP session 1034 is established between vCP 1025A and vCP 1025B. Although not illustrated, other pairs of vCPs 1025 may have OFP sessions established. In some examples where the virtual nodes (e.g., vPEs) are inter-autonomous system (AS) virtual nodes, the virtual nodes may use exterior BGP (EBGP) MP-BGP sessions as the OFP sessions. In that case, the virtual nodes may then use MP-BGP sessions with an RR in the same AS for services.

In one example, assume vPE 1020A and vPE 1020B each provide MPLS-based VPN services, and CE 1023 connects to PFE 1024A. Assume also that each of vPE 1020A and vPE 1020B connects to vP 1018 with fabric equal cost logical paths via PFE 1024E and PFE 1024F. When a packet comes to vP 1018 from IP/MPLS core network 1016 and destined for CE 1023, in the absence of the techniques of this disclosure vP 1018 would send data traffic to either PFE 1024A or PFE 1024B based on ECMP load balancing. Assume that CE 1023 is reachable from vPE 1020A only via PFE 1024A. If vP 1018 chooses a fabric interface 1033C of PFE 1024A for forwarding traffic towards CE 1023, then PFE 1024B has to resend packet again to PFE 1024A to reach CE 1023. This results in an additional fabric hop within vPE 1020A.

The same problem happens in traffic towards a remote PE via IP/MPLS core network 1016. Assume in the example of FIG. 21A that vPE 1020A wants to send traffic to PE 1028. When packet comes to vPE 1020A for PE 1028, in the absence of the techniques of this disclosure vPE 1020A would send data traffic to either PFE 1024E or PFE 1024F based on ECMP load balancing. If vPE 1020A chooses the PFE 1024F fabric interface for traffic to PE 1028 then PFE 1024F must resend packet again to PFE 1024E to reach PE 1028, because PE 1028 is only reachable by an output interface from PFE 1024E. This results in an additional fabric hop within vP 1018.

The OFP techniques described herein are performed by two adjacent vNodes connected by an AFI 1032. The downstream vNode (relative to the ultimate flow of network traffic) signals, to the adjacent upstream vNode, the OFP fabric interface's nexthop(IP address) or nexthop(pfe-id) as the optimal next hop, and the upstream vNode uses that information select a next hop and forward data traffic. This disclosure describes various example OFP mechanisms in further detail, including, for example: 1. Context-FIB based forwarding. 2. Service route with fabric interface identifier. 3. Transport LSP setup with optimal fabric interface by replacing AFI. For all the above, a downstream node signals prefixes with corresponding optimal fabric interfaces. For scenarios 1 and 2, either a VPN per-PFE-per-table label and/or labelled BGP per-PFE-per-table and/or Internet prefixes are advertised with the fabric interface's identifier. For scenario 3, local routes and/or LDP routes are advertised to upstream with fabric interface's identifier, in a BGP message.

For example, vCP 1025C sends a routing protocol message 1036 (e.g., a BGP update message) to vCP 1025A via OFP session 1034. Routing protocol message 1036 includes OFP information, such as a fabric interface of vP 1018 as a next hop for reaching CR 1030A or remote PE 1028A. For example, routing protocol message 1036 may specify a fabric interface of fabric interconnect 1033A at PFE 1024E as a next hop for reaching CR 1030A or remote PE 1028A. In the absence of receiving the routing protocol message 1036 specifying the fabric interface, routing information of vPE 1020A may only indicate to use AFI 1032A for sending network traffic to the destinations of CR 1030A or remote PE 1028A. In response to receiving routing protocol message 1036 specifying the fabric interface, vCP 1025A stores the fabric interface to routing information, and may program FIBs at PFE 1024A and 1024B by program command 1039 to specify the fabric interface of fabric interconnect 1033A instead of the AFI 1032A. In other examples, vCP 1025A may similarly send a routing protocol message 1036 to vCP 1025C, specifying a fabric interface to use for reaching CE 1023.

In the upstream direction, with a multi-hop protocol next hop the vNodes have to do a route resolution to find out which immediately connected interfaces to send traffic out of. In that route resolution decision, the vPE 1020 also takes into account info received for the OFP purposes. The vP 1018 (upstream router) gives information to the vPE about remote transport tunnel endpoints and how the vP 1018 is able to reach them. The transport tunnel is to a remote PE router, such as PE 1028A. The remote tunnel endpoint is an IP address of the PE router. The vPE 1020 now has this information about the upstream topology connectivity from the point of view of the vP 1018 and takes this information into consideration when deciding its own outgoing interface. This is how optimal forwarding works in the Edge-to-Core forwarding direction. Before vPE 1020 programs the forwarding information into the PFEs, vPE 1020 has to determine that a PNH is reachable out of which interfaces, and what label to push, etc. If the vPE 1020 has multiple connections to vP and they go to different egress PFEs, in accordance with the techniques of this disclosure vPE 1020 could choose a subset of those interfaces based on how vP is connected to the remote PE 1028A. If vP 1018 is connected to PE 1028A only thru PFE1, then when doing that resolution of PE 1028A PNH, vPE 1020 could take this received OFP information into account and select only interfacet which is connected through PFE1 on vP 1018. If vPE 1020A did not have this information, and vPE 1020A could send the traffic to the interface2 which goes to PFE2 and at PFE2 it will take the inter-fabric hop at vP, taking a sub-optimal path. The vP 1018 is assisting in the optimal forwarding. in the service layer, the vP 1018 is not visible to the external network, but in the transport layer vP 1018 is visible to the external network. Mechanisms described herein allows the vPE 1020A and vP 1018 to optimally forward traffic to the other's exit point (i.e., an egress interface of single-chassis router 1012).

In the Core-to-Edge forwarding direction, OFP is used for service-layer reachability information and the decision is happening at the service layer, in the sense that the information that the vPE is giving the vP is service routes (service plane forwarding routes). The vPE is either giving VPN labels or IP prefixes to the vP and telling the vP which exit PFE the VP should send the traffic to, by specifying the OFP fabric interface. In some examples, the techniques of this disclosure may be applied to vNodes may not be in a single physical chassis, but may be multiple nodes in separate physical chassis that operate as if in a single chassis.

Figure 22:
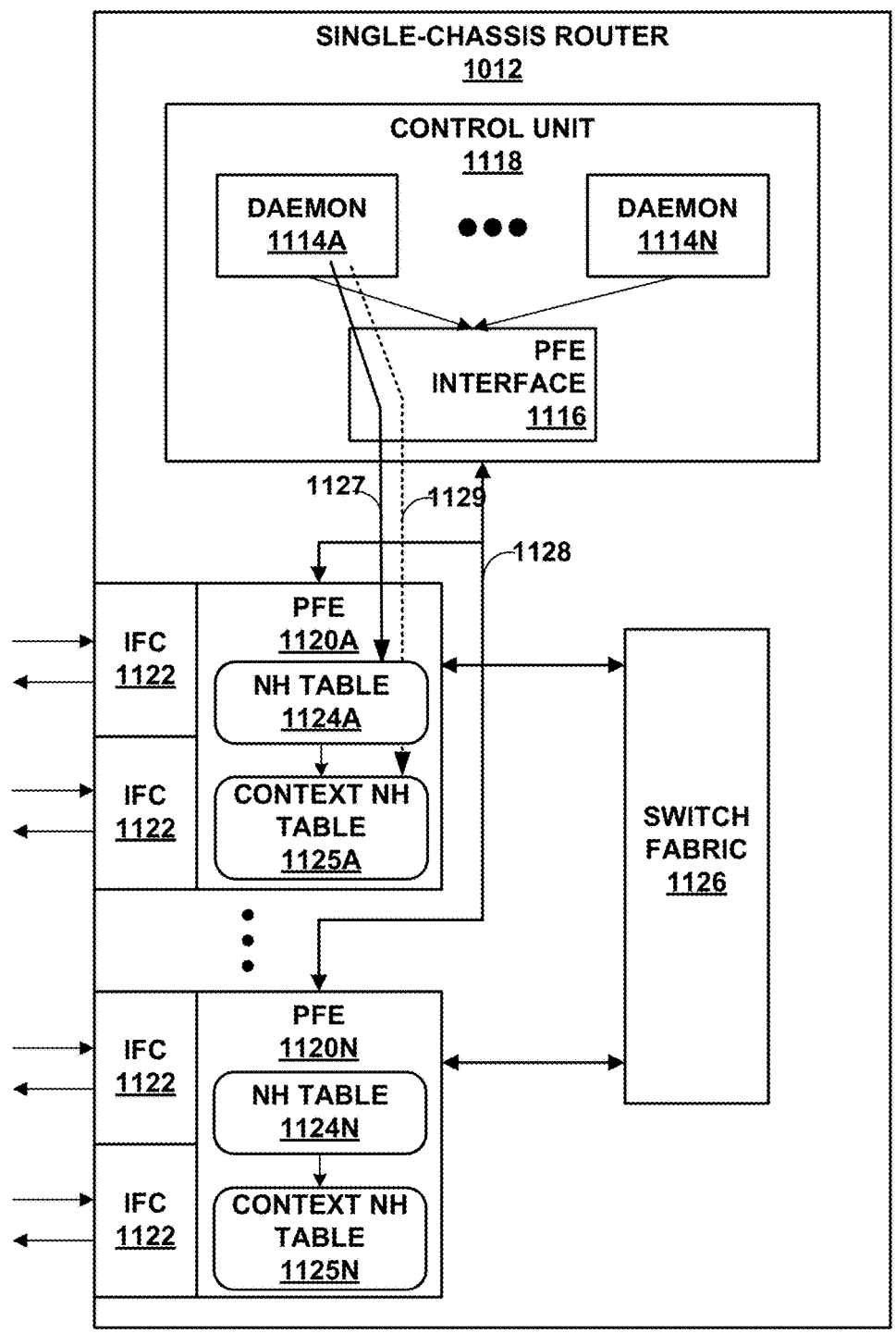
FIG. 22 is a block diagram illustrating an example single-chassis router of FIGS. 21A-21B that uses optimal fabric paths in accordance with the techniques of this disclosure.

FIG. 22 is a block diagram illustrating an example single-chassis router 1012 of FIGS. 21A-21B that uses optimal fabric paths in accordance with the techniques of this disclosure. Single-chassis router 1012 may include multiple virtual nodes operating as, for example, virtual provider edge or virtual customer edge routers, virtual autonomous system border routers (ASBRs), virtual area border routers (ABRs), or another type of network device, such as a virtual switch.

In this example, single-chassis router 1012 includes a control unit 1118 that provides control plane functionality for single-chassis router 1012. Control unit 1118 may be distributed among multiple entities, such as one or more routing units and one or more service cards insertable into single-chassis router 1012. In such instances, single-chassis router 1012 may therefore have multiple control planes. In some examples, each virtual routing node of single-chassis router 1012 may have its own virtual control plane, e.g., vCPs 1025 of FIG. 21B.

Single-chassis router 1012 also includes a plurality of forwarding components in the form of example packet forwarding engines 1120A-1120N ("PFEs 1120") and a switch fabric 1126, that together provide a forwarding plane for forwarding and otherwise processing subscriber traffic. Control unit 1118 may be, for example, any of vCPs 1025 of FIGS. 21A-21B, and PFEs 1120 may be, for example, any of PFEs 1024.

PFEs 1120 receive and send data packets via interfaces of interface cards 1122A-1122N ("IFCs 1122") each associated with a respective one of PFEs 1120. Each of PFEs 1120 and its associated ones of IFCs 1122 may reside on a separate line card for single-chassis router 1012 (not shown). Example line cards include flexible programmable integrated circuit (PIC) concentrators (FPCs), dense port concentrators (DPCs), and modular port concentrators (MPCs). Each of IFCs 1122 may include interfaces for various combinations of layer two (L2) technologies, including Ethernet, Gigabit Ethernet (GigE), and Synchronous Optical Networking (SONET) interfaces. In various aspects, each of PFEs 1120 may comprise more or fewer IFCs. Switch fabric 1126 provides a high-speed interconnect for forwarding incoming data packets to the selected one of PFEs 1120 for output over a network. Switch fabric 1126 may include multiple fabric links (not shown), such as fabric links 1033 of FIG. 21B.

In some examples, switch fabric 1126 may be a distributed, multi-stage switch fabric architecture, in which network packets traverse multiple stages of the switch fabric located in distributed forwarding components of the router to travel from an ingress point of the switch fabric to an egress point of the switch fabric. As one example, switch fabric 1126 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may be viewed as an independent portion of the multi-stage Clos switch fabric, where each plane provides switching redundancy.

Control unit 1118 is connected to each of PFEs 1120 by internal communication link 1128. Internal communication link 1128 may comprise a 100 Mbps or 1 Gbps Ethernet connection, for instance. Daemons 1114A-1114N ("daemons 1114") executed by control unit 1118 are user-level processes that may run network management software, execute routing protocols to communicate with peer routing devices, execute configuration commands received from an administrator, maintain and update one or more routing tables, manage subscriber flow processing, and/or create one or more forwarding tables for installation to PFEs 1120, among other functions. In some examples, one of daemons 1114 may comprise a client for an Authentication, Authorization, and Accounting (AAA) protocol, such as a Remote Authentication Dial-In User Service (RADIUS) client.

Control unit 1118 may include one or more processors (not shown in FIG. 22) that execute software instructions, such as those used to define a software or computer program, stored to a computer-readable storage medium (again, not shown in FIG. 22), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 1118 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

PFEs 1120 process packets by performing a series of operations on each packet over respective internal packet processing paths as the packets traverse the internal architecture of single-chassis router 1012. Operations may be performed, for example, on each packet by any of a corresponding ingress interface, an ingress PFE 1120, a transit PFE 1120, an egress PFE 1120, an egress interface or other components of single-chassis router 12 to which the packet is directed prior, such as one or more service cards. The result of packet processing determines the way a packet is forwarded or otherwise processed by PFEs 1120 from its input interface on one of IFCs 1122 to its output interface on one of IFCs 1122. A particular packet may be processed by multiple PFEs 1120, in some examples.

The example of FIG. 22 shows PFE 1120A as storing a next hop (NH) table 1124A that includes pointers to a context next hop table 1125A. A context next hop table, sometimes called a context forwarding information base (FIB), provides additional forwarding context for use in the forwarding plane when looking up next hops. In some examples, a context FIB may enable a forwarding decision on behalf another node by importing the prefixes and next hops from the other node into the context FIB. In some examples, transport LSP labels point to the context FIB cause PFE 1120 to do a forwarding lookup in the context FIB.

To illustrate by way of an example, assume PFE 1120A is associated with a virtual node vP 1018, and PFE 1120N is associated with a virtual node vPE 1020A. Assume vP 1018 creates context NH table 1125A based on a context MPLS RIB for vPE 1020A named vPE1020A.mpls.0, and the context identifier is the loopback address 1.1.1.1 of vPE 1020A. For example, vP 1018 may create the context MPLS RIB, and in turn context NH table 1125A, in response to control unit 1118A receiving a BGP update message having a MultiNexthop attribute specifying the context table name as described herein. In this example, vP 1018 builds vPE1020A.mpls.0 and creates a context label (say, 1100) for a LSP to 1.1.1.1 with a table next-hop from NH table 1124A pointing to vPE1020A.mpls.0. Then vPE 1020A could use upstream signaling to import any label forwarding information in vPE1020A.mpls.0. The traffic coming in to vP 1018 with label 1100 goes through a forwarding lookup in vPE1020A.mpls.0.

PFE interface 1116 presents an interface by which daemons 1114 may program PFEs 1120 for directing packet flow forwarding. Daemons 1114 direct PFEs 1120 via PFE interface 1116 to install or update entries to NH tables 1124 or context NH tables 1125. PFE interface 1116 may comprise one or more user- or kernel-level libraries, programs, toolkits, application programming interfaces (APIs) and may communicate control and data messages to PFEs 1120 via internal communication link 1128 using sockets, for example.

For example, in accordance with the techniques of this disclosure, one of daemons 1114 may be a first routing protocol daemon executing in a first virtual machine instance associated with one of the virtual routing nodes that receives, from a second routing protocol daemon executing in a second virtual machine instance associated with a second virtual routing node, a routing advertisement that specifies an optimal fabric path next hop for reaching a network destination (e.g., a prefix). The optimal fabric path next hop specifies an internal address of a fabric link to use for the optimal fabric path. In response, daemons 1114 invoke PFE interface 1116 to apply the optimal fabric path to received packet flows. For example, PFE interface 1116 directs PFEs 1120 to generate or modify an IFL 1171 for the packet flow to specify only a particular fabric link as a next hop for packets destined for the destination prefix, rather than a list of all member fabric links of an aggregated fabric link.

In the illustrated example, daemon 1114A directs PFEs 1120 to install the OFP next hop interface using OFP IFL messages 1127, 1129. OFP IFL messages 1127, 1129 specify a route and an OFP next hop address to install for the route. In this way, the next hop tables 1124, 1125 are modified to affect the processing path of packets within single-chassis router 1012 to avoid unnecessary fabric hops. As a result, the techniques may reduce the average number of resources needed to support any given packet flow and increase the number of flows supportable by single-chassis router 1012.

Figure 23:
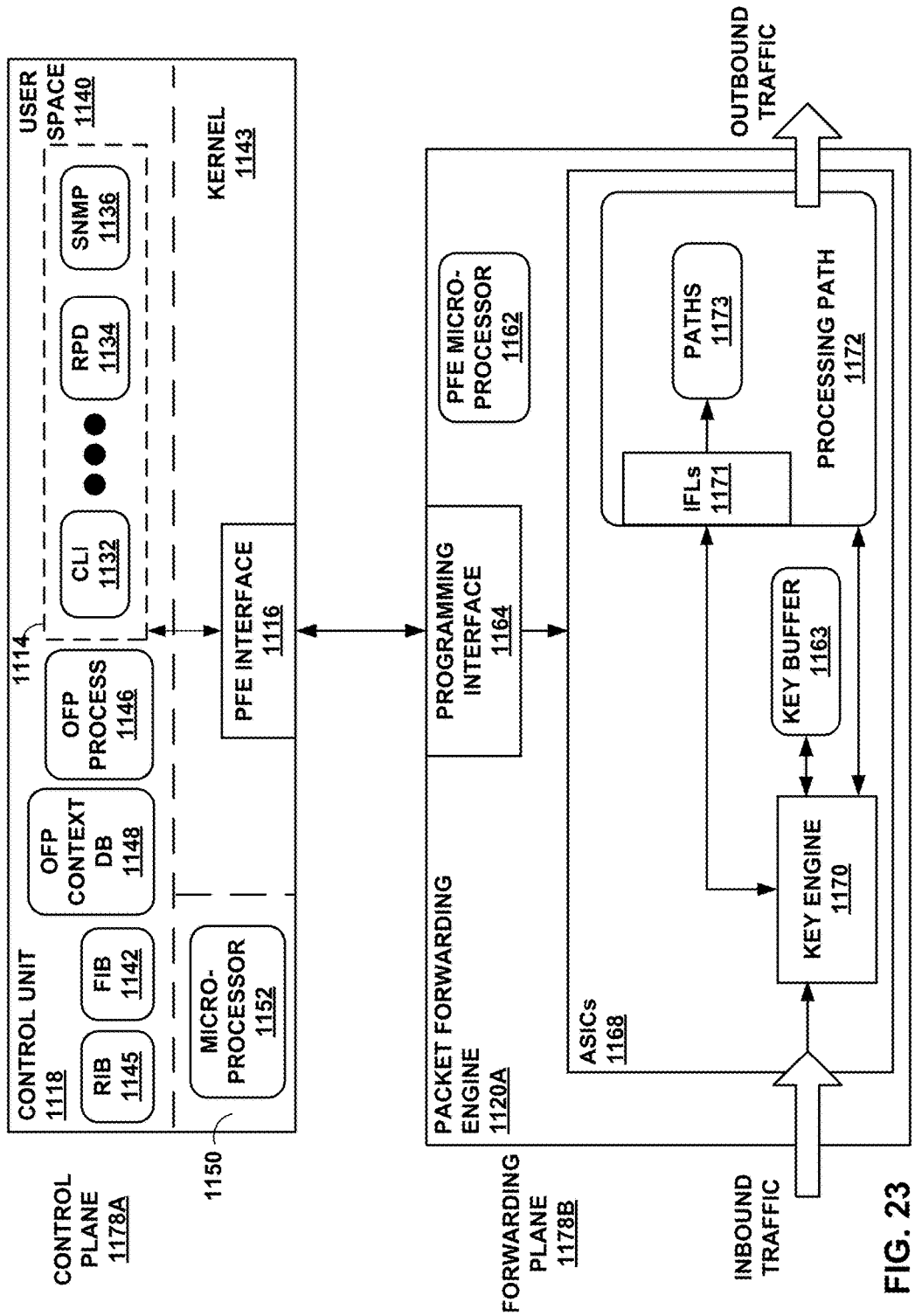
FIG. 23 is a block diagram illustrating example instances of the control unit and packet forwarding engine of FIG. 22 in further detail.

FIG. 23 is a block diagram illustrating example instances of control unit 1118 and packet forwarding engine 1120A ("PFE 1120A") of PFEs 1120 of FIG. 22 in further detail. In this example, control unit 1118 provides a control plane 1178A operating environment for execution of various user-level daemons 1114 executing in user space 1140. Daemons 1114 in this example include command-line interface daemon 1132 ("CLI 1132"), routing protocol daemon 1134

("RPD 1134"), and Simple Network Management Protocol daemon 1136 ("SNMP 1136"). In this respect, control plane 1178A may provide routing plane, service plane, and management plane functionality for single-chassis router 112. Various instances of control unit 1118 may include additional daemons 1114 not shown in FIG. 22 that perform other control, management, or service plane functionality and/or drive and otherwise manage forwarding plane functionality for single-chassis router 1012. Control unit 1118 may in some instances represent a control unit of a service card or a combination of control units of a routing unit that provides routing plane functionality and a service card.

Daemons 1114 operate over and interact with kernel 1143, which provides a run-time operating environment for user-level processes. Kernel 1143 may comprise, for example, a UNIX operating system derivative such as Linux or Berkeley Software Distribution (BSD). Kernel 1143 offers libraries and drivers by which daemons 1114 may interact with the underlying system. PFE interface 1116 of kernel 1143 comprises a kernel-level library by which daemons 1114 and other user-level processes or user-level libraries may interact with programming interface 1164 of PFE 1120A. PFE interface 1116 may include, for example, a sockets library for communicating with PFE 1120A over dedicated network links.

Hardware environment 1150 of control unit 1118 comprises microprocessor 1152 that executes program instructions loaded into a main memory (not shown in FIG. 23) from storage (also not shown in FIG. 23) in order to execute the software stack, including both kernel 1143 and user space 1140, of control unit 1118. Microprocessor 1152 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 1134 executes one or more interior and/or exterior routing protocols to exchange routing information with other network devices and store received routing information in routing information base 1145 ("RIB 1145"). For example, RPD 1134 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RIB 1145 may include information defining a topology of a network, including one or more routing tables and/or link-state databases. RPD 1134 resolves the topology defined by routing information in RIB 1145 to select or determine one or more active routes through the network and then installs these routes to forwarding information base 1142 ("FIB 1142"). Typically, RPD 1134 generates FIB 1142 in the form of a radix or other lookup tree to map packet information (e.g., header information having destination information and/or a label stack) to next hops and ultimately to interface ports of interface cards associated with respective PFEs 1120.

Command line interface daemon 1132 ("CLI 1132") provides a shell by which an administrator or other management entity may modify the configuration of single-chassis router 1012 using text-based commands. SNMP 1136 comprises an SNMP agent that receives SNMP commands from a management entity to set and retrieve configuration and management information for single-chassis router 1012. Using CLI 1132 and SNMP 1136, for example, management entities may enable/disable and configure services, manage classifications and class of service for packet flows, install routes, enable/disable and configure rate limiters, configure traffic bearers for mobile networks, and configure interfaces, for example. RPD 1134, CLI 1132, and SNMP 1136 in this example configure forwarding plane 1178B via PFE interface 1116 to implement configured services, add/modify/delete routes, and modify packet processing paths by installing context next hop tables and fabric interfaces as next hops to PFEs 1120. PFE interface 1116 allows daemons 1114 to drive the installation and configuration of packet processing path 1172 of PFE 1120A. In particular, PFE interface 1116 includes an application programming interface (API) by which daemons 1114 may map packet flows to fabric interfaces for forwarding.

PFE 1120A, in combination with other PFEs 1120 of single-chassis router 1012, implements forwarding plane 1178B (also known as a "data plane") functionality to handle packet processing from ingress interfaces on which packets are received to egress interfaces to which packets are sent. Forwarding plane 1178B determines data packet forwarding through single-chassis router 1012, applies services, rate limits packet flows, filters packets, and otherwise processes the packets using service objects and lookup data installed by control plane 1178A to forwarding plane 1178B. Although FIG. 23 illustrates only PFE 1120A in detail, each of PFEs 1120 of single-chassis router 1012 comprises similar modules that perform substantially similar functionality.

PFE 1120A includes ASIC-based packet processors ("ASICs 1168") that execute processing path 1172 in accordance with techniques described herein. ASICs 1168 include one or more programmable application-specific integrated circuits having key engine 1170 that executes microcode (or "microinstructions") to control and apply fixed hardware components of ASICs 1168 to process packet "keys." A packet key includes packet fields and other parameters that determine a flow of packet processing for the packet along an internal processing path, such as paths 1173. Key engine 1170 includes key buffer 1163 to store packet field data for corresponding packets that the key engine is currently processing. Key buffer 1163 may also provide limited writable memory to which elements of the internal processing path may write to pass messages accessible by future elements. Some instances of ASICs 1168 may include a plurality of key engines each having an associated key buffer.

Internal processing path 1172 ("processing path 1172") of ASICs 1168 comprises programmable, executable microcode and fixed hardware components that determine the packet processing actions and other operations performed by key engine 1170. 1120A may store executable instructions of processing path 1172 in computer-readable storage media, such as static random access memory (SRAM). While illustrated within ASICs 1168, in some examples executable instructions of processing path 1172 may be stored in memory external to ASICs 1168 in PFE 1120A.

In some aspects, processing path 1172 includes a next hop data structure to initiate processing. At the end of each processing step by key engine 1170, the result is a next hop that may specify additional processing or the termination of processing, for instance. In addition, next hops may specify one or more functions to be executed by key engine 1170 and/or one or more hardware elements to be applied (e.g., policers). Key engine 1170 may be associated with a result (or "lookup") buffer that stores results for executing next hops. For example, key engine 1170 may execute a lookup specified by a next hop and store the result of the lookup to the associated result buffer. The contents of a result buffer may affect the actions of the next hop in a next hop chain.

Logical interfaces 1171 ("IFLs 1171") is a table or other data structure that includes one or more logical interfaces. The number of IFLs 1171 may be limited in various implementations of PFE 1120A due to memory restrictions, the rate at which PFE microprocessor 1162 can establish paths in processing path 1172, the bandwidth between control unit 118 and PFE 1120A, and the rate at which control unit 1118 can determine paths in processing path 1172. Each of IFLs 1171 is an interface to a processing path of paths 1173. Paths 1173 represents one or more processing paths for execution by key engine 1170 on key buffer 1163.

In some examples, every physical interface device (or port) ("ifd") has a PFE-ID (PFE identifier). The PFE-ID provides an addressable point within a chassis. The term PFE-ID may be interchangeable "PFE-SNPA". This PFE-ID of a ifd derived from the PFE it is associated with. The fabric interface IFD also derives the PFE-ID from the PFE to which the fabric interface belongs. In some examples, this PFE-ID of IFD will be available through the rosock message (ifmedia:ifm_fe) for interested daemon consumption. Location is abstraction for PFE-ID. In some examples, the PFE-ID also may help in hiding hardware details in RPD 1134. PFE-ID of the IFD will be referred as ifd-location.

Ifl-location is derived from underlying ifd-location. Ifd-location is learned from the rtsock message(ifmedia:ifm_fe). All IFLs stacked on an ifd share same location. The fabric interface also gets the ifl-location. Ifl-location is associated with IFLs 1171.

In accordance with techniques of this disclosure, OFP process 1146 determines a location of a next hop that provides a fabric interface next hop that avoids unnecessary fabric hops, referred to as an OFP interface. For determining next hop location, for OFP traffic the ingress and egress interfaces should be in the same PFE to avoid extra fabric hops between PFEs. In some examples, forwarding happens through next hops and next hop consist of a set of egress ifls. A next hop location may be considered as cumulative unique locations of all ifl-locations in the next hop.

The term "OFP session" refers to a single hop IBGP session established between two virtual nodes of the single-chassis router 1012 over an aggregated fabric interface (AFI) to exchange optimal fabric path (e.g., OFP session 1034 of FIG. 21A). An OFP session is a private BGP session for signaling. Due to its single hop nature, paths exchanged via this session will avoid a resolver and should be able to use router next hops. In some examples, the OFP session will only support restricted features to enable OFP, and unless explicitly mentioned all other BGP features for session may be unsupported. The OFP session may support MPLS (new) address family, inet, inet6 address family. In some examples, all prefixes exchanged in this session only contain fabric interface as next hops. This session may support import and export from different RIBs, for example.

This session also supports export and import policies to support OFP on the subset of advertised prefixes. TABLE 1 sets forth example import and export RIBs and use cases.

TABLE 1

| | RIBs | Use case |
|---|---|---|
| Import RIBs | Context RIBs | In vP (SU) for traffic to vPE |
| | Main RIBs (e.g., Inet{6}.0) | In vPE for inter-vPE internet |
| | Private RIBs | For transport LSP Setup |

TABLE 1-continued

| | RIBs | Use case |
|---|---|---|
| Export RIBs | Main RIBs (e.g., Inet{6}.0) | In vPE for inter-vPE internet |
| | Main RIBs (e.g., mpls.0) | In vPE for shared uplink (SU) |

Typically, BGP-advertised prefix next hops are configuration-driven (address family default self or peer address or export policy). For performing OFP, OFP process 1146 dynamically computes the next hops using an OFP PNH algorithm, and provides the next hops to RPD 1134 for advertising, e.g., by sending a BGP message having an OFP attribute. The next hops are advertised and the OFP process 1146 of the receiving vNode rewrites the next hops in the RIB 1145 to enable OFP. A prefix-advertised next hop and OFP PNH should be reside in same PFE. The OFP PNH algorithm and associated BGP attribute described herein supports multiple fabric next hops, load balancing across next hops, and fast reroute (FRR).

The following describes an example OFP PNH algorithm used by OFP process 1146 in computing a fabric interface for the OFP PNH. OFP process 1146 computes the OFP PNH using FI location (FI-L) of the aggregated fabric interface that connects vNodes and the prefix's forwarding next hop locations (NH-L). In one example, OFP process 1146 selects as OFP Next hops those FI addresses in the intersection of FI-L∩NH-L FI addresses.

As described herein, a new BGP attribute is defined to enable advertisement of multiple next hops. In some examples, this attribute may be only used by RPD 1134 in the OFP session 1034 of FIG. 21B and does not propagate further. PFE microprocessor 1162 manages ASICs 1168 and executes programming interface 1164 to provide an interface for/to control unit 1118. PFE microprocessor 1162 may execute a microkernel to provide an operating environment for interfaces. Programming interface 1164 receives messages from control unit 1118 directing packet forwarding engine 1120A to configure logical interfaces 1171 and paths 1173 of processing path 1172.

Figure 24:
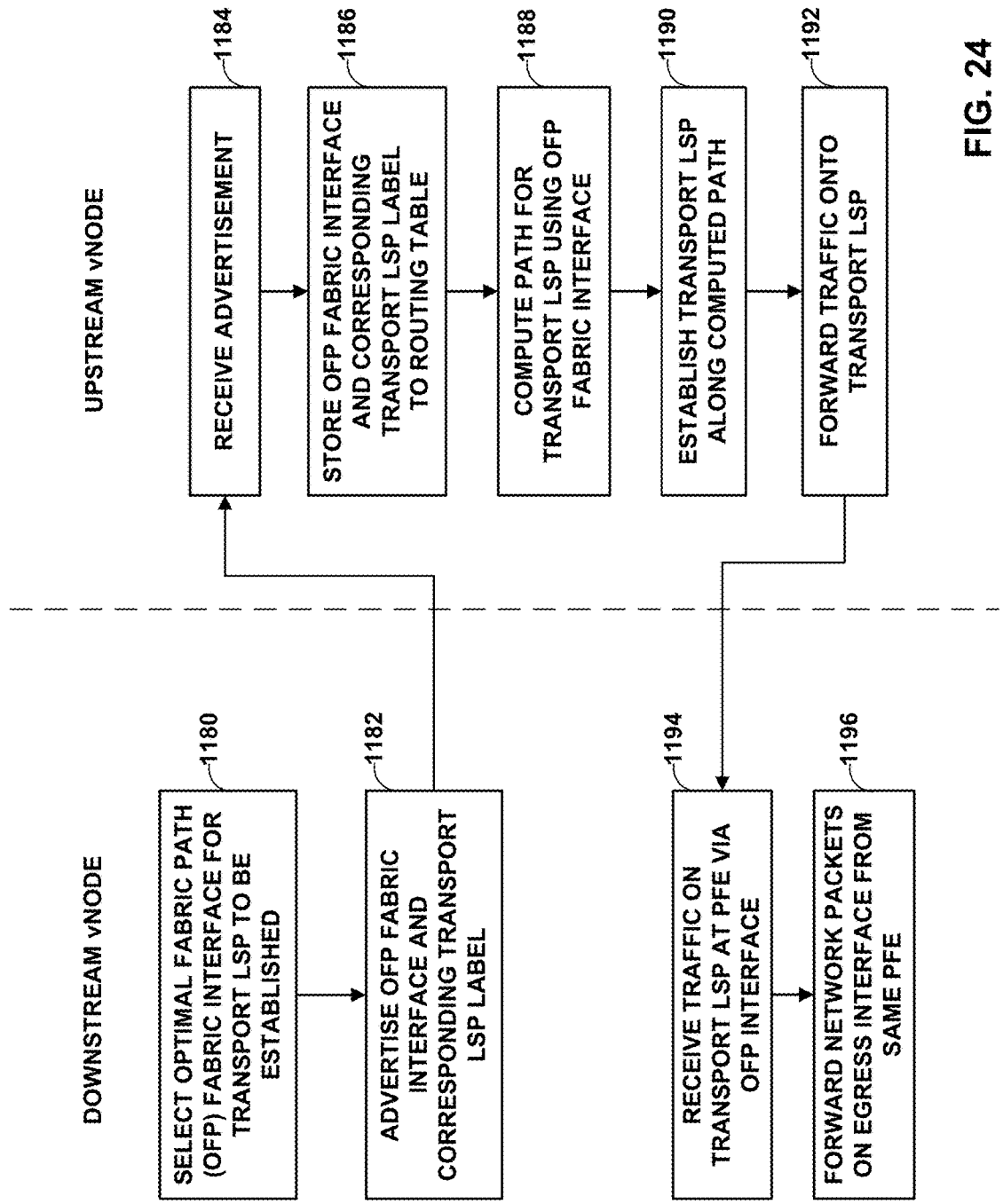
FIG. 24 is a flowchart illustrating an example mode of operation according to techniques described in this disclosure.

FIG. 24 is a flowchart illustrating example operation of network devices in accordance with one or more aspects of the disclosure. FIG. 24 will be described for purposes of example with respect to FIGS. 21A-21B, 22-23, and 25-28. A downstream virtual node ("vNode") determines that a transport LSP is to be established (e.g., based on configuration) and selects an optimal fabric path fabric interface for the transport LSP to be established (1180). For example, an OFP process 1146 may select the OFP fabric interface using the OFP PNH algorithm. In some examples, the downstream vNode may be a virtual node such as vP 1018 or vPE 1020A. The downstream vNode advertises the OFP fabric interface and a corresponding label for the transport LSP (1182). The upstream vNode may be a virtual node such as vPE 20A or vP 1018, for example. The terms "downstream" and "upstream" relate to the direction of the flow of data traffic from the upstream vNode to the downstream vNode. In some examples, the downstream vNode advertises the OFP fabric interface via an OFP session (e.g., OFP session 34) between itself and an upstream vNode, for example, via a single-hop BGP session between the downstream vNode and the upstream vNode. The message advertising the OFP fabric interface may also specify the OFP fabric interface as a next hop for reaching a network destination, such as PE 1028A or vPE 1020A. The downstream vNode may advertise an identifier of the OFP fabric interface, such as an IP address assigned to the OFP fabric interface or an unnumbered interface identifier such as a PFE-id.

In response to receiving the advertised OFP fabric interface and transport LSP label (1184), the upstream vNode stores the OFP fabric interface and corresponding transport LSP label to a routing table, such as RIB 1145 (FIG. 23). In some cases, the upstream vNode may replace an aggregated fabric interface with the OFP fabric interface as a next hop for the network destination. For example, in vP 1018 aggregated fabric interface 1032A may be replaced with a table next hop to a Context RIB, and in vPE 1020A aggregated fabric interface 1032A is replaced with a fabric interface. The upstream vNode uses the OFP fabric interface when computing a path for the transport LSP (1188). Because the upstream vNode now has the OFP fabric interface information, the upstream vNode can use this more specific information for the path computation instead of merely using the aggregated fabric interface. For example, an MPLS process, such as an RSVP-TE process or an LDP process (e.g., managed by RPD 1134) may use a constrained shortest path first (CSPF) algorithm to compute a path for the transport LSP, and may compute the path based on the network topology reflected in RIB 1145.

The upstream vNode establishes the transport LSP along the computed path (1190), e.g., by sending one or more signaling messages such as an LDP label mapping message or an RSVP-TE Path message. The transport LSP may be an LDP LSP such as LDP transport LSP 1204 (FIG. 25) or an RSVP-TE LSP such as RSVP-TE transport LSP 1212 (FIG. 26). The upstream vNode may be an ingress router of the transport LSP, i.e., traffic enters the transport LSP at the upstream vNode. The downstream vNode may receive the signaling message and store state for the transport LSP. In some examples, the transport LSP may terminate at PE 1028A (e.g., PE 1028A may be an egress router of the transport LSP).

The upstream vNode then may forward network traffic onto the transport LSP, such as network traffic destined for PE 28A (1192). The upstream vNode may encapsulate the traffic forwarded on the transport LSP with the transport LSP label advertised by the downstream vNode via the OFP session. When the downstream vNode receives traffic on the transport LSP, the downstream vNode forwards the network packets on an egress interface from the same PFE on which the OFP interface resides (1196). In this manner, the downstream vNode can avoid having to make an extra fabric hop to a different PFE to output the network packets on the egress, as it may have to do if the upstream vNode were to use the aggregated fabric interface for computing the path for the transport LSP instead of the individual optimal fabric path fabric interface. The downstream vNode may swap the transport LSP label for a different LSP label before forwarding.

Figure 25:
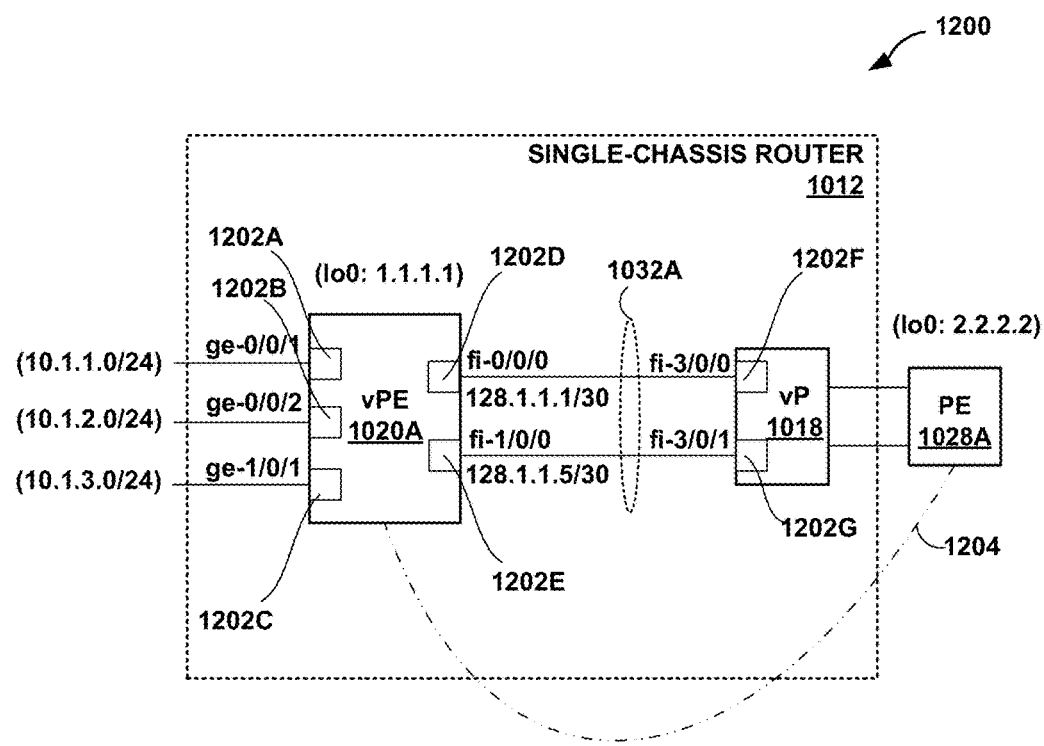
FIG. 25 is a block diagram illustrating an example system, showing example fabric interfaces virtual nodes of the single-chassis router of FIGS. 21A-21B in further detail.
Figure 26:
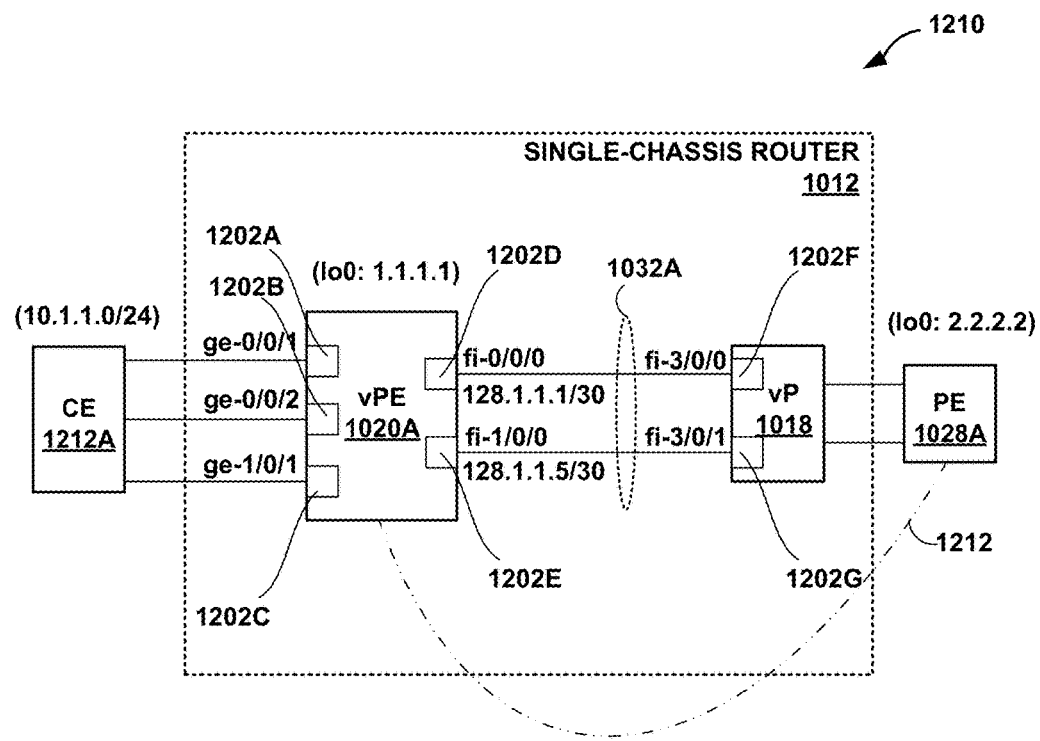
FIG. 26 is a block diagram illustrating an example system, showing an example network topology including a single-chassis router with virtual nodes.

FIG. 25 is a block diagram illustrating an example system 1200, showing example fabric interfaces 1202A-1202F ("fabric interfaces 1202") of vNodes of the single-chassis router 1012 of FIGS. 21A-21B in further detail. Fabric interfaces 1202 are interfaces to PFEs of the vNodes (not shown). For example, fabric interface 1202D may be an interface of a PFE having PFE-ID of pfe-0, fabric interface 1202E may be an interface of a PFE having PFE-ID of PFE-1, fabric interfaces 1202F may be an interface of a PFE having PFE-ID of pfe-2, and fabric interface 1202G may be an interface of a PFE having PFE-ID of pfe-3. The example of FIG. 25 is used to describe various aspects of the techniques of this disclosure.

MPLS supports Per-next hop, per-table, per-prefix and per group label allocation policies. In accordance with the techniques of this disclosure, per-PFE-per-table label allocation defines a new scheme to allocate a label based on next hop's PFE location (Next hop location) per table. Prefixes share the same set of next-hop PFE locations, and the same RIBs share a common label.

In the example of FIG. 25, assume ge-0/0/1, ge-0/0/2 has pfe-id 0 and ge-1/0/1 has pfe_id 1. Assume 10.1.1.0/24 is reachable via ge-0/0/1 and 10.1.2.0/24 reachable via ge-0/0/2 and 10.1.3.0/24 reachable via ge-1/0/1. Because ge-0/0/1 and ge-0/0/2 in are in the same PFE, prefixes 10.1.1.0/24 and 10.1.2.0/24 share a common label (say 100), and 10.1.3.0/24 gets a different label (say 200). Assume another couple of prefixes 10.1.4.0/24 and 10.1.5.0/24 are reachable via both ge-0/0/2 and ge-0/0/1; thus both these prefixes share the same label (say 300). In effect, per-PFE-per-table label allocation provides a label per set of PFEs, assuming all prefixes are in the same RIB.

The following example is specific to a Context FIB, such as a context NH table 1125A-1125N of FIG. 23. In the example of FIG. 25, assume vP 1018 provides a context MPLS RIB for vPE 20A and the context identifier is vPE 1020A's loopback (100) address 1.1.1.1. Then vP 1018 builds a vPE20A.mpls.0 context NH table and create a context label (say 100) for LSP to 1.1.1.1 with a table next-hop pointer to vPE20A.mpls.0. Then vPE 1020A and vP 1018 could use upstream signaling to import any label forwarding information in vPE20A.mpls.0. The traffic comes with label 100 in vP 1018 goes through forwarding lookup in vPE20A.mpls.0.

The OFP identifier may be an IP address, such as vPE 20A's loopback address, for example. In some examples, a virtual node specifies the OFP identifier in BGP update messages 1036 (FIG. 21B) as the protocol next hop for service prefixes advertised to route reflectors such as service RR 1026 (FIGS. 21A-21B) or other PE routers such as PE router 1028A. To support OFP on a subset of prefixes, in some examples vPE 1020A could define a secondary address in loopback and use the secondary address as the OFP identifier, and advertise prefixes with the OFP identifier as the protocol next hop.

This OFP identifier can also be used by vP 1018 when vP 1018 sets up a transport LSP to the OFP identifier. With reference to the example of FIG. 1025, assume vPE 1020A advertises 10.1.1.0/24, 10.1.2.0/24 and 10.1.3.0/24 to network with protocol next hop as 1.1.1.1. To reach these prefixes, remote PE 1028 sets up a transport LSP 1204 to 1.1.1.1 and uses the transport LSP 1204 for forwarding network traffic from PE 1028 to vPE 1020A. If OFP is needed for all above prefixes, vP could do OFP with a single transport LSP 1204. But if OFP is needed only 10.1.3.0/24 then with single transport LSP that carry both OFP traffic and non OFP traffic. To avoid having to use the same transport LSP 1204 to carry OFP traffic and non OFP traffic, vPE 1020A may use a secondary loopback address (e.g., 1.1.1.2) as the OFP identifier and advertise 10.1.3.0/24 with protocol next hop as 1.1.1.2, and advertise the rest of the service prefixes with a loopback address of 1.1.1.1 to network. This triggers remote PEs to setup two LSPs: one for OFP traffic and one for other traffic. Setting up one LSP for OFP traffic and another LSP for non-OFP traffic may provide flexibility for a user in enabling OFP for only a subset of network traffic. For example, a user may configure OFP for routes associated with a large data flow that goes on an optimal path due to OFP, and the user may not configure OFP for routes having a smaller flow, which may remain on a sub-optimal path.

In the example of FIG. 25, OFP process 1146 of vP 1018 may determine an OFP PNH as follows. Assume 10.1.1.0/24 and 10.1.2.0/24 next hop location (NH-L) is 0 and 10.1.3.0/24 NH-L is 1, and an ECMP prefix 10.1.4.0/24 (not shown in FIG. 25, reachable via all left side interfaces) NH-L is {0,1}. In the case of fabric interfaces having IP addresses as identifiers, as illustrated in FIG. 25, vPE 1020A and vP 1018 are connected via AFI 1032A, with fabric interfaces fi-0/0/0 and fi-1/0/0. fi-0/0/0 IFL is 0 and fi-1/0/0 IFL is 1. OFP process 1146 determines the OFP primary next hop (PNH) for 10.1.1.0/24 and 10.1.2.0/24 is (FI-L∩NH-L=0) is fi-0/0/0 address 128.1.1.1. OFP process 1146 determines the OFP for 10.1.3.0/24 is 128.1.1.5. OFP process 1146 determines the OFP PNH for 10.1.4.0/24 is (FI-L∩NH-L={0, 1}) 128.1.1.1 and 128.1.1.5.

In the case of fabric interfaces having a SNPA-id for PFE, vPE1 and vP connects via afi0 with {<pfe-0,pfe-1>,<pfe3>}. pfe-0 afi-L is 0 and pfe-1 afi-L is 1. Then OFP PNH for 10.1.1.0/24 and 10.1.2.0/24 is (afi-L∩NH-L=0) is pfe-0. OFP pfe-snpa for 10.1.3.0/24 is pfe-0. OFP pfe-snpa for 10.1.4.0/24 is (afi-L∩NH-L={0, 1}).

FIG. 26 is a block diagram illustrating an example system 1210, showing an example network topology including a single-chassis router with virtual nodes. The example of FIG. 26 is used to describe various aspects of the techniques of this disclosure, including how OFP works with load-balancing/fast reroute. In some examples, a downstream vNode (e.g., vP 1018) may have equal cost multipath (ECMP) paths for a prefix that needs an optimal fabric path. The downstream vNode may also do the weighted load balancing across different capacity link in different PFEs. In those cases, OFP process 1146 converts a forwarding next hop (FNH)-level load balance distribution into PFE-level load balance distribution. In some examples, the downstream vNode uses the BGP MultiNext hop attribute, described herein, to send this PFE-level balance to the upstream vNode (vPE 20A). The OFP process 1146 on vPE 1020A receives the PFE-level load balance distribution to build its next hops with the required weights for the load balancing, and installs the next hops in the appropriate FIB at the PFEs.

For example, assume in the example of FIG. 26 that ge-0/0/1, ge-0/0/2 and fi-0/0/0 has pfe-id 0 and ge-1/0/1 and fi-1/0/0 has pfe_id 1. In other words, assume ge-0/0/1, ge-0/0/2 and fi-0/0/0 has IF-L 0 and ge-1/0/1 and fi-1/0/0 has IF-L 1. (or, in the case of unnumbered interfaces, ge-0/0/1, ge-0/0/2 are in pfe-0 has if-L 0 and ge-1/0/1 in pfe-1 and has if-L 1). The prefix 10.1.1.0/24 for reaching customer edge (CE) router 1212A has ECMP next hops ge-0/0/1, ge-0/0/2 and ge-1/0/1 and prefix 10.1.1.0 next hop location will be {0,1}. Traffic is load balanced equally (33.3%) across all three of interfaces 1202A-1202C. The OFP next hops for AFI 1032A are 128.1.1.1 and 128.1.1.5. If vP 1018 load balances equally with only two fabric interfaces, then vPE 1020A's interface 1202A with next hop ge-1/0/1 may get higher distribution if link-local bias is enabled. To solve this, OFP nexthops also distribute the balance as well. In above e.g., pfe-0 balance will be 66.3% and pfe-1 will be 33.3. Similarly, if a prefix has backup nexthop then that backup attribute also singled as weight. So the OFP nexthop format is {nexthop addresses, weight, balance}. OFP nexthop for 10.1.1.0/24 is {nh1=[pfe-0,0,66.3], nh2==[pfe-1,0,null]}. The null balance indicates rest of the traffic (100-66.3).

Local link bias is a configuration option, described as follows. In load balancing, a hash algorithm chooses an egress interface when ECMP is available for a prefix. Without local link bias, the hash algorithm may choose an interface in a remote PFE instead of the local PFE. This could result in an additional fabric hop. The local link bias configuration prevents choosing remote PFE by using only the local links for hashing. The local link bias prevents the additional fabric hop, but could introduce unbalance.

To address this issue, OFP process 1146 on the upstream vNode can be configured to determine the hashing and balance across all links and select the OFP next hops so as to also distribute the balance. For example, an above example, 128.1.1.1 balance will be 66.6% and 128.1.1.5 will be 33.4%. Similarly, if a prefix has backup next hop then that backup attribute also singled as weight. Thus, the OFP next hop format is {next hop addresses, weight, balance}. The OFP next hop for 10.1.1.0/24 is {nh1=[1128.1.1.1,0,66.6], nh2=[128.1.1.5,0,null]}, where the null balance indicates rest of the traffic (100-66.6).

In the example of unnumbered interfaces for fabric interface identifiers, assume ge-0/0/1, ge-0/0/2 are in pfe-0 has if-L 0 and ge-1/0/1 in pfe-1 and has if-L 1. The 10.1.1.0/24 has ECMP next hops ge-0/0/1, ge-0/0/2 and ge-1/0/1 and prefix 10.1.1.0 next hop location will be {0,1}, and traffic is load balanced equally (33.3%) in all 3 interfaces. The OFP snpa for afi0 is {0,1}. If vP load balances equally with only two fabric point, then vPE ge-1/0/1 may get higher distribution if link-local bias is enabled. To address this, OFP next hops also distribute the balance as well. In above e.g., pfe-0 balance will be 66.3% and pfe-1 will be 33.3%. Similarly, if a prefix has backup nexthop then that backup attribute also singled as weight. So the OFP nexthop format is {nexthop addresses, weight, balance}. OFP nexthop for 10.1.1.0/24 is {nh1=[pfe-0,0,66.3], nh2=[pfe-1,0,null]}. The null balance indicates rest of the traffic (100-66.3).

Figure 27:
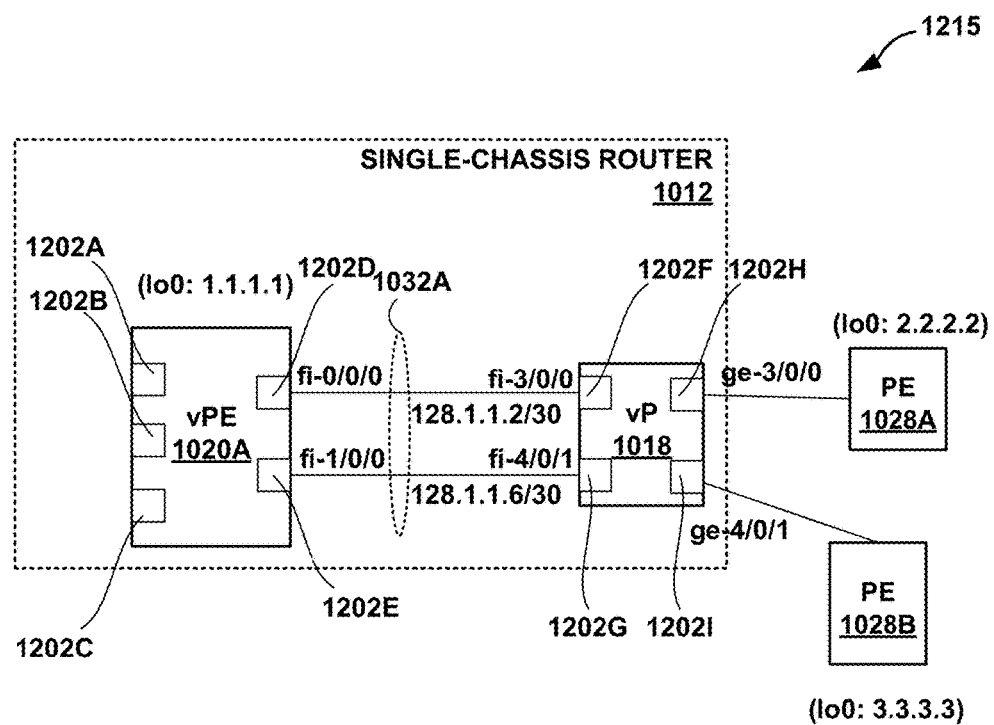
FIG. 27 is a block diagram illustrating an example system, showing another example network topology including a single-chassis router with virtual nodes.

FIG. 27 is a block diagram illustrating an example system 1215, showing another example network topology including a single-chassis router with virtual nodes. The example of FIG. 27 is used to describe various aspects of the techniques of this disclosure, including transport LSP setup for the Label Distribution Protocol (LDP). FIG. 27 may be an example of the process described in FIG. 24. Transport LSPs may be set up in either of two directions, LSP to remote PEs 1028A, 1028B ("PEs 1028") and LSP to vPE. In the absence of the techniques of this disclosure, an LSP to PEs 1028 from vPE 1020A uses the aggregated fabric interface, and an LSP to vPE in the (shared uplink (SU)) of vP 1018 uses a simple pop and forward to the aggregated fabric interface 1032A. In accordance with the technique of this disclosure, virtual nodes will advertise optimal forwarding path information such that the receiving virtual node can replace the aggregated fabric interface 1032A with a more specific optimal forwarding path route. For example, in vP 1018 aggregated fabric interface 1032A may be replaced with a table next hop to a Context RIB, and in vPE 1020A aggregated fabric interface 1032A is replaced with a fabric interface.

A local configuration (or a special route) in vP 1018, advertises OFP identifier label binding for vPEs and sets out a label with table next hop to context FIB for vPE. A packet coming with the label will go through lookup in mpls.0 and context RIB on behalf of vPE. vP 1018 exports all its LDP routes via an OFP session to vPE 1020A with fabric interfaces as the optimal fabric path protocol next hop (OFP PNH). vPE 1020A imports these routes in a private RIB (e.g., bgp-afi([0-64]).inet(6).0) of RIB 1145. An LDP process (e.g., part of RPD 1134) of vPE 1020A uses next hops in this private RIB to replace the aggregated fabric interface when doing route resolution. An example BGP signaling address family for installing a private RIB by the receiving node are described in further detail herein.

Assume in the example topology of FIG. 27, fi-4/0/1 and ge-4/0/1 of vP 1018 are in the same PFE (not shown). In vP 1018, assume the next hop for 3.3.3.3 is ge-4/0/1. vP 1018 selects 128.1.1.6 as the next hop for 3.3.3.3 using the OFP PNH algorithm. vP 1018 exports a route for 3.3.3.3 to vPE 1020A using the OFP session, with 128.1.1.6 as next hop selected using the OFP PNH algorithm. vPE 1020A imports this route into bgp-afi0.inet.0 table. vPE 1020A LDP has 3.3.3.3 listing AFI 32A as a next hop with the label advertised by vP 1018. In OFP, vPE 20A's LDP process replaces the 3.3.3.3 prefix's next hop (AFI 32A) with bgp-afi0.inet.0 3.3.3.3 prefix next hop(fi-1/0/0) in RIB 1145 and FIB 1142.

Figure 28:
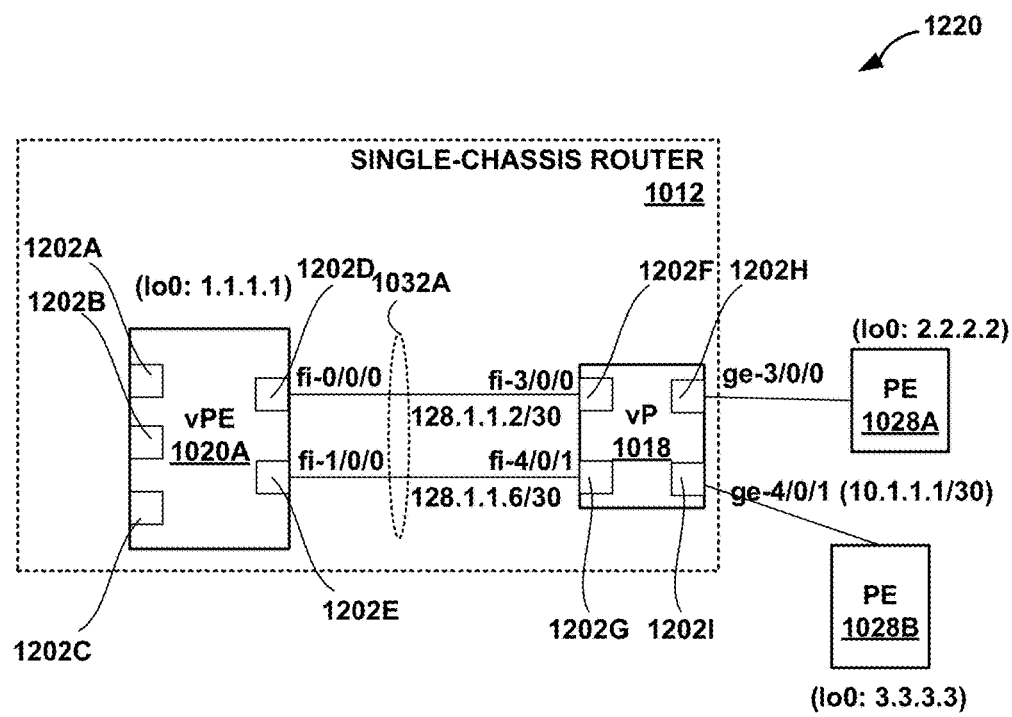
FIG. 28 is a block diagram illustrating an example system, showing another example network topology including a single-chassis router with virtual nodes.

FIG. 28 is a block diagram illustrating an example system 1220, showing another example network topology including a single-chassis router with virtual nodes. The example of FIG. 28 is used to describe various aspects of the techniques of this disclosure, including transport LSP setup for Resource Reservation Protocol (RSVP). FIG. 28 may be an example of the process described in FIG. 24. When vP 1018 receives a signaling request for LSP to vPE OFP identifier, a local configuration (or a special route) in vP 1018 (SU), vP 1018 signals an out label and sets up table next hop to a context FIB for vPE 1020A. Packets subsequently coming in the LSP go through lookup in mpls.0 and context RIB on behalf of vPE 20A. vP 1018 exports, via the OFP session, all its direct routes to vPE 1020A with fabric interfaces as the optimal fabric path protocol next hop (OFP PNH). vPE 1020A imports these routes in a private RIB of RIB 1145 (e.g., bgp-afi([0-64]).inet(6).0). An RSVP process (e.g., part of RPD 1134) of vPE 1020A uses next hops in this private RIB to replace AFI in RIB 1145 and FIB 1142.

Assume the example topology of FIG. 1028, vP fi-4/0/1 and ge-4/0/1 are in the same PFE. vP 1018 exports 10.1.1.1/ 30 (direct route) to vPE 1020A using the OFP session with 128.1.1.6 as next hop (selected by OFP process 1146 of vP 1018 using the OFP PNH algorithm). vPE 1020A imports this route into bgp-afi0.inet.0 table. vPE 1020A computes a path for an LSP to PE 1028B (100:3.3.3.3) with path <afi0, ge-4/0/1(10.1.1.1)>. An RSVP process (e.g., part of RPD 1134) of vPE 1020A signals this LSP and when signaling is completed the RSVP process will add 3.3.3.3 route with afi0 as the next hop. If OFP is needed, then vPE 20A RSVP replaces 3.3.3.3 prefix next hop(afi0) with bgp-afi0.inet.0 3.3.3.3 prefix next hop(fi-1/0/0) in RIB 1145 and FIB 1142. In some examples, if 3.3.3.3 has more than one interface, then RSVP may be able to use multiple interfaces. In some examples, the vNodes may signal information regarding one or more of AFI/FI bandwidth, AFI/FI statistics, or AFI/FI Class of Service (CoS) via the OFP session.

Figure 29:
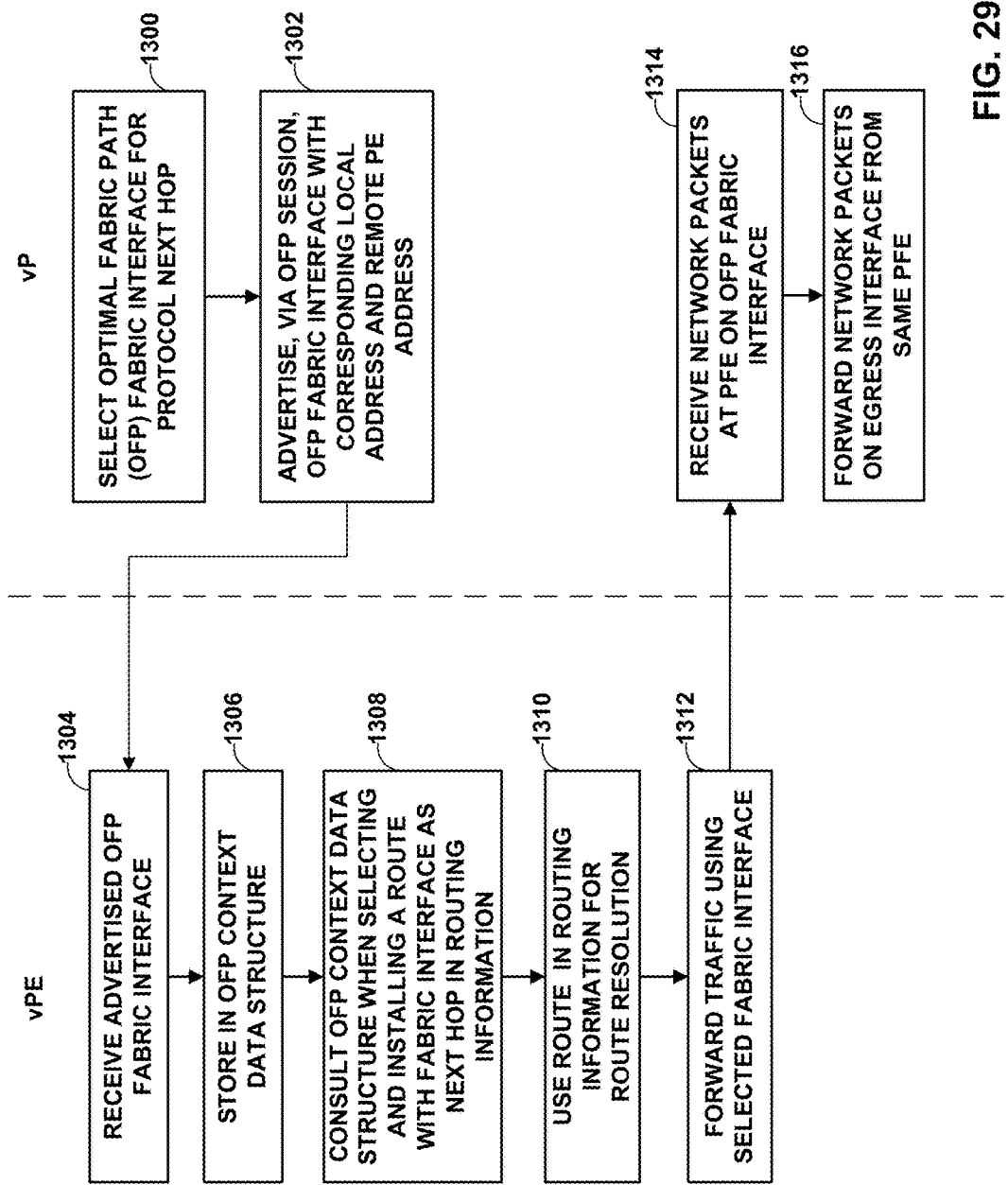
FIG. 29 is a flowchart illustrating an example mode of operation according to techniques described in this disclosure.

FIG. 29 is a flowchart illustrating an example mode of operation according to techniques described in this disclosure. FIG. 29 describes operation of virtual nodes of a single-chassis router, such as single-chassis router 1012 of FIGS. 21A-21B, in performing OFP techniques in the context of Internet traffic from the edge towards the core. For purposes of example, FIG. 29 will be described with respect to the examples of FIGS. 28 and 29.

vP 1018 selects an optimal fabric path fabric interface for vPE 20 to use as a protocol next hop (PNH) for reaching a PFE of vP 1018 for forwarding network traffic from that PFE to a remote PE network device address (1300). The remote PE network device may be able to reach a network destination such as a customer network via a customer edge (CE) network device. For example, OFP process 1146 of vP 1018 may use the OFP algorithm described above for selecting the OFP fabric interface. vP 1018 advertises the selected optimal fabric path fabric interface to vPE 1020A via an OFP session between vP 1018 and vPE 1020A (1302), e.g., by sending a routing protocol message over OFP session 1034 (FIG. 21B). For example, vP 1018 may send a BGP message via a BGP session managed by RPD 1134, the BGP message having a MultiNext hop attribute as described herein, where the MultiNext hop attribute specifies the fabric interface as the PNH for reaching the remote PE address, and specifies a local address and a network destination such as the remote PE address or remote CE address (e.g., an IP address or a network prefix), depending on whether it is being sent in the edge-to-core direction or the core-to-edge direction. For example, in the example of FIG. 30, vP 1018 may send a BGP update message having a MultiNext hop attribute that specifies the fabric interface fi-3/0/0 as the PNH for reaching the network prefix 10.1.3.0/24 reachable by CE 1023B, and specifies loopback address 2.2.2.2 of PE 1028A as the PNH for the network prefix.

vPE 1020A receives the advertised optimal fabric path fabric interface from vP 1018 via the OFP session (1304), and stores the OFP fabric interface, the local address of vP 1018, and the network destination address to a data structure such as OFP context database 1148 (1306). In some examples, the MultiNext hop attribute may include a field (e.g., a bit) specifying whether the advertisement is for downstream allocation or upstream allocation. In this case, the MultiNext hop attribute specifies the advertisement is for downstream allocation. For example, OFP process 1146 or RPD 1134 of vPE 1020A may store the information from the MultiNext hop attribute to OFP context database 1148 in response to determining that the MultiNext hop attribute specifies the advertisement is for downstream allocation.

RPD 1134 consults OFP context database 1148 when installing a route, and based on information from the MultiNext hop attribute may select and install the route with the fabric interface as the next hop in RIB 1145 (1308). RPD 1134 may use the additional information available from the OFP context database 1148 to make a more informed selection from among multiple fabric interfaces to which vPE 1020A could forward traffic to vP 1018 towards the destination. RPD 1134 then uses the route having the fabric interface in RIB 1145 when performing route resolution to program the next hops and outgoing interfaces to IFLs 1171 in ASICs 1168 (1310).

vPE 1020A subsequently forwards received packets destined for the destination using the OFP fabric interface that was selected and shared by vP 1018 (1312). Specifically, vPE 1020A receives the packet on a public interface and looks up a label on the packet in a forwarding table and identifies, based on the lookup, the OFP fabric interface that was programmed during route resolution. For example, vPE 1020A looks up the label in forwarding table 1228, vPE1020A.inet.0 (FIG. 32). vPE 1020A forwards the traffic onto the switch fabric 1126 of single-chassis router 1012 via the OFP fabric interface, and vP 1018 receives the packets on the fabric interface at a PFE of vP 1018 (1314). vP 1018 does a lookup in a forwarding table, such as forwarding table 1230, mpls.0 (FIG. 31), to determine the egress interface on which the packet should be forwarded. vP 1018 then forwards the packets out the egress interface from this same PFE on which the packets were received, towards the network destination (1316).

In this manner, vP 1018 avoids making unnecessary fabric hops that would occur if vP 1018 received the packets on a different PFE than the PFE having the egress interface, as may be the case when an aggregated fabric interface is used instead of the more specific OFP fabric interface. In the Edge-to-Core forwarding direction, OFP is used for transport-layer reachability information and the optimal forwarding decision is happening in the transport layer, in the sense that the vP is providing to the vPE information about the transport tunnel endpoints and the OFP fabric interface to the PFE for those transport tunnel endpoints. The transport tunnel endpoints (network destinations) identifies the remote provider edge router (e.g., PE 1028A).

Figure 30:
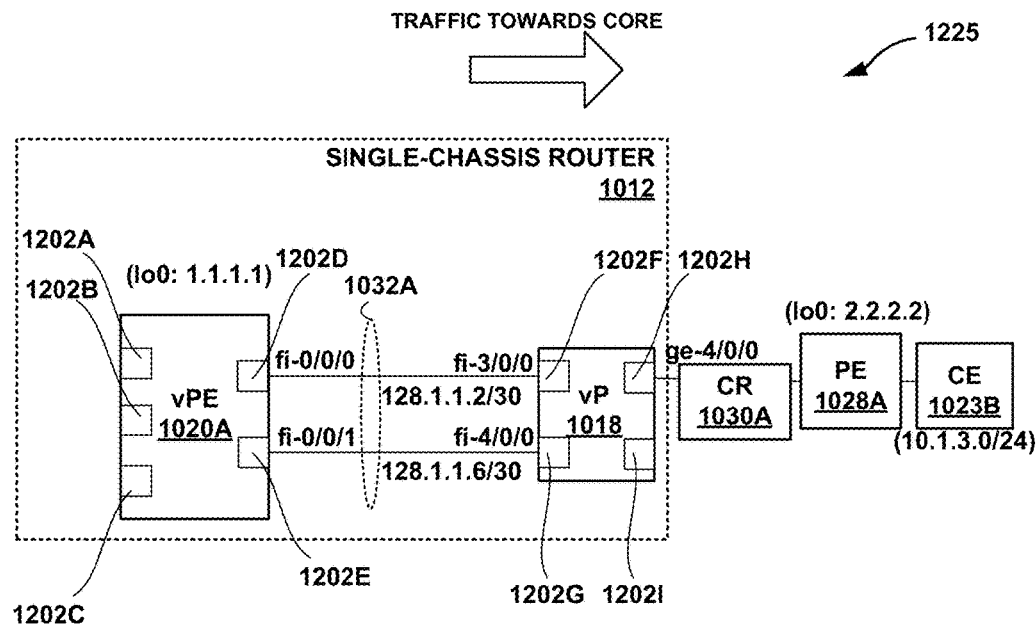
FIG. 30 is a block diagram illustrating an example system, showing another example network topology including a single-chassis router with virtual nodes.

FIG. 30 is a block diagram illustrating an example system 1225, showing another example network topology including a single-chassis router with virtual nodes. The example of FIG. 30 is used to describe various aspects of the techniques of this disclosure, including OFP in the context of Internet traffic from the edge towards the core (e.g., towards IP/MPLS core network 1016). In the example of FIG. 30, vPE 1020A and vP 1018 are in the same chassis and the core includes a core router ("P router") 1030A, and remote PE 1028A. vPE 1020A, vP and PE 1028A are enabled with MPLS label protocols (LDP/RSVP). A full mesh of transport LSP may be setup between PEs (e.g., using the techniques of FIG. 24). PE 1028A and vPE 1020A run a BGP session to exchange routes, e.g., in inet.0. PE 1028A advertises inet.0 routes (here 10.1.3/24) with self in a BGP-free core network.

In the absence of the techniques of this disclosure, the RIBs of the routers in FIG. 30 would contain the following entries.

vPE 1020A:
  inet.3/LSP-DB
    2.2.2.2, FNH:{LSP-to-2.2.2.2,egress-ifl:afi0.0(fi-0/0/0, fi-0/0/1)} (out-label NA: in label 200)
  inet.0
    10.1.3.0/24, PNH:2.2.2.2, Indirect NH: inet.3 2.2.2.2 FNH.

vP 18:
  inet.3/LSP-DB
    2.2.2.2, FNH:LSP-to-2.2.2.2 (out-label 200: in label 3)
  mpls.0
    label:200, FNH pop; ge-4/0/0

PE 28A:
  inet.0
    10.1.3.0 FNH: CE1
  inet.3/LSP-DB
    2.2.2.2 receive (out-label 3: in label NA)
  PE BGP vPE 20A in-rib
    10.1.3/24: self From the OFP perspective, the interesting RIB is inet.3 of vPE 1020A. Without OFP, LDP and RSVP uses afi0.0(fi-0/0/0, fi-0/0/1). With OFP, the inet.3 route should only include fi-0/0/1 as a next hop interface. In the above example, in case of unnumbered fabric interfaces, fabric interface IP addresses would be replaced with PFE-IDs.

Figure 31:
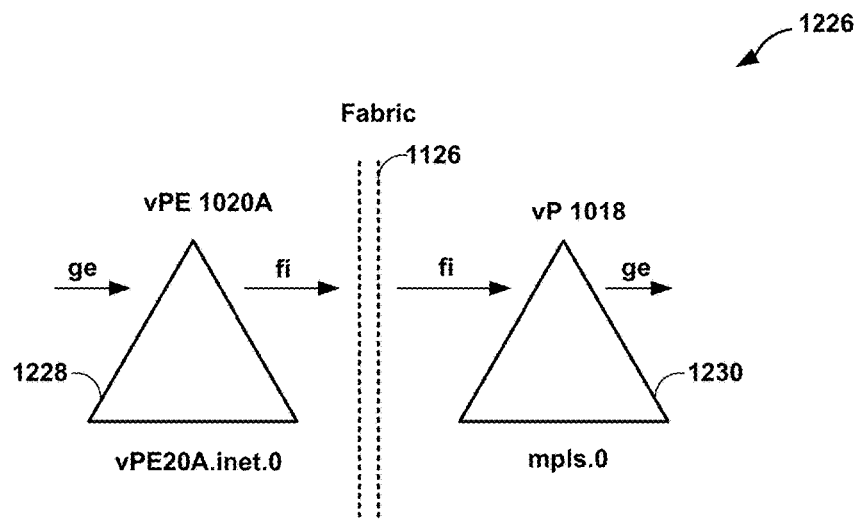
FIG. 31 is a block diagram illustrating an example portion of a forwarding plane of single-chassis router.

FIG. 31 is a block diagram illustrating an example portion of a forwarding plane 1226 of single-chassis router 1012. The portion of the forwarding plane 1226 as shown includes a switch fabric 1126 and a routing table 1228 of vPE 1020A (vPE20A.inet.0) and an MPLS routing table 1230 of vP (mpls.0). In the example of FIG. 31, a packet coming in on an egress interface of vPE 1020A will be looked up in routing table 1228 to identify the fabric interface as the next hop. The packet will be output on the fabric interface through switch fabric 1126 and received by vP on its fabric interface to be looked up in the MPLS routing table 1230, to identify the egress interface of vP 1018 as the next hop for outputting the packet toward its network destination external to single-chassis router 1012. vP 1018 will output the packet on the egress interface based on the lookup in MPLS routing table 1230.

The OFP BGP session from vP 1018 exports direct and LDP routes to vPE 1020A, with matching fabric interface address. vPE 1020A constructs OFP context database 1148 (could be a routing table) from these routes. LDP and RSVP consult OFP context database 1148 when installing the route with afi as next hop, and instead install the fabric interface fi-0/0/1 as a next hop interface in RIB 1145 and FIB 1142. Whenever the underlying fabric interface changes, LDP/RSVP re-add the next hops so the underlying fabric interface is kept current in RIB 1145 and FIB 1142.

In this manner, vP 1018 uses the MP-BGP OFP-session to send a local address and remote PE address with desired fabric interface address (as determined by the OFP PNH algorithm) to vPE 1020A. vPE 1020A will store this OFP information to OFP context DB 1148 and use this additional information to select the member link of the fabric interface instead aggregated fabric interface, and install the route in the RIB 1145 (e.g., inet.3). When vPE 1020A subsequently performs route resolution based on RIB 1145, the correct member link fabric interface will be used for programming ASICs 1168.

Figure 32:
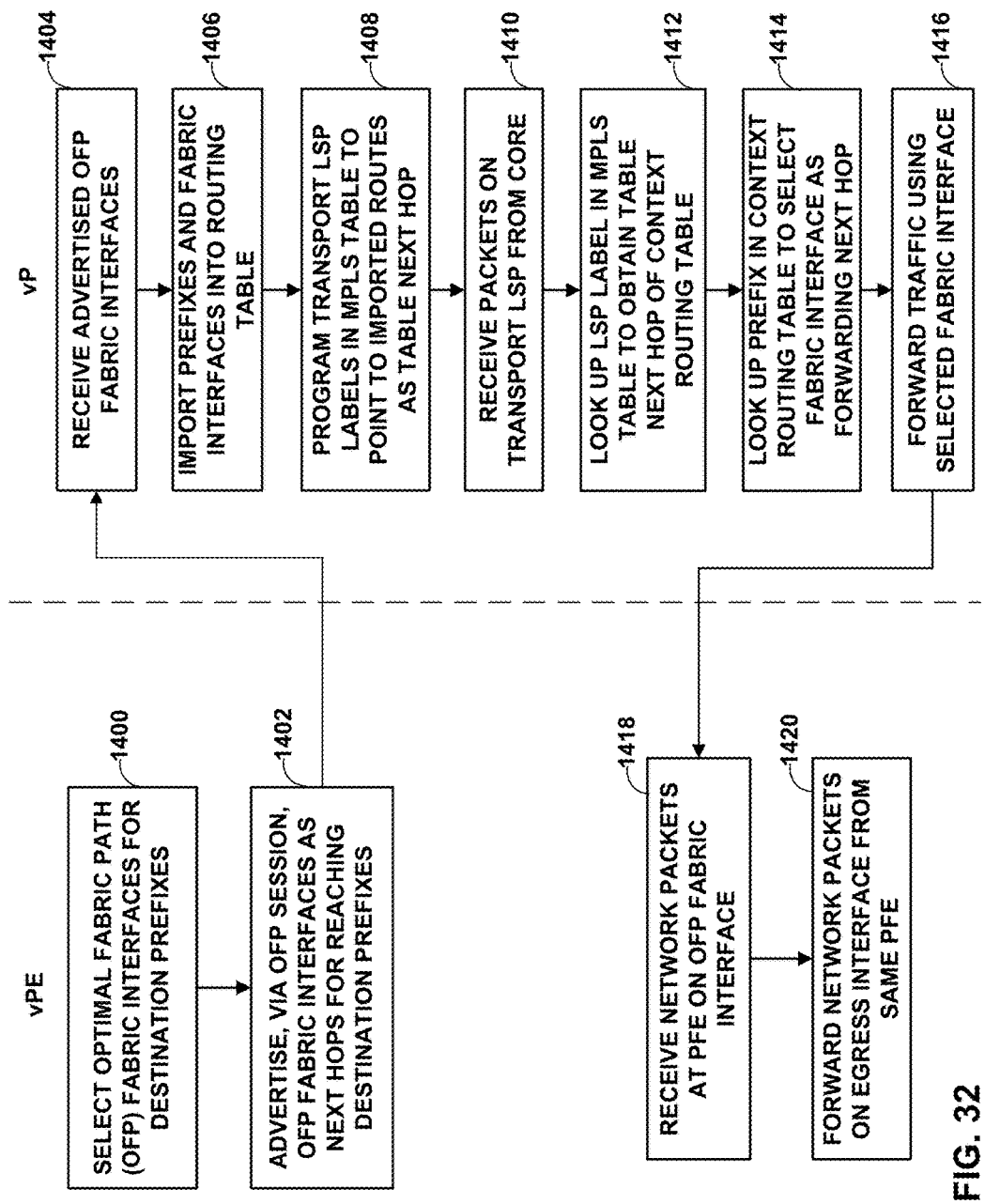
FIG. 32 is a flowchart illustrating another example mode of operation according to techniques described in this disclosure.

FIG. 32 is a flowchart illustrating another example mode of operation according to techniques described in this disclosure. FIG. 32 describes operation of virtual nodes of a single-chassis router, such as single-chassis router 1012 of FIGS. 21A–21B, in performing OFP techniques in the context of Internet traffic from the core towards the edge. For purposes of example, FIG. 32 will be described with respect to the examples of FIGS. 30 and 31.

vPE 1020 selects an optimal fabric path fabric interface for vP 1018 to use as a PNH for reaching a PFE of vPE 1020 for forwarding network traffic from that PFE to a destination prefix, such as a prefix reachable via a CE router (1400). For example, OFP process 1146 of vPE 1020 may use the OFP algorithm described above for selecting the OFP fabric interface. vPE 1020 advertises the selected optimal fabric path fabric interface to vP 1018 via an OFP session between vP 1018 and vPE 1020A (402), e.g., by sending a routing protocol message over OFP session 1034 (FIG. 21B). For example, vPE 1020 may send a BGP message via a BGP session managed by RPD 1134, the BGP message having a MultiNext hop attribute as described herein, where the MultiNext hop attribute specifies the fabric interface as the PNH for reaching the network prefix, and specifies a local address of vPE 1020 and the network prefix address). For example, in the example of FIG. 33, vPE 1020 may send a BGP update message having a MultiNext hop attribute that specifies the fabric interface fi-0/0/0 as the PNH for reaching the network prefix 10.1.1.0/24, and specifies loopback address 1.1.1.1 of vPE 1020.

The MultiNext hop attribute may also specify a context-table (e.g., a context routing table and/or context forwarding table) in which to install the fabric interface, such as by including a context label (e.g., an MPLS label). The context-table may be a mirrored routing table 1249 of vPE 1020, for which vPE 1020 mirrors routes. For example, in the example of FIG. 34, the MultiNext hop attribute may specify a context-table named vPE1020A.inet.0 stored by vP 1018 to which to install the fabric interface next hop information. In some examples, vPE 1020 may have previously sent a MultiNext hop attribute that instructed vP 1018 to install the context-table to its routing information. Alternatively, such instruction may be contained in the same MultiNext hop attribute that specifies the fabric interface to install in the context-table.

vP 1018 receives the routing protocol message advertising the OFP fabric interface (404). RPD of vP 1018 imports the prefix and fabric interface from the message into the specified routing table, e.g., vPE20A.inet.0 (406). RDP of vP 1018 programs the forwarding plane to include forwarding tables based on the routing tables. In some examples, RPD of vP 1018 may program transport LSP labels in the associated MPLS table 1246 (e.g., mpls.0 of FIG. 34) to point to the context forwarding 1248 (e.g., vPE20A.inet.0) (408).

When vP 1018 subsequently receives packets on a transport LSP from the core network (1410), the packet forwarding engine 1120 of vP 1018 on which the packets are received looks up an outer LSP label of the packet in MPLS table 1246 to obtain a table next hop pointing to context forwarding table 1248 (1412). The packet forwarding engine 1120 of vP 1018 then looks up an inner label or the prefix in context routing table 1248 to select the fabric interface on which to output the packet to the next hop of vPE 1020A within the single-chassis router (1414). In some examples, the transport LSP may have earlier been established as described herein using optimal fabric path advertisements, as described in FIG. 24. vP 1018 forwards the received packets onto the switch fabric of single-chassis router 1012 using the OFP fabric interface that was selected and shared by vPE 1020A (1416). vPE 1020A receives the packets on the fabric interface at a PFE of vPE 1020A (1418), and then forwards the packets out an egress interface from this same PFE on which the packets were received, towards the network destination (1420). In this manner, vPE 1020A avoids making unnecessary fabric hops that would occur if vPE 1020A received the packets on a different PFE than the PFE having the egress interface.

In the Core-to-Edge forwarding direction, OFP is used for service-layer reachability information and the optimal forwarding decision is happening at the service layer, in the sense that the information that the vPE is giving the vP is service routes (service plane forwarding routes). The vPE is either giving VPN labels or IP prefixes to the vP and telling the vP which exit PFE the VP should send the traffic to, by specifying the OFP fabric interface. The network destination specified in the OFP message identifies either an IP-prefix advertised by CE network devices connected to fabric interfaces 1202A, 1202B, 1202C, or MPLS labels identifying a combination of 1202A/1202B/1202C.

Figure 33:
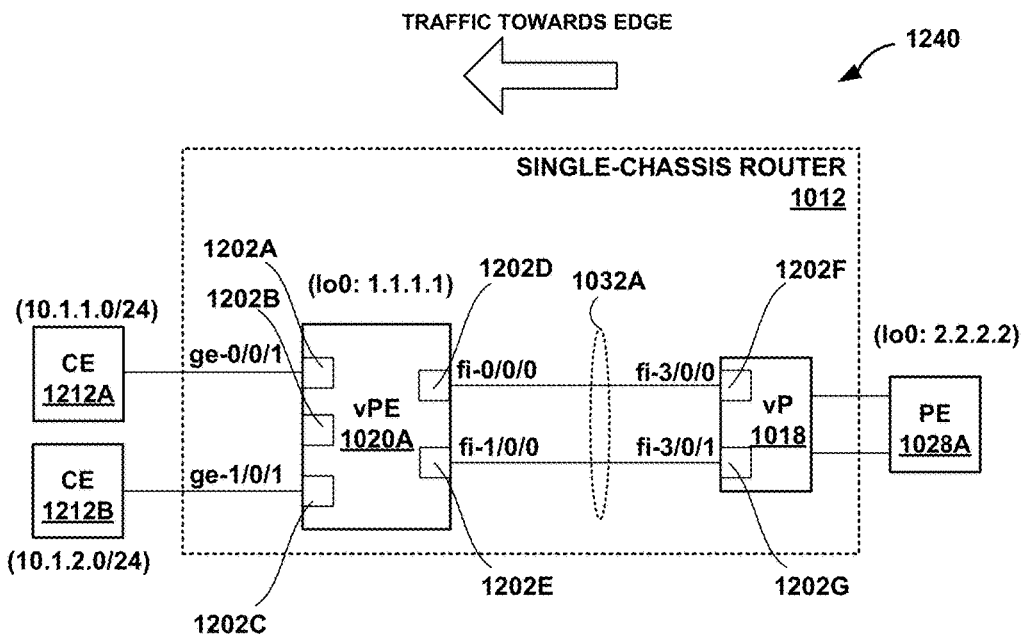
FIG. 33 is a block diagram illustrating an example system, showing another example network topology including a single-chassis router with virtual nodes.

FIG. 33 is a block diagram illustrating an example system 1240, showing another example network topology including a single-chassis router with virtual nodes. The example of FIG. 33 is used to describe various aspects of the techniques of this disclosure, including OFP in the context of Internet traffic from the core towards the edge.

In the example of FIG. 33, vPE 1020A and vP 1018 are in same chassis and a remote PE 1028A. vPE 1020A has two PFE (which could be in same or different FPCs) and ge-0/0/1 and fi-0/0/0 in pfe0 also ge-1/0/1 and fi-1/0/0 in pfe2. vPE 1020A, vP 1018, and PE 1028A are enabled with MPLS label protocols(LDP/RSVP). A full mesh transport LSP setup between PEs. In some examples, PE and vPE 1020A are running BGP for inet unicast to exchange routes in inet.0. In some examples, vPE by default advertises inet.0 routes (in here 10.1.1/24 and 10.1.2/24) with CE's address as next hop. In some examples, a user could also configure the next hop as the router itself in a BGP-free core. In the absence of the techniques of this disclosure, the forwarding table and RIBs may be as follows for certain prefixes in routers in the example of FIG. 33.

vPE 20A: inet.0
    10.1.1.0/24, FNH: ge-0/0/1(CE212A) 10.1.2.0/24, FNH: ge-0/0/2(CE212B)
inet.3/LSP-DB
vPE 20A BGP PE rib-out
    10.1.1.0/24: self. 10.1.2.0/24: self.
vP 18: inet.3/LSP-DB
    1.1.1.1, FNH:LSP-to-1.1.1.1 (out-label 100: in label 3): mpls.0 label:100, FNH pop;
afi0
PE 28A: inet.0
    10.1.1.0/24, PNH:1.1.1.1, FNH:LSP-to-1.1.1.1 10.1.2.0/24, PNH:1.1.1.1, FNH:LSP-to-1.1.1.1: inet.3/LSP-DB 1.1.1.1 (out-label 3:
in label NA)
PE 28A BGP vPE 20A in-rib
    10.1.1/24: 1.1.1.1. 10.1.2/24: 1.1.1.1

In the above example, in case of unnumbered fabric interfaces, fabric interface IP addresses would be replaced with PFE-IDs. PE 1028A pushes the transport label of the LSP to 1.1.1.1 and sends out the packet to vP 1018. vP 1018 does a lookup in the MPLS table which typically result in popping the label and sending the IP packets to vPE 1020A. vPE 1020A does a lookup in inet.0 and sends the packet to respective CEs 1212A-1212B. With optimal fabric path (OFP), assume that all prefixes advertising from vPE 1020A with protocol next hop as 1.1.1.1 need OFP. From a forwarding perspective, no changes are in vPE 1020A and PE 1028A. But there are changes to vP 1018, which needs to send to the CE-hosting PFE, instead of simply popping and forwarding to vPE 1020A via afi0. To enable this additional role for vP 1018, a context inet.0 FIB is populated at vP 1018 with member links(fi) of afi0 which connects to respective CE-connected PFE. In one example, vP 1018's FIBS look like below. vPE 1020A control plane plays role to populate the vPE20A.inet.0 table in vP 1018 using the mechanisms described herein.

vP: inet.3/LSP-DB
    1.1.1.1, FNH:LSP-to-1.1.1.1 (out-label 100: in label 3)
    : mpls.0 label:100, FNH pop; table-nh: vPE20A.inet.0: vPE20A.inet.0
    10.1.1.0/24, FNH: fi-3/0/0
    10.1.2.0/24, FNH: fi-3/0/1

In the above example, in case of unnumbered fabric interfaces, fabric interface IP addresses would be replaced with PFE-IDs. A single-hop MP-IBGP session(OFP-session) is established between vPE 1020A and vP 1018. And vPE 1020A advertises prefixes that need OFP (optimal fabric path) with desired local fi's address as next hop instead self/next hop address. OFP process 1146 of VPE 1020A dynamically computes the desired local fi's address for the prefix using the OFP algorithm and over-writes the default BGP next hop. The desired fi's address will reside in same PFE as the prefix next-hop. vP 1018 imports this prefixes in vPE.inet.0 with next-hop address advertised by the vPE 1020A. If ECMP is needed, then next hop attribute may be used in OFP-session along with link community for unequal load balancing. If aggregation is enabled towards core, then de-aggregated prefixes should be exported to OFP-session.

The vPE20A.inet.0 also installs a default route that points to the AFI interface. If routes are aggregated, then de-aggregated routes exported are only to OFP-session with OFP PNH. With de-aggregated routes in vP 1018's context-RIB, optimal fabric hop will be done. In some cases, if only subset of prefixes need OFP then vPE could use secondary loopback address for advertising prefixes needing OFP, and use the regular loopback address for advertising prefixes that do not need OFP. vP 1018 also needs to program transport LSP label to table next hop instead of pop and forward. In some examples, this could be achieved by a local configuration in vP 1018, similar to egress-protection, to program label for LSP-1.1.1.1 to table next hop pointing to vPE 1020A.inet.0.

Figure 34:
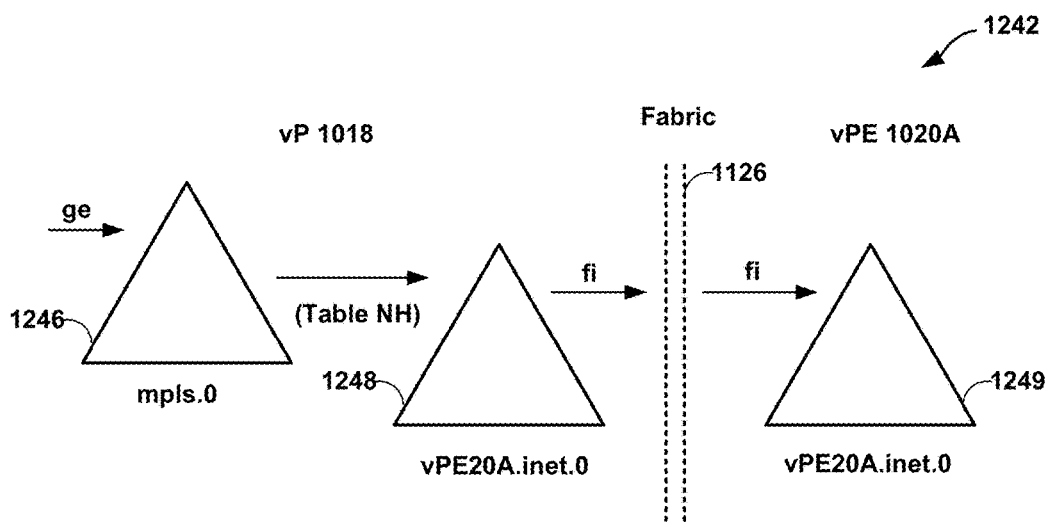
FIG. 34 is a block diagram illustrating an example portion of a forwarding plane of single-chassis router.

FIG. 34 is a block diagram illustrating an example portion of a forwarding plane 1242 of single-chassis router. The portion of the forwarding plane 1242 as shown includes a switch fabric 1126 and an MPLS routing table 1246 of vP 1018 (mpls.0) that has a table next hop that points to a context next hop routing table (vPE1020A.inet.0) that has been installed by vPE 1020A, and a routing table of vPE 1020A (vPE1020A.inet.0).

Figure 35:
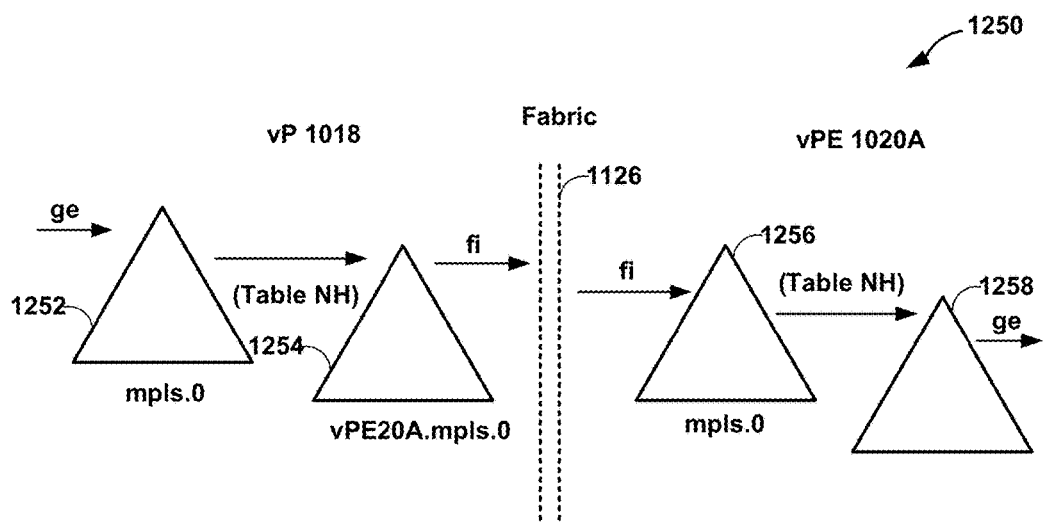
FIG. 35 is a block diagram illustrating an example system, showing another example network topology including a single-chassis router with virtual nodes.

FIG. 35 is a block diagram illustrating an example system 1250, showing another example network topology including a single-chassis router with virtual nodes. The example of FIG. 35 is used to describe various aspects of the techniques of this disclosure, including OFP in the context of L3 VPNs.

For L3VPN, vPE 1020A advertises per-pfe-per-table label to PE. vPE 1020A also advertise this label per-pfe-per-table label with desired fi interface with new BGP MPLS address family. vP 1018 imports this label into vPE 1020A.mpls.0 using RFC 5331-based context label space and binds the vPE 1020A address to the context table. Similar to the internet solution described above, vP 1018 does a mpls.0 lookup in MPLS routing table 1256 followed by vPE0.mpls.0 lookup in context next hop MPLS routing table 1254 to choose the optimal fabric path. The difference is, compared to the internet solution described above, the second lookup will be done in vPE 1020A.mpls.0, as shown in FIG. 35. When vPE 1020A receives the packet, it looks up the packet in MPLS routing table 1256 to get a table next hop to routing table 1258, where it obtains an egress interface on which to output the packet from the same PFE on which vPE 1020A received the packet.

Figure 36:
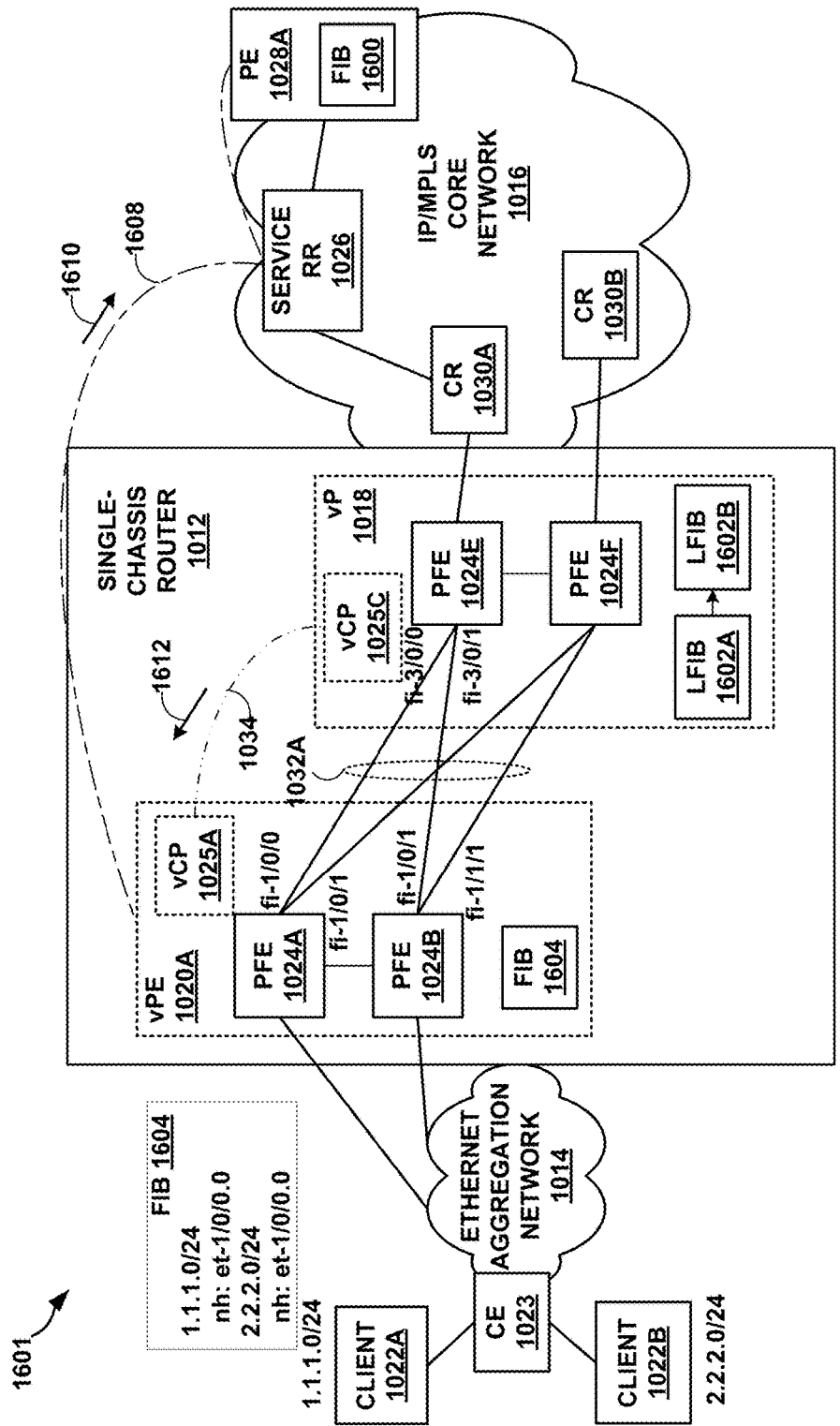
FIG. 36 is a block diagram illustrating an example system in which vNodes perform control plane signaling for sending traffic from IP/MPLS core network towards CE.

FIG. 36 is a block diagram illustrating an example system 1601 in which vNodes perform control plane signaling for sending traffic from IP/MPLS core network 1016 towards CE 1023. In the example of FIG. 21, vPE 1020A is a Private IP (PiP) vPE. vPE 1020A stores in its forwarding information base (FIB) 1304 for PFE 1024A:
 1.1.1.0/24
 nh: et-1/0/0.0
 2.2.2.0/24
 nh: et-1/0/0.0
vPE 1020A advertises Per-VRF-per-PFE labels to remote PE 1028A via service route reflector (RR) 1026 for VPN services. For example, vPE 1020A advertises a per-PFE-table-label with fabric interfaces in one or more MP-BGP route advertisement(s) 1610 over MP-BGP session 1608 to service RR 1026. Service RR 1026 in turn reflects the advertised routes to PE 1028A. For example, the per-PFE-table-label with fabric interfaces advertised in route advertisement(s) 1610 include [2.2.2.0/24, NH: fi-1/1/0, label: 30] and [1.1.1.0/24, NH: fi-1/1/0, label: 20].

In response to receiving the advertised per-PFE-table label, PE 1028A stores information from the route advertisements to FIB 1604 as follows:
 1.1.1.0/24
 bgp-nh: vPE 1020A loopback address
 vpn-label-push-20
 2.2.2.0/24
 bgp-nh: vPE 1020A loopback address
 vpn-label-push-30

For example, a BGP process executing within vCP 25C of vP 1018 establishes an OFP session 1034 using MP-BGP between itself and a BGP process executing within vCP 25A of vP 1018. vP 1018 advertises labels and associated fabric interfaces of vP 1018 as OFP next hops over the OFP session 1034.

vP 1018 uses this VPN/Service label to identify the right PFE of vPE 1020A to which to forward packets. vP 1018 is aware of the Service Label-to-PFE association, because the single MP-BGP session (OFP session 1034) between vPE 1020A and vP 1018 is used to signal this association using a new upstream label allocation address family, as described herein with respect to FIGS. 1-20.

vP 1018 looks at the transport and service labels of incoming packets, with reference to its MPLS table and the context forwarding table vPE20A.mpls.0 to make the decision as to where to forward the incoming packets. In some examples, vPE 1020A signals via OFP session 1034 only the service labels and Next-Hop information to vP (Prefix information is NOT signaled). For example, based on the OFP information received in OFP session 1034, vP 1018 updates its mpls.0 table to include the following entry:
 label 100
 nh: table-nh vPE20A.mpls.0
Thus, mpls.0 table points to vPE1020A.mpls.0 as a table next hop for label 100. vPE1020A.mpls.0 includes the following entries, as updated by OFP process to include fabric interfaces in response to receiving the MP-BGP route advertisement:
 label 20
 nh: fi-3/0/0
 label 30
 nh: fi-3/0/1
In some examples, this approach can support VRFs having interfaces belonging to a single PFE, as well as VRFs having interfaces distributed among multiple PFEs and/or line cards.

The forwarding construct from vPE 1020A to core network 1016 is described as follows. In some examples, an LDP process executing on vP 1018 in accordance with the Label Distribution Protocol advertises an LDP label for a remote-PE loopback address (e.g., for PE 1028A), along with selected optimal fabric interfaces addresses, to vPE 1020A. For example, the LDP process may communicate with the BGP process executing on vP 1018 to trigger the BGP process to advertise this information in a MultiNexthop attribute sub-TLV of a BGP message, as described in examples herein.

Whenever the LDP process detects that the outgoing next hop PFE has changed, the OFP process may select a new optimal fabric interface and trigger the LDP process to cause BGP to advertise a new BGP message with the updated optimal fabric interface's address.

The selected OFP fabric interface's address should be in same PFE as the outgoing interface for a given prefix, e.g., selected using the OFP PNH algorithm described herein. This results in a packet coming into a PFE on an incoming virtual fabric interface and out the same PFE out to core with no additional loop through fabric. In this example, BGP used for signaling and BGP is also used for the other direction.

In some examples, the techniques of this disclosure may result in improved forwarding state scaling with using a VRF-PFE-table-label. The additional (service) labels in the network will be as follows: For a VRF hosted on one PFE: No additional Labels (vrf-table-label). For M such VRFs: Number of labels is M; same as for vrf-table-label. For a VRF hosted on N PFEs: (N−1) additional Labels. For M such VRFs: (N−1)*M additional Labels. Additional state in vP 1018 is as follows:

vP 1018 contains per PFE upstream service label for optimal forwarding. Number of Labels: (no. of vPE)*(no. of VRF)*n, where n=Number of PFEs across which a VRF is spread.

Figure 37:
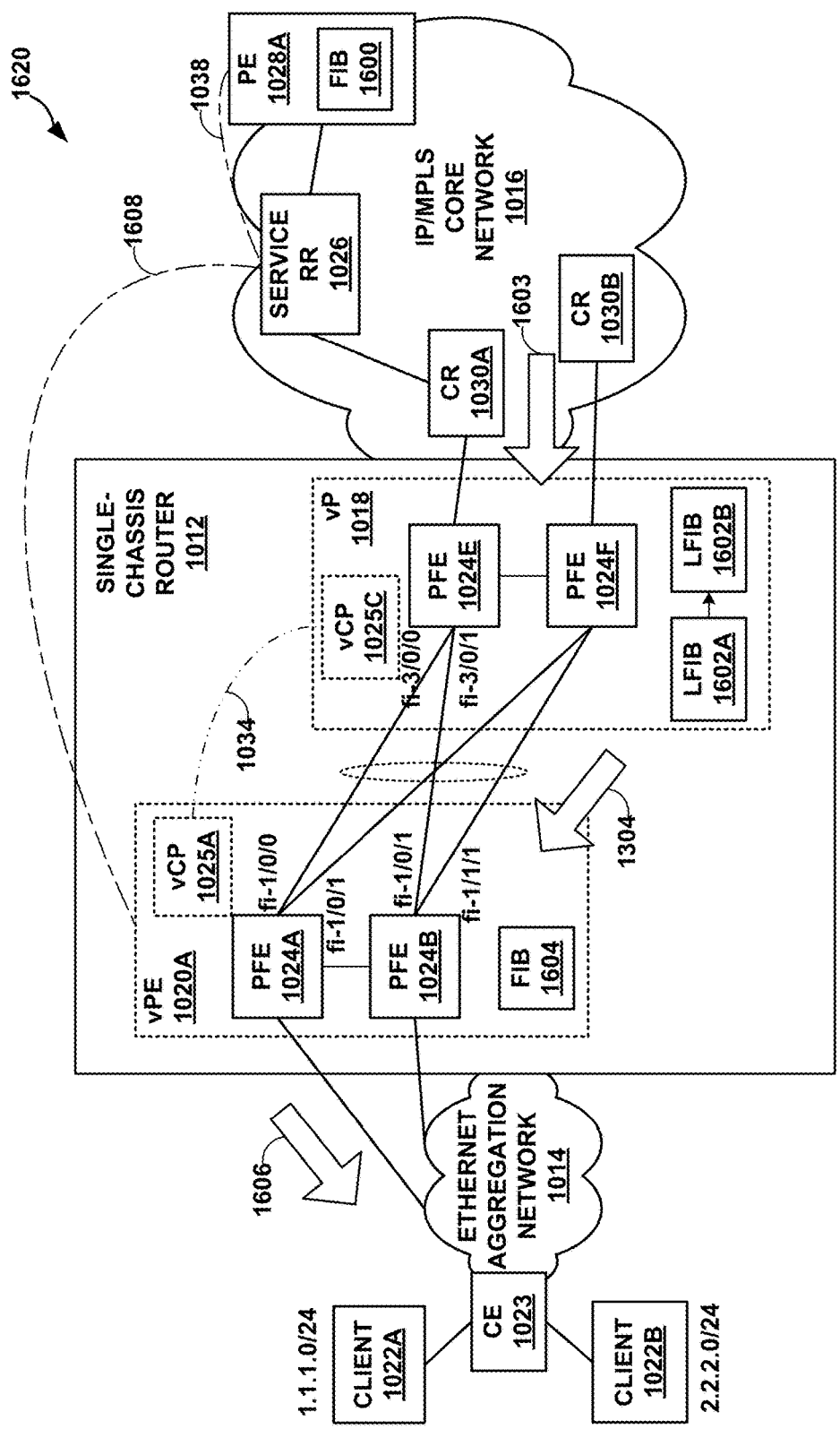
FIG. 37 is a block diagram illustrating an example system in which vNodes perform data plane forwarding of packets from IP/MPLS core network towards CE based on the control plane signaling of FIG. 36.

FIG. 37 is a block diagram illustrating an example system 1620 in which vNodes perform data plane forwarding of packets from IP/MPLS core network 1016 towards CE 1023 based on the control plane signaling of FIG. 36.

Figure 38:
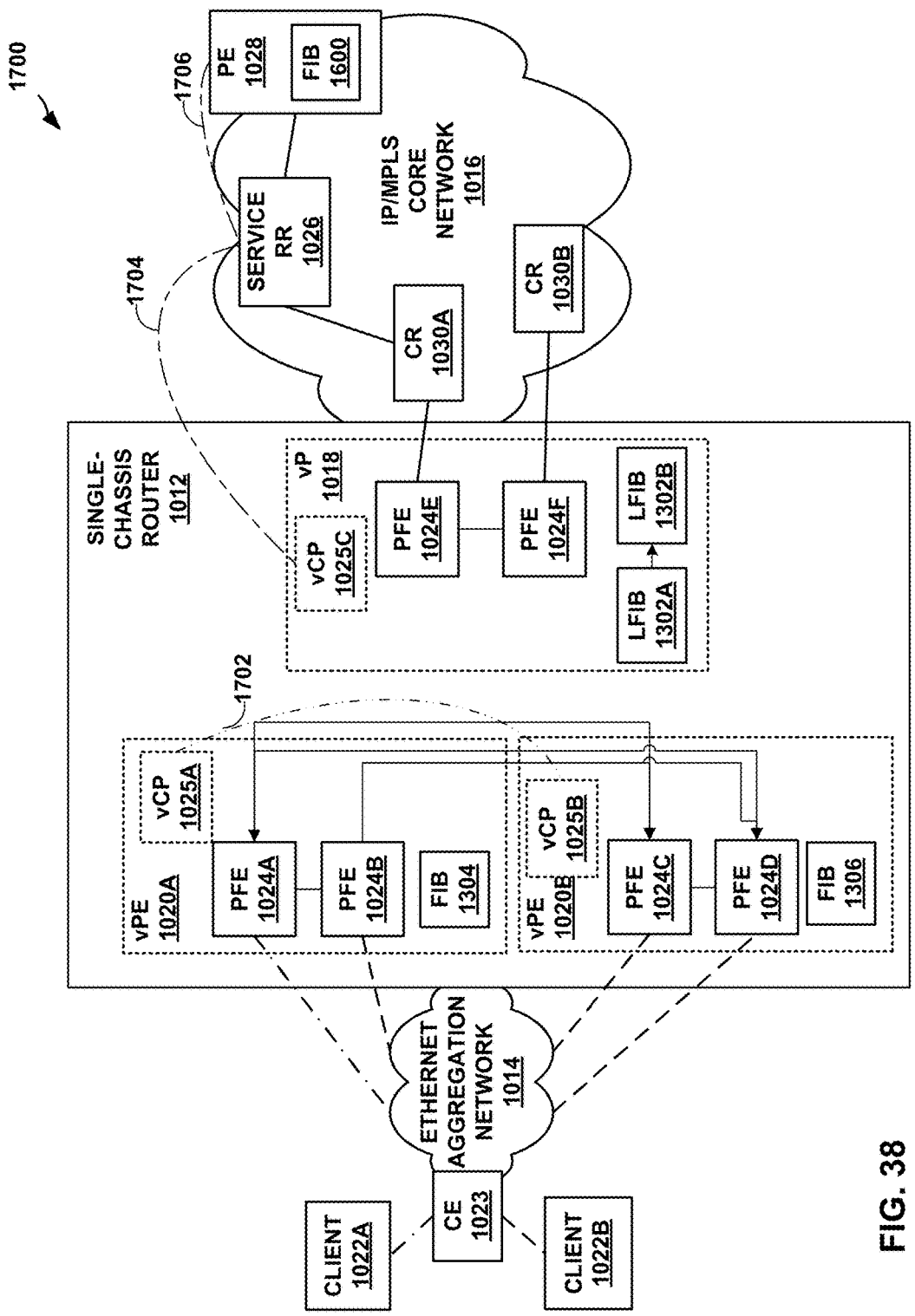
FIG. 38 is a block diagram illustrating an example system illustrating inter-vPE communication between PFEs of vPE and vPE.

FIG. 38 is a block diagram illustrating an example system 1700 illustrating inter-vPE communication between PFEs of vPE 1020A and vPE 1020B. Forwarding construct from vPE 1020A to vPE 1020B is described as follows: vPE 1020A establish BGP session to vP (as a GNF RR) node or vPE 1020B (e.g., BGP session 1702 between vCP 1025A and vCP 1025B). vPE 1020A advertises any locally originated VPN prefixes that need inter-vPE traffic into the RR/vPE with the selected OFP virtual fabric interface's address using the BGP session. The selected OFP fabric interface's address and outgoing-to-CE interfaces should be in the same PFE 1024 for a given prefix, e.g., selected using the OFP PNH algorithm described herein. This results in a packet coming into a PFE 1024 (e.g., PFE 1024C) on an incoming virtual fabric interface and out the same PFE 1024 out to core or CE with no additional loop through fabric. The ingress vPE 1020A has two routes, one from the service RR another from the GNF RR VP 1018 or vPE 1020B for a VPN IP prefixes which need inter-vPE traffic. Ingress vPE 1020A selects the route from vPE/RR for VPN IP prefixes which need inter-vPE traffic, and uses the selected OFP fabric interface. vP (SU) be configured with forwarding context to support OFP for internet and IPVPN examples.

In one example aspect, a method includes receiving, by a first network device, a route advertisement message that includes an attribute for upstream allocation, the attribute specifying information comprising: a plurality of next hops of a second network device for reaching a network destination in the route advertisement message, a plurality of forwarding semantics describing forwarding actions associated with respective ones of each of the plurality of next hops and respective next hop attributes of the plurality of next hops, and a field indicating whether the attribute is provided for downstream allocation or upstream allocation. The method also includes, in response to determining, by the network device, that the field indicates the attribute is provided for upstream allocation: installing, by the network device and based on the plurality of forwarding semantics, the plurality of next hops, the forwarding actions, and the next hop attributes to forwarding information stored by the network device; and applying, by the network device and based on the forwarding information, the forwarding actions to network traffic received by the network device and destined for the network destination when forwarding the network traffic to one or more of the plurality of next hops. The method also includes, in response to determining, by the network device, that the field indicates the attribute is provided for downstream allocation, selecting the second network device to which to forward traffic based on one or more of the plurality of next hops of the second network device and the associated forwarding semantics.

In another example aspect, a network device includes one or more processors; a control unit operable by the one or more processors and configured to receive a route advertisement message that includes an attribute for upstream allocation, the attribute specifying information comprising: a plurality of next hops of a second network device for reaching a network destination in the route advertisement message, a plurality of forwarding semantics describing forwarding actions associated with respective ones of each of the plurality of next hops and respective next hop attributes of the plurality of next hops, and a field indicating whether the attribute is provided for downstream allocation or upstream allocation, wherein the control unit is configured to, in response to determining that the field indicates the attribute is provided for upstream allocation: install, based on the plurality of forwarding semantics, the plurality of next hops, the forwarding actions, and the next hop attributes to forwarding information stored by the network device; and apply, based on the forwarding information, the forwarding actions to network traffic received by the network device and destined for the network destination when forwarding the network traffic to one or more of the plurality of next hops; and wherein the control unit is configured to, in response to determining that the field indicates the attribute is provided for downstream allocation, select the second network device to which to forward traffic based on one or more of the plurality of next hops of the second network device and the associated forwarding semantics.

In a further example aspect, a computer-readable storage medium includes instructions for causing one or more programmable processors of a first network device to: receive a route advertisement message that includes an attribute for upstream allocation, the attribute specifying information comprising: a plurality of next hops of a second network device for reaching a network destination in the route advertisement message, a plurality of forwarding semantics describing forwarding actions associated with respective ones of each of the plurality of next hops and respective next hop attributes of the plurality of next hops, and a field indicating whether the attribute is provided for downstream allocation or upstream allocation; in response to determining that the field indicates the attribute is provided for upstream allocation: install, based on the plurality of forwarding semantics, the plurality of next hops, the forwarding actions, and the next hop attributes to forwarding information stored by the network device; and apply, based on the forwarding information, the forwarding actions to network traffic received by the network device and destined for the network destination when forwarding the network traffic to one or more of the plurality of next hops; and in response to determining that the field indicates the attribute is provided for downstream allocation, select the second network device to which to forward traffic based on one or more of the plurality of next hops of the second network device and the associated forwarding semantics.

In one example aspect, a method includes receiving, by a first network device, a private label route message from a second network device, the private label route message specifying a private label as a destination, a route distinguisher of an egress network device for the private label, a context protocol next hop address that identifies a private Multiprotocol Label Switching (MPLS) forwarding layer, and a next hop for the private label; determining, by the first network device and based on the private label route message, a label stack having a plurality of labels to use for forwarding traffic to the next hop for the private label; and storing, in a context forwarding table associated with the private MPLS forwarding layer, a private label destination with the label stack as a next hop for reaching the private label.

In another example aspect, a network device includes: one or more processors; a routing component operable by the one or more processors and configured to receive a private label route message from a second network device, the private label route message specifying a private label as a destination, a route distinguisher of an egress network device for the private label, a context protocol next hop address that identifies a private Multiprotocol Label Switching (MPLS) forwarding layer, and a next hop for the private label, and determine based on the private label route message a label stack having a plurality of labels to use for forwarding traffic to the next hop for the private label; and a forwarding component operable by the one or more processors and configured to store, in a context forwarding table associated with the private MPLS forwarding layer, a private label destination with the label stack as a next hop for reaching the private label.

In a further example aspect, a computer-readable storage medium includes instructions for causing one or more programmable processors of a first network device to: receive a private label route message from a second network device, the private label route message specifying a private label as a destination, a route distinguisher of an egress network device for the private label, a context protocol next hop address that identifies a private Multiprotocol Label Switching (MPLS) forwarding layer, and a next hop for the private label; determine, based on the private label route message, a label stack having a plurality of labels to use for forwarding traffic to the next hop for the private label; and store, in a context forwarding table associated with the private MPLS forwarding layer, a private label destination with the label stack as a next hop for reaching the private label.

In one example aspect, a method includes selecting, by a first virtual routing node of a single-chassis network device having a plurality of forwarding components and a plurality of fabric links coupling respective pairs of the plurality of forwarding components at respective fabric interfaces of the plurality of forwarding components, a fabric interface of a forwarding component of the plurality of forwarding components that has an egress interface toward a network destination and that is associated with the first virtual routing node; advertising, by the first virtual routing node to a second virtual routing node of the single-chassis router, a message specifying the fabric interface as a next hop for the network destination and a context forwarding table of the second virtual routing node to which to install the fabric interface; in response to receiving the message specifying the fabric interface, storing, by the second virtual routing node to the context forwarding table of the second virtual node, the fabric interface as a next hop for the network destination; selecting, by the second virtual routing node and based on the context forwarding table and a context next hop in a first forwarding table pointing to the context forwarding table, the fabric interface for forwarding network packets destined for the network destination received by the second virtual routing node; and forwarding, by the second virtual routing node, network packets destined for the network destination to the selected fabric interface.

In another example aspect, a single-chassis network device includes a plurality of forwarding components; a plurality of fabric links coupling respective pairs of the plurality of forwarding components at respective fabric interfaces of the plurality of forwarding components; a first virtual routing node configured to forward packets using a first subset of the plurality of forwarding components; and a second virtual routing node configured to forward packets using a second subset of the plurality of forwarding components, the second subset distinct from the first subset. The first virtual routing node is configured to: select a fabric interface of a forwarding component of the plurality of forwarding components that has an egress interface toward a network destination and that is associated with the first virtual routing node; advertise to the second virtual routing node, a message specifying the fabric interface as a next hop for the network destination and a context forwarding table of the second virtual routing node to which to install the fabric interface. The second virtual routing node is configured to, in response to receiving the message specifying the fabric interface, store, to the context forwarding table of the second virtual node, the fabric interface as a next hop for the network destination, select, based on the context forwarding table and a context next hop in a first forwarding table pointing to the context forwarding table, the fabric interface for forwarding network packets received by the second virtual routing node and destined for the network destination based on the context forwarding table and a context next hop in a first forwarding table pointing to the context forwarding table, and forward network packets destined for the network destination to the selected fabric interface.

In a further example aspect, a computer-readable storage medium includes instructions for causing one or more programmable processors of a single-chassis network device to: select, by a first virtual routing node of the single-chassis network device having a plurality of forwarding components and a plurality of fabric links coupling respective pairs of the plurality of forwarding components at respective fabric interfaces of the plurality of forwarding components, a fabric interface of a forwarding component of the plurality of forwarding components that has an egress interface toward a network destination and that is associated with the first virtual routing node; advertise, by the first virtual routing node to a second virtual routing node of the single-chassis router, a message specifying the fabric interface as a next hop for the network destination and a context forwarding table to which to install the fabric interface; in response to receiving the message specifying the fabric interface, store, to the context forwarding table of the second virtual node, the fabric interface as a next hop for the network destination; select, by the second virtual routing node and based on the context forwarding table and a context next hop in a first forwarding table pointing to the context forwarding table, the fabric interface for forwarding network packets destined for the network destination received by the second virtual routing node; and forward, by the second virtual routing node, network packets destined for the network destination to the selected fabric interface.

In one example aspect, a method includes selecting, by a first virtual routing node of a single-chassis network device having a plurality of forwarding components and a plurality of fabric links coupling respective pairs of the plurality of forwarding components at respective fabric interfaces of the plurality of forwarding components, a fabric interface of a forwarding component of the plurality of forwarding components that has an egress interface toward a network destination and that is associated with the first virtual routing node; advertising, by the first virtual routing node to the second virtual routing node, the fabric interface as a next hop for the network destination and a label for use in establishing a transport label switched path (LSP); and in response to receiving, by the second virtual routing node, the fabric interface and the label: updating stored routing information to replace an aggregated fabric interface with the fabric interface, computing, by the second virtual routing node, a path for the transport LSP to include the fabric interface, and establishing, by the second virtual routing node, the transport LSP along the computed path using the label.

In another example aspect, a single-chassis router includes a plurality of forwarding components; a plurality of fabric links coupling respective pairs of the plurality of forwarding components at respective fabric interfaces of the plurality of forwarding components; a first virtual routing node configured to forward packets using a first subset of the plurality of forwarding components; and a second virtual routing node configured to forward packets using a second subset of the plurality of forwarding components, the second subset distinct from the first subset, wherein the first virtual routing node is configured to: select a fabric interface of a forwarding component of the plurality of forwarding components that has an egress interface toward a network destination and that is associated with the first virtual routing node; advertise to the second virtual routing node the fabric interface as a next hop for the network destination and a label for use in establishing a transport label switched path (LSP); and wherein the second virtual routing node is configured to: in response to receiving, by the second virtual routing node, the fabric interface and the label: compute a path for the transport LSP to include the fabric interface in place of an aggregated fabric interface of which the fabric interface is a member, and establish the transport LSP along the computed path using the label.

In a further example aspect, a computer-readable storage medium includes instructions for causing at least one programmable processor of a single-chassis network device to: select, by a first virtual routing node of the single-chassis network device having a plurality of forwarding components and a plurality of fabric links coupling respective pairs of the plurality of forwarding components at respective fabric interfaces of the plurality of forwarding components, a fabric interface of a forwarding component of the plurality of forwarding components that has an egress interface toward a network destination and that is associated with the first virtual routing node; advertise, by the first virtual routing node to the second virtual routing node, the fabric interface as a next hop for the network destination and a label for use in establishing a transport label switched path (LSP); and in response to receiving, by the second virtual routing node, the fabric interface and the label: compute, by the second virtual routing node, a path for the transport LSP to include the fabric interface in place of an aggregated fabric interface of which the fabric interface is a member, and establish, by the second virtual routing node, the transport LSP along the computed path using the label.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
   selecting, by a first virtual routing node of a single-chassis network device having a plurality of forwarding components and a plurality of fabric links coupling respective pairs of the plurality of forwarding components at respective fabric interfaces of the plurality of forwarding components, a fabric interface of a forwarding component of the plurality of forwarding components that has an egress interface toward a network destination and that is associated with the first virtual routing node;
   advertising, by the first virtual routing node to a second virtual routing node of the single-chassis network device, the fabric interface as a next hop for the network destination;
   in response to receiving the fabric interface, storing, by the second virtual routing node to a context data structure of the second virtual node, the fabric interface as a next hop for the network destination;
   selecting, by the second virtual routing node and based on the context data structure, the fabric interface from among a plurality of fabric interfaces as a next hop for the network destination; and
   forwarding, by the second virtual routing node, network traffic destined for the network destination to the selected fabric interface.

2. The method of claim 1, wherein the network destination comprises a network address prefix advertised by a customer edge network device, wherein advertising the fabric interface further comprises advertising the fabric interface as service-layer reachability information in association with a local address of the first virtual routing node.

3. The method of claim 2, wherein selecting comprises selecting the fabric interface from among a plurality of fabric interfaces associated with the customer edge network device.

4. The method of claim 2, wherein the customer edge network device allows access to a Virtual Private Network (VPN) service, and wherein advertising comprises advertising a VPN label as network layer reachability information for the fabric interface.

5. The method of claim 1, wherein advertising comprises advertising the fabric interface over a single-hop Border Gateway Protocol (BGP) session established between the first virtual routing node and the second virtual routing node of the single-chassis network device.

6. The method of claim 5, wherein advertising comprises advertising the fabric interface in a Border Gateway Protocol (BGP) update message over the single-hop BGP session.

7. The method of claim 1, further comprising:
receiving, by the first virtual routing node, a packet of the network traffic at the selected fabric interface; and
without sending the packet across the plurality of fabric links, outputting, by the first virtual routing node, the packet from the single-chassis network device at the egress interface of the forwarding component of the plurality of forwarding components.

8. The method of claim 1, wherein the plurality of forwarding components comprises a first subset of the plurality of forwarding components used by the first virtual routing node and a second subset of the plurality of forwarding components used by the second virtual routing node, the second subset distinct from the first subset.

9. The method of claim 1, further comprising:
converting, by the first virtual routing node, a forwarding next hop (FNH)-level load balance distribution into packet-forwarding engine (PFE)-level load balance distribution,
wherein selecting the fabric interface comprises selecting a plurality of fabric interfaces based on the PFE-level load balance distribution, and
wherein advertising comprises advertising network addresses of each of a plurality of fabric interfaces as respective next hops for the network destination based on the PFE-level load balance distribution, and information specifying a load balance distribution across the plurality of fabric interfaces; and
storing, by the second virtual routing node, the information specifying the load balance distribution to the context data structure.

10. A single-chassis network device comprising:
a plurality of forwarding components;
a plurality of fabric links coupling respective pairs of the plurality of forwarding components at respective fabric interfaces of the plurality of forwarding components;
a first virtual routing node configured to forward packets using a first subset of the plurality of forwarding components; and
a second virtual routing node configured to forward packets using a second subset of the plurality of forwarding components, the second subset distinct from the first subset,
wherein the first virtual routing node is configured to:
select a fabric interface of a forwarding component of the plurality of forwarding components that has an egress interface toward a network destination and that is associated with the first virtual routing node;
advertise to the second virtual routing node, the fabric interface as a next hop for the network destination, and
wherein the second virtual routing node is configured to, in response to receiving the fabric interface, store, to a context data structure of the second virtual node, the fabric interface as a next hop for the network destination, select, based on the context data structure, the fabric interface from among a plurality of fabric interfaces as a next hop for the network destination, and forward network traffic destined for the network destination to the selected fabric interface.

11. The single-chassis network device of claim 10, wherein the first virtual routing node is configured to, in response to receiving network traffic from the second virtual routing node on the fabric interface of the forwarding component, output the network traffic from the egress interface of the forwarding component onto a link external to the single-chassis network device.

12. The single-chassis network device of claim 10, wherein the first virtual routing node is configured to advertise the fabric interface over a single-hop Border Gateway Protocol (BGP) session established between the first virtual routing node and the second virtual routing node of the single-chassis network device, wherein the fabric interface is advertised in a Border Gateway Protocol (BGP) update message sent over the single-hop BGP session.

13. The single-chassis network device of claim 10, wherein the first virtual routing node is configured to convert a forwarding next hop (FNH)-level load balance distribution into packet-forwarding engine (PFE)-level load balance distribution, select a plurality of fabric interfaces based on the PFE-level load balance distribution, advertise network addresses of each of a plurality of fabric interfaces as respective next hops for the network destination based on the PFE-level load balance distribution, and information specifying a load balance distribution across the plurality of fabric interfaces; and
and wherein the second virtual routing node is configured to store the information specifying the load balance distribution to the context data structure.

14. The single-chassis network device of claim 10, wherein the network destination comprises a network address prefix advertised by a customer edge network device, wherein the first virtual routing node is configured to advertise the fabric interface as service-layer reachability information in association with a local address of the first virtual routing node.

15. The single-chassis network device of claim 14, wherein the customer edge network device allows access to a Virtual Private Network (VPN) service, and wherein the first virtual routing node is configured to advertise a VPN label as network layer reachability information for the fabric interface.

16. The single-chassis network device of claim 14, wherein the first virtual routing node is configured to select the fabric interface from among a plurality of fabric interfaces associated with the customer edge network device.

17. The single-chassis network device of claim 10, wherein the first virtual routing node is configured to, in response to receiving a packet of the network traffic at the selected fabric interface, output the packet from the single-chassis network device at the egress interface of the forwarding component of the plurality of forwarding components without sending the packet across the plurality of fabric links.

18. A computer-readable storage medium comprising instructions for causing one or more programmable processors of a single-chassis network device to:
- select, by a first virtual routing node of the single-chassis network device having a plurality of forwarding components and a plurality of fabric links coupling respective pairs of the plurality of forwarding components at respective fabric interfaces of the plurality of forwarding components, a fabric interface of a forwarding component of the plurality of forwarding components that has an egress interface toward a network destination and that is associated with the first virtual routing node;
- advertise, by the first virtual routing node to a second virtual routing node of the single-chassis network device, the fabric interface as a next hop for the network destination;
- in response to receiving the fabric interface, store, to a context data structure of the second virtual node, the fabric interface as a next hop for the network destination;
- select, by the second virtual routing node and based on the context data structure, the fabric interface from among a plurality of fabric interfaces as a next hop for the network destination; and
- forward, by the second virtual routing node, network traffic destined for the network destination to the selected fabric interface.

* * * * *